(12) United States Patent
Sorenson, III et al.

(10) Patent No.: US 11,115,473 B2
(45) Date of Patent: Sep. 7, 2021

(54) REDUNDANT STORAGE GATEWAYS

(71) Applicant: Amazon Technologies, Inc., Seattle, WA (US)

(72) Inventors: James Christopher Sorenson, III, Seattle, WA (US); Yun Lin, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/812,149

(22) Filed: Mar. 6, 2020

(65) Prior Publication Data
US 2020/0213391 A1    Jul. 2, 2020

Related U.S. Application Data

(63) Continuation of application No. 14/444,721, filed on Jul. 28, 2014, now Pat. No. 10,587,687, which is a (Continued)

(51) Int. Cl.
*H04L 29/08* (2006.01)
*G06F 11/20* (2006.01)
(Continued)

(52) U.S. Cl.
CPC ...... *H04L 67/1097* (2013.01); *G06F 11/2025* (2013.01); *G06F 11/2092* (2013.01); (Continued)

(58) Field of Classification Search
CPC ............. H04L 67/1097; H04L 41/0654; H04L 67/1095; H04L 69/40; G06F 11/20; G06F 11/2025; G06F 16/1827
See application file for complete search history.

(56) References Cited

U.S. PATENT DOCUMENTS 3,838,228 A    9/1974  Lee et al.
5,636,355 A    6/1997  Ramakrishnan et al.
(Continued)

OTHER PUBLICATIONS

U.S. Appl. No. 13/212,960, filed Aug. 18, 2011, James Christopher Sorenson III.
(Continued)

*Primary Examiner* — Mohamed A. Wasel
(74) *Attorney, Agent, or Firm* — Robert C. Kowert; Kowert, Hood, Munyon, Rankin & Goetzel, P.C.

(57) ABSTRACT

Methods, apparatus, and computer-accessible storage media for providing redundant storage gateways. A client may create a storage gateway group and add storage gateways to the group. The client may assign one or more volumes on a remote data store to each the storage gateways in the group. Volume data for each storage gateway in the group may be replicated to at least one other storage gateway in the group. If one of the gateways in the group becomes unavailable, one or more other gateways in the group may take over volumes previously assigned to the unavailable gateway, using the replicated data in the group to seamlessly resume gateway operations for the respective volumes. Client processes that previously communicated with the unavailable gateway may be manually or automatically directed to the gateway(s) that are taking over the unavailable gateway's volumes.

20 Claims, 33 Drawing Sheets

Related U.S. Application Data continuation of application No. 13/212,960, filed on Aug. 18, 2011, now Pat. No. 8,793,343.

(51) Int. Cl.
*G06F 16/182* (2019.01)
*H04L 12/24* (2006.01)
*H04L 29/14* (2006.01)
*G06F 16/00* (2019.01)

(52) U.S. Cl.
CPC ........ *G06F 11/2097* (2013.01); *G06F 16/183* (2019.01); *G06F 11/20* (2013.01); *G06F 16/00* (2019.01); *G06F 16/1827* (2019.01); *H04L 41/0654* (2013.01); *H04L 67/1095* (2013.01); *H04L 69/40* (2013.01)

(56) References Cited

U.S. PATENT DOCUMENTS

| | | | |
|---|---|---|---|
| 5,790,775 | A | 8/1998 | Marks et al. |
| 6,009,502 | A | 12/1999 | Boeuf |
| 6,097,877 | A | 8/2000 | Katayama et al. |
| 6,148,368 | A | 11/2000 | DeKoning |
| 6,148,383 | A | 11/2000 | Micka et al. |
| 6,216,199 | B1 | 4/2001 | Dekoning et al. |
| 6,237,072 | B1 | 5/2001 | Houlsdworth |
| 6,477,624 | B1 | 11/2002 | Kedem et al. |
| 6,516,380 | B2 | 2/2003 | Kenchammana-Hoskote et al. |
| 6,732,124 | B1 | 5/2004 | Koseki et al. |
| 6,760,379 | B1 | 7/2004 | Werner |
| 6,792,540 | B1 | 9/2004 | Smith et al. |
| 6,880,086 | B2 | 4/2005 | Kidder et al. |
| 6,886,035 | B2 | 4/2005 | Wolff |
| 6,925,518 | B2 | 8/2005 | Rudland et al. |
| 6,934,826 | B2 | 8/2005 | Lubbers et al. |
| 7,003,688 | B1 | 2/2006 | Pittelkow et al. |
| 7,010,645 | B2 | 3/2006 | Hetzler et al. |
| 7,017,374 | B2 | 3/2006 | Bogert et al. |
| 7,093,028 | B1 | 8/2006 | Shao et al. |
| 7,130,956 | B2 | 10/2006 | Rao |
| 7,191,304 | B1 | 3/2007 | Cameron et al. |
| 7,340,639 | B1 | 3/2008 | Lee et al. |
| 7,340,652 | B2 | 3/2008 | Jarvis et al. |
| 7,523,286 | B2 | 4/2009 | Ramany et al. |
| 7,574,660 | B2 | 8/2009 | Campbell et al. |
| 7,624,170 | B2 | 11/2009 | Das et al. |
| 7,676,702 | B2 | 3/2010 | Basham et al. |
| 7,734,598 | B2 | 6/2010 | Noguchi et al. |
| 7,752,329 | B1 | 7/2010 | Meenan et al. |
| 7,797,323 | B1 | 9/2010 | Eshghi et al. |
| 7,886,182 | B1 | 2/2011 | Coatney et al. |
| 8,019,882 | B2 | 9/2011 | Rao et al. |
| 8,037,026 | B1 | 10/2011 | Singhal |
| 8,112,477 | B2 | 2/2012 | Rao et al. |
| 8,126,847 | B1 | 2/2012 | Zheng et al. |
| 8,200,638 | B1 | 6/2012 | Zheng et al. |
| 8,214,406 | B2 | 7/2012 | Kushwah |
| 8,234,467 | B2 | 7/2012 | Noguchi et al. |
| 8,275,900 | B2 | 9/2012 | Meenan et al. |
| 8,285,967 | B1 | 10/2012 | Veeraswamy et al. |
| 8,305,893 | B2 | 11/2012 | Verma et al. |
| 8,335,899 | B1 | 12/2012 | Meiri et al. |
| 10,146,648 | B1 | 12/2018 | Vokaliga et al. |
| 10,587,687 | B2 | 3/2020 | Sorenson, III et al. |
| 2001/0049773 | A1 | 12/2001 | Bhavsar |
| 2002/0078174 | A1 | 6/2002 | Sim et al. |
| 2002/0165942 | A1 | 11/2002 | Ulrich et al. |
| 2002/0169827 | A1 | 11/2002 | Ulrich et al. |
| 2003/0131278 | A1 | 7/2003 | Fujibayashi |
| 2003/0221124 | A1 | 11/2003 | Curran et al. |
| 2004/0153727 | A1* | 8/2004 | Hicken ............... G06F 11/2089 714/6.12 |
| 2004/0243699 | A1 | 12/2004 | Kocianes et al. |
| 2005/0013441 | A1 | 1/2005 | Klein |
| 2006/0161642 | A1 | 7/2006 | Bopardikar et al. |
| 2006/0271656 | A1 | 11/2006 | Yagawa |
| 2007/0168336 | A1 | 7/2007 | Ransil et al. |
| 2007/0185924 | A1 | 8/2007 | Kawamura |
| 2008/0013614 | A1 | 1/2008 | Fiesel et al. |
| 2008/0016300 | A1* | 1/2008 | Yim ............... G06F 11/2064 711/162 |
| 2008/0178278 | A1 | 7/2008 | Grinstein et al. |
| 2008/0189774 | A1 | 8/2008 | Ansari et al. |
| 2009/0024752 | A1 | 1/2009 | Shitomi |
| 2009/0077257 | A1 | 3/2009 | Savoor et al. |
| 2009/0157980 | A1 | 6/2009 | Bruce |
| 2009/0240705 | A1 | 9/2009 | Miloushev et al. |
| 2010/0057984 | A1 | 3/2010 | Chen et al. |
| 2010/0070725 | A1 | 3/2010 | Prahlad et al. |
| 2010/0125730 | A1 | 5/2010 | Dodgson et al. |
| 2010/0146074 | A1 | 6/2010 | Srinivasan |
| 2010/0162032 | A1 | 6/2010 | Dodgson et al. |
| 2010/0205152 | A1 | 8/2010 | Ansari et al. |
| 2010/0217948 | A1 | 8/2010 | Mason et al. |
| 2010/0290422 | A1 | 11/2010 | Haigh et al. |
| 2010/0293233 | A1 | 11/2010 | Salam et al. |
| 2010/0333116 | A1 | 12/2010 | Prahlad et al. |
| 2011/0002341 | A1 | 1/2011 | Damola et al. |
| 2011/0099147 | A1* | 4/2011 | McAlister ........... G06F 11/2076 707/639 |
| 2011/0107103 | A1 | 5/2011 | Dehaan et al. |
| 2011/0113428 | A1 | 5/2011 | Nelson et al. |
| 2011/0127664 | A1 | 6/2011 | Antesberger et al. |
| 2011/0145367 | A1 | 6/2011 | Ananthanarayanan et al. |
| 2011/0218969 | A1 | 9/2011 | Anglin et al. |
| 2012/0110569 | A1 | 5/2012 | Moore et al. |
| 2012/0192006 | A1* | 7/2012 | Qi ............... G06F 11/0757 714/6.22 |
| 2012/0203924 | A1 | 8/2012 | Dote et al. |
| 2012/0208512 | A1 | 8/2012 | Maharajh et al. |
| 2012/0259950 | A1 | 10/2012 | Havekes et al. |
| 2012/0269275 | A1 | 10/2012 | Hannuksela |
| 2012/0272285 | A1 | 10/2012 | Brooks et al. |
| 2012/0303686 | A1 | 11/2012 | Yanan et al. |
| 2012/0311065 | A1 | 12/2012 | Yanan et al. |
| 2012/0324040 | A1 | 12/2012 | Velummylum et al. |
| 2012/0324067 | A1 | 12/2012 | Hari et al. |

OTHER PUBLICATIONS

U.S. Appl. No. 13/665,707, filed Oct. 31, 2012, Pradeep Vincent.
U.S. Appl. No. 13/665,708, filed Oct. 31, 2012, David Carl Salyers.
U.S. Appl. No. 13/665,709, filed Oct. 31, 2012, David Carl Salyers.
U.S. Appl. No. 13/665,705, filed Oct. 31, 2012, David Carl Salyers.
U.S. Appl. No. 13/665,685, filed Oct. 31, 2012, David Carl Salyers.
"What is Nasuni?"; downloaded from www.nasuni.com/whaUs_nasuni on Oct. 22, 2012; pp. 1-2.
Stephen Lawson, "Gluster Pushes Storage Software to VMware, Amazon," PCWorld online article, Feb. 7, 2011, pp. 1-3.
Krishnan Subramanian, "Gluster Introduces Scale-Out NAS Virtual Storage Appliances for VMware and AWS," CloudAve online article, Feb. 9, 2011, pp. 1-3.
A. Epstein, D. H. Lorenz, E. Silvera, I. Shapira, "Virtual Appliance Content Distribution for a Global Infrastructure Cloud Service," INFOCOM'10 Proceedings IEEE, Mar. 2010, pp. 1-9.
Liu, et al., "Low-cost application image distribution on worldwide cloud front server," Computer Communications Workshops (INFOCOM WKSHPS), 2011 IEEE Conference, Apr. 2011, pp. 671-676.
M. Armbrust, et al., "Above the Clouds: A Berkeley View of Cloud computing," Technical Report No. UCB/EECS-2009-28, University of California at Berkley, USA, Feb. 10, 2009, pp. 1-23.
Stephanie Balaouras, "How the Cloud Will Transform Disaster Recovery Services," Forrester Research, Inc., Jul. 24, 2009, pp. 1-12.
U.S. Appl. No. 12/981,172, filed Dec. 29, 2010, David H. Clark.
U.S. Appl. No. 12/981,393, filed Dec. 29, 2010, James Christopher Sorenson.
U.S. Appl. No. 12/981,397, filed Dec. 29, 2010, James Christopher Sorenson.
U.S. Appl. No. 13/327,605, filed Dec. 15, 2011, Yun Lin.

(56) References Cited

OTHER PUBLICATIONS

U.S. Appl. No. 13/174,156, filed Jun. 30, 2011, James Christopher Sorenson.
U.S. Appl. No. 13/174,524, filed Jun. 30, 2011, James Christopher Sorenson.
U.S. Appl. No. 13/174,172, filed Jun. 30, 2011, James Christopher Sorenson.
U.S. Appl. No. 13/174,140, filed Jun. 30, 2011, James Christopher Sorenson.
U.S. Appl. No. 13/174,203, filed Jun. 30, 2011, James Christopher Sorenson.
U.S. Appl. No. 13/174,513, filed Jun. 30, 2011, James Christopher Sorenson.
U.S. Appl. No. 13/174,505, filed Jun. 30, 2011, James Christopher Sorenson.
U.S. Appl. No. 13/174,489, filed Jun. 30, 2011, James Christopher Sorenson.
U.S. Appl. No. 13/324,907, filed Dec. 13, 2011, Arun Sundaram.
"Storsimple: Cloud-integrated Enterprise Storage"; downloaded from www.storsimple.comftotal-storagef on Oct. 22, 2012; pp. 1-2.
"CloudArray Cloud Storage Gateway Overview"; downloaded from www.twinstrata.comfCloudArray-overview; pp. 1-2.

* cited by examiner

REDUNDANT STORAGE GATEWAYS

This application is a continuation of U.S. patent application Ser. No. 14/444,721, filed Jul. 28, 2014, which is a continuation of U.S. patent application Ser. No. 13/212,960, filed Aug. 18, 2011, now U.S. Pat. No. 8,793,343, which are hereby incorporated by reference in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resources.

Web Services

The conventional Web model allows clients to access Web resources (e.g., applications, services, and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Figure 1:
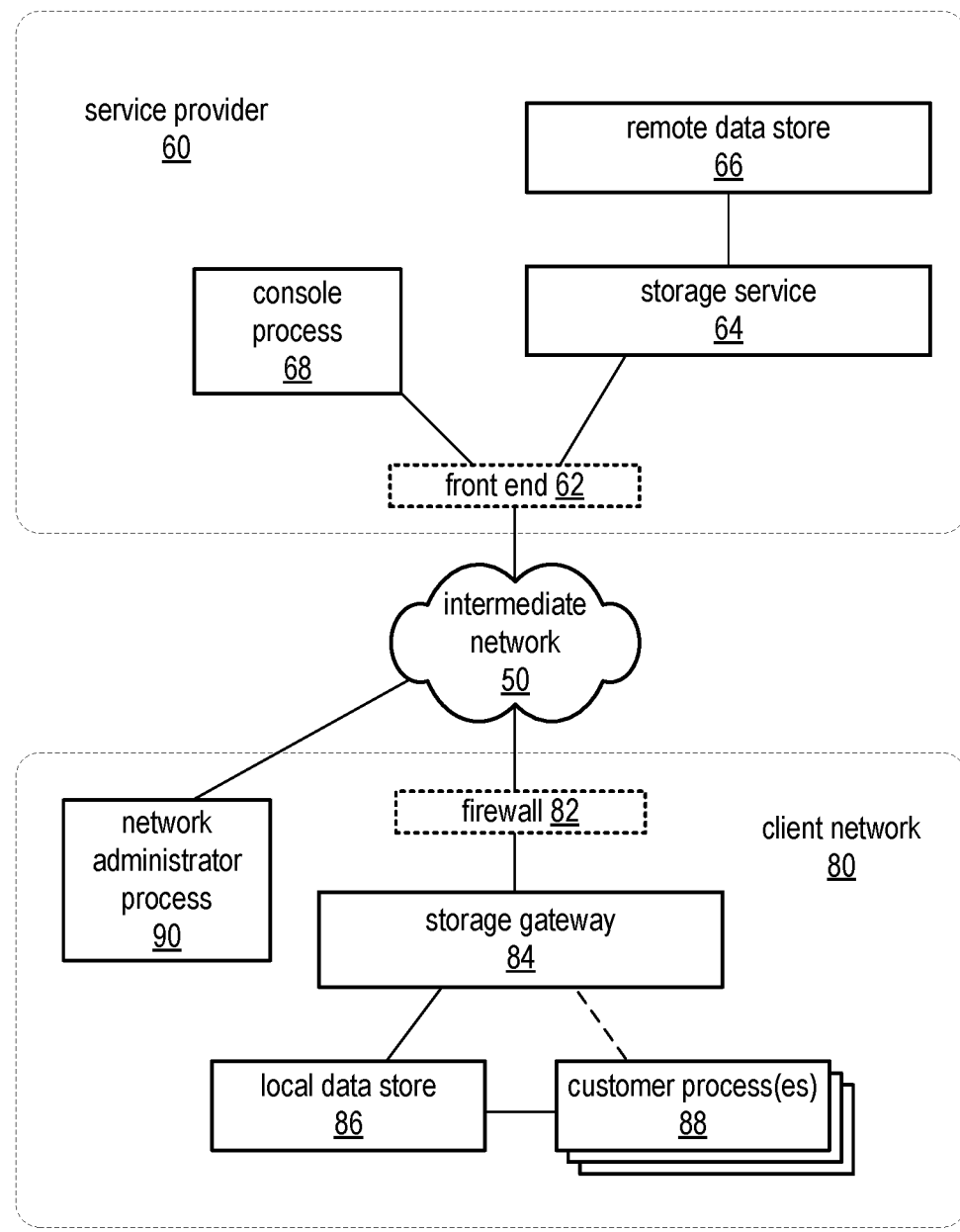
FIG. 1 is a high-level block diagram of an example networking environment that includes an example service provider and an example service customer, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods, apparatus, and computer-accessible storage media for providing a local gateway to remote storage are described. Embodiments of a storage gateway are described herein in the context of a service provider that provides, over an intermediate network such as the Internet, a storage service to one or more customers of the service provider. The storage gateway may be implemented as a virtual or physical appliance that is installed on-premise at a customer's data center and that acts as a gateway between the customer's data center and the storage service. The storage gateway may be configured as an interface to and local cache for a primary storage provided remotely via the storage service and/or as an interface that shadows primary storage implemented on the customer's network to remote storage provided by the storage service. The storage gateway may present standard data access interfaces to the customer's applications at the front-end of the appliance, convert the data accesses into storage service requests at the back-end of the appliance, and transfer the data over the network to the storage service according to the storage service interface. In at least some embodiments, the storage service interface may be implemented as a Web service interface.

Embodiments of the storage gateway may provide an on-premise interface to virtually unlimited, flexible, scalable remote storage provided via the storage service. The storage gateway may provide a cost-effective, flexible, and more easily scalable alternative to conventional on-premise storage solutions. While the cost of storage devices may be decreasing, the administrative and other hardware and software costs of conventional on-premise storage solutions have remained relatively constant, or in some cases increased. Embodiments of the storage gateway may allow customers of a service provider to lower the total cost of storage ownership, passing at least some administrative and other costs to the service provider.

In at least some embodiments, the storage service may store the customer's data in the remote data store according to block storage technology. In at least some embodiments, the storage gateway may expose block storage protocols (e.g., iSCSI, GNBD (Global Network Block Device), etc.), file storage protocols (e.g., NFS (Network File Storage), CIFS (Common Internet File System), etc.), and/or object storage protocols (e.g., REST (Representational State Transfer)) at the front-end to the customer's applications. A block storage protocol such as iSCSI enables direct access to the underlying data blocks of the remote data store.

Files written by an application to a remote data store via file storage protocols such as NFS or CIFS exposed by the storage gateway may be stored to the remote data store according to block storage technology. Through an exposed file storage protocol such as NFS and CIFS, the storage gateway presents the customer's data, stored in the remote data store according to block storage technology, to the customer's applications as files before they are transmitted from the gateway over the customer network to the customer's applications. The exposed block storage protocol, e.g. iSCSI, transfers the blocks to the customer's applications, thus requiring the application to handle interpretation of the data blocks into whatever format the application expects.

A block storage protocol such as iSCSI is a low-level block storage protocol, and thus may enable a wider range of use cases than file storage protocols such as NFS and CIFS. A block storage protocol may enable support for applications that typically write to a block store, such as Microsoft® SharePoint® and Oracle® databases, and may also be configured to provide underlying storage for CIFS or NFS file servers. Thus, in at least some embodiments of the storage gateway, a block storage protocol such as iSCSI may be employed as the exposed interface to customer applications.

FIG. 1 is a high-level block diagram of an example networking environment that includes an example service provider and an example service customer, according to at least some embodiments. A storage gateway 84 may be installed, activated, and configured as a virtual or physical appliance in the service customer local network or data center (e.g., client network 80) to provide one or more of several remote data storage functionalities to customer process(es) 88 on the client network 80. A customer process 88 may be any hardware, software, and/or combination thereof that exists on the client network 80 and that can connect to and communicate with the storage gateway 84 via the data protocol of the gateway 84's data ports (e.g., the iSCSI protocol). The storage gateway 84 may, for example, serve as an on-premise storage device and/or as an interface between the customer process(es) 88 on the client network 80 and a storage service 64 provided by service provider 60. Note that, in addition to a storage service 64, the service provider 60 may also provide other services, including but not limited to a hardware virtualization service, to customers of the service provider 60.

A customer of the service provider 60 may be referred to herein as a service customer or simply customer, and may be any entity that implements a computer network or networks, coupled to an intermediate network 50 such as the Internet, to provide networked computing services to one or more users on a local network or network, including one or more services remotely provided by service provider 60. A service customer may be a business enterprise, an educational entity, a government entity, or in general any entity that implements a computer network or networks that provide networked computing services to users. While FIG. 1 shows a single client network 80, there may be multiple client networks 80. Each client network 80 may correspond to a different service customer, or two or more client networks 80 may correspond to different data centers or localities of the same service customer, for example different regional offices of a business enterprise or different campuses of a school system. In at least some embodiments, each customer of the service provider 60 may have an account with the service provider 60, and may be provided with security credentials (e.g., an account name and/or identifier, password, etc.) via which one or more customer representatives (e.g., a client network administrator) may log in to interfaces (e.g., Web pages) to the service provider 60 to manage the customer's resources provided by one or more services, including but not limited to a storage service, offered by the service provider 60.

Figure 26:
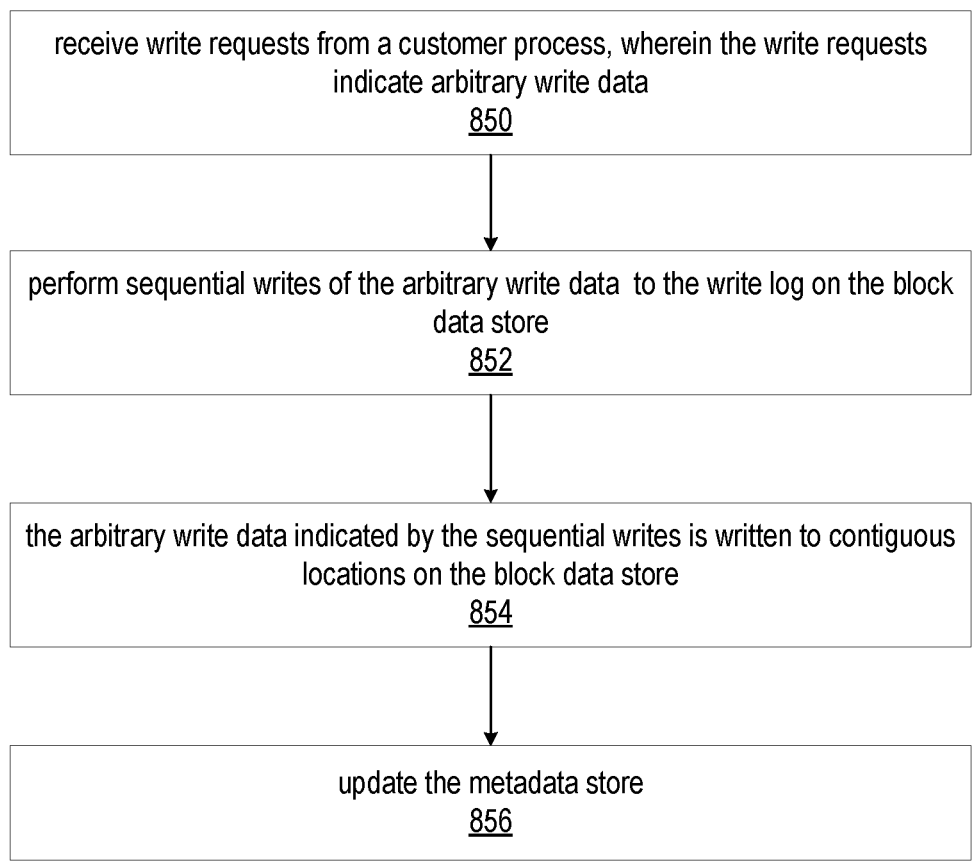
FIG. 26 is a flowchart of a method for writing to a write log on a block data store, according to at least some embodiments.

Embodiments of storage gateway 84 may be implemented in hardware, software, or a combination thereof. In at least some embodiments, storage gateway 84 may be implemented as a virtual appliance that may, for example, execute within a virtual machine instantiated on a host system. In at least some embodiments, storage gateway 84 may be implemented as a virtual appliance that may be downloaded or otherwise installed, activated, and configured on one or more computing devices such as server systems coupled to a local network infrastructure at a service customer's data center (e.g., client network 80). Alternatively, storage gateway 84 may be implemented as a dedicated device or appliance that may be coupled to a local network infrastructure at a service customer's data center (e.g., client network 80); the dedicated device or appliance may include software and/or hardware that implements the functionality of the storage gateway 84. FIG. 26 illustrates an example computer system on which embodiments of a storage gateway 84 may be implemented. In at least some implementations, storage gateway 84 communicates with the service provider 60 network via an intermediate network 50 (e.g., the Internet) through firewall 82 technology. Note that the service provider 60 network may also include front end 62 technology (e.g., firewall technology, border router technology, load balancer technology, etc.) through which network traffic from and to intermediate network 50 passes.

At least some embodiments of the storage gateway 84 may be implemented according to a security model that provides data protection for the customer as well as protection against misuse and unauthorized use (e.g., pirating) of the gateway 84 by the customer or third parties. Communications between the storage gateway 84 and the storage service 64 may be secured and encrypted. An activation process is described later in this document in which a newly installed storage gateway 84 initiates a connection with and is identified to the service provider 60 network to obtain security credentials. In at least some embodiments, during the activation process, the customer logs into the customer's account with the service provider 60 and provides information to the service provider 60 that is used in registering the gateway 84. However, the customer does not log in to the storage gateway 84, and therefore the customer's security credentials and other account information are not exposed on the gateway 84. This may minimize the security risk for the customer.

In at least some embodiments, an aspect of the security model is that the storage gateway 84 only accepts externally-initiated connections to one or more data ports (e.g., iSCSI ports) exposed to the customer process(es) 88 on the client network 80. The storage gateway initiates all other connections to external processes; external processes cannot initiate any other connections to the gateway. For example, in at least some embodiments, the storage gateway 84 initiates gateway management and other connections to the service provider 60; the service provider 60 does not initiate connections to the gateway 84. As another example, a client network 80's network administrator process 90 cannot directly connect to the storage gateway 84 to configure and manage the gateway 84. Instead, configuration and management of the storage gateway 84 by the network administrator process 90 may be performed through the service provider 60, for example via console process 68 on the service provider 60 network. Thus, in at least some embodiments, a user, network manager, or process (e.g., network administrator process 90 or customer process(es) 88) on the client network 80 cannot directly "log in" to the storage gateway 84, nor can a user, manager, or process on the service provider 60 network (e.g., console process 68 and storage service 64) or on some other external network initiate a connection to the storage gateway 84. This helps protect the security credentials and other operational information on the storage gateway 84 from being intentionally or unintentionally compromised by persons or processes on the client network 80 or by external persons or processes.

Embodiments of the storage gateway 84 may be installed, activated, and configured for use with a storage service 64 to provide one or more of several data store 66 functionalities. For example, a storage gateway 84 may be installed, activated, configured, and employed with a storage service 64 to serve as:

A file system gateway. In this configuration, the storage gateway serves as a NAS storage interface (e.g., using CIFS or NFS protocols) to the storage service 64. The remote data store 66 may be presented to the customer by the gateway 84 as an object store (e.g., REST), while the data store 66 is implemented according to block storage technology. In this configuration, the remote data store 66 may be presented to the customer as a virtualized file system to which the customer can write files and from which the customer can read files.

A cloud volume gateway. In this configuration, the storage gateway 84 serves as an interface to volume(s) implemented on remote data store 66 via the storage service 64. The remote data store 66 may be implemented using block storage technology. The gateway 84 provides local network access points, with the volume(s) on remote data store 66 (which may also be referred to as a cloud volume) serving as backend storage that provides flexible and essentially unlimited primary storage capacity. In this configuration, the remote data store 66 may be presented to the customer as a cloud volume system from which the customer can locally mount volumes for reading and writing data.

A shadowing gateway. In this configuration, the storage gateway 84 acts as a "bump in the wire" between a customer's applications (e.g., customer process(es) 88) and the customer's local data store 86 to provide shadowing of the customer's write data (e.g., iSCSI writes) to remote data store 66 via the storage service 84. The remote data store 66 may be implemented using block storage technology. In this configuration, the storage gateway 84 may serve as a shadowing appliance that shadows the customer's local data store to snapshot(s) on the remote data store 66. This shadowing may be performed transparently from the perspective of users on the local network. When necessary or desired, the customer may request or access snapshot(s) of the customer's data on the remote data store 66, for example to restore, recover, or copy portions or all of the customer's data from the snapshot(s) to a local store 86.

Note that the file system gateway and the cloud volume gateway are similar in that both serve as gateways to a remote data store, and both may locally cache data, e.g. frequently and/or recently used data. In both the file system gateway and the cloud volume gateway, data reads from customer processes may be serviced from the local cache, if possible, or from the remote data store if not. In contrast, in the shadowing gateway, data reads are passed through the gateway to the customer's local data store. For the purposes of this document, the file system gateway and cloud volume gateway may collectively be referred to as a cached gateway to distinguish these implementations from the shadowing gateway.

Example Storage Gateway Appliance Architecture

Figure 2:
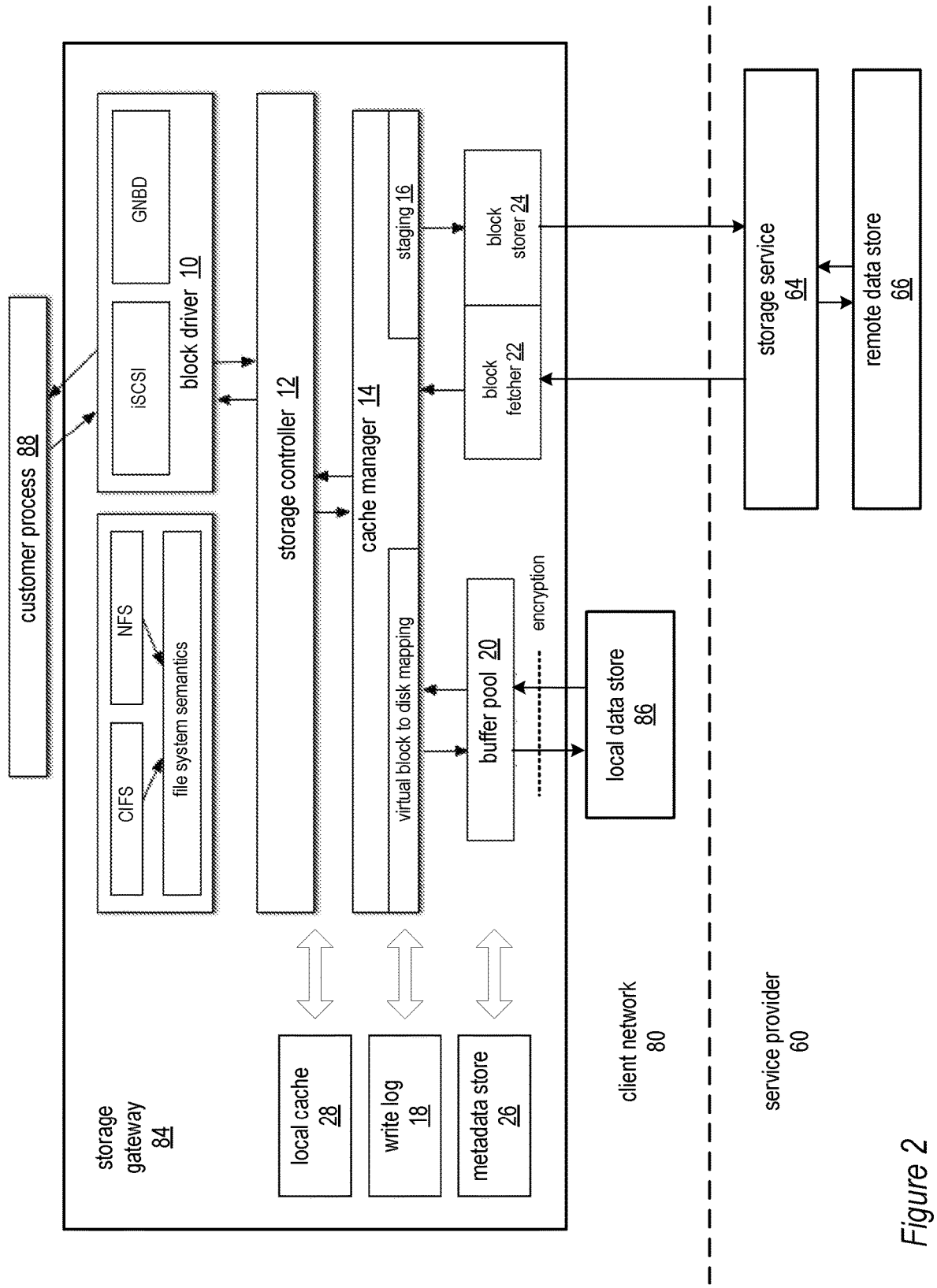
FIG. 2 illustrates an example architecture for and components of a storage gateway according to at least some embodiments.

FIG. 2 illustrates an example architecture for and components of a storage gateway according to at least some embodiments. Note that some of the components illustrated in FIG. 2 may not be used, or may be used or implemented differently, in shadowing gateway implementations when compared to cached gateway implementations.

Block driver 10 interfaces a customer process 88 with the storage gateway 84. generally, block driver 10 allows a customer process 88 to interact with the storage gateway 84 (e.g., via read/write requests). Since the storage gateway 84 is on-site with the customer process 88, from the perspective of the process 88 it appears that data is stored locally. However, the storage gateway 84 interfaces with storage service 64 to store the data to a remote data store 66 provided by the storage service 64. For cached gateways, the primary data store is remote data store 66, while frequently accessed data may be locally cached by the gateway 84. Reads may be satisfied from the local cache or from virtual data storage 66; writes are handled so as to appropriately update data blocks in the local cache and/or in virtual data storage 66. For shadowing gateways, the primary data store is local data store 86; reads are passed through to local data store 86, and writes are shadowed to virtual data storage 66 as well as being sent to local data store 86.

Block driver 10 intercepts read/write requests from the customer process 88 and passes the requests to the storage controller 12. In at least some embodiments, block driver 10 may provide a block storage protocol (e.g., iSCSI or GMBD) as an interface to the customer process 88. In some embodiments, instead of or as an alternative to a block storage protocol interface, block driver 10 may provide a file storage protocol interface (e.g., NFS or CIFS) and may use file system semantics as an interface to the storage controller 12. Note that, while FIG. 2 shows one block driver 10, there may be more than one block driver.

Storage controller 12 acts as a mediator between block driver 10 and storage via a cache manager 14. Responsibilities of storage controller 12 may include forwarding read and write requests from block driver 10 to storage and callbacks to block driver 10 when storage responds with data. Block driver 10 may also maintain statistics such as the number of requests in progress.

In at least some embodiments, storage controller 12 on one storage gateway 84 may communicate with a cache manager 14 on another storage gateway 84. In at least some embodiments, each storage gateway 84 may send heartbeat messages for discovery and detecting failures. A consistent hashing may be used to identify the storage gateway 84 that is responsible for a given object, and the request to get data may be forwarded to the cache manager 14 on the target storage gateway 84. The cache manager 14 may respond by invoking a callback provided by storage controller 12.

In cached gateway embodiments, cache manager 14 may manage a local cache 28 that, for example, provides storage for frequently accessed data. Local cache 28 may be implemented on internal volatile and/or non-volatile memory of storage gateway 84, or alternatively may be implemented at least in part on an external local data store 86 provided by the customer. In at least some embodiments, the local cache 28 represents data stored in the virtualzied data storage 66; writes from a customer process 88 may not directly affect the local cache 28.

In at least some embodiments employing multiple gateways 84, a distributed local cache may be used, and consistent hashing on keys may be used to identify the cache responsible for holding a given key. In at least some embodiments, locality-aware request distribution may be used to reduce communication between the gateways 84, which may require additional load balancing.

All write requests to a given volume in the remote data store 66 may go to a particular gateway 84 node. Since all write requests for a volume are forwarded to a particular gateway 84 node, network partitioning may not be an issue.

Staging

In at least some embodiments, the cache manager 14 may include or may interface with a staging 16 component. Staging 16 may include or may have access to a write log 18. In at least some embodiments, a data structure may be built over the write log 18 and used as a metadata store 26. The metadata store 26 may allow quick access to all writes to a particular block. The metadata store 26 may, for example, be used in applying mutations to different segments within the block. When write data is received from the customer process 88, the data is appended to the write log 18. Metadata for the write data relative to a block, e.g. offset and length, may be stored to the metadata store 26. In at least some embodiments, write log 18 may be implemented as a one-dimensional data buffer implemented as either a linear or a circular queue. In at least some embodiments, metadata store 26 may be a key/value store, for example implemented as a Berkeley Database. Other implementations of both the write log 18 and the metadata store 26 may be used in some embodiments.

In cached gateway implementations, when a read is performed, the original block may be obtained from the local cache 28 or from the remote data store 66, and any pending mutations indicated by the write log 18 may be applied before returning the data to the respective customer process 88.

In some embodiments, if a gateway 84 fails (e.g. crashes), in-memory write data may be lost unless the data has already been written to the local data store 86. In some embodiments, if there are multiple gateways 84 at the customer site, another gateway 84 may take responsibility of keys owned by the crashed gateway 84, restore writes from a snapshot on local data store 86 if there are any, and start accepting requests directed to the respective volume. In some embodiments, a write log 18 and/or metadata store 26 may be replicated over two or more gateways 84 to provide redundancy and better durability. In case of failure of the gateway 84, one of the other gateways 84 may take over the failed gateway's write log 18 and metadata store 26. However, in at least some embodiments, the metadata store 26 may be maintained only on the owner gateway 84. In these embodiments, in case of failure of the gateway 84, one of the other gateways 84 may take over and parse the primary write log 18 to rebuild the metadata store 26.

In cached gateway implementations, block fetcher 22 fetches required segments of blocks from remote data store 66 via storage service 64. In at least some embodiments, block fetcher 22 may employ a lazy fetching technique to fetch complete blocks for caching. For both cached gateways and shadowing gateways, block store 24 pushes data from staging 16 to remote data store 66 via storage service 64. In at least some embodiments, block store 24 may employ a lazy pushing technique to push the blocks.

In at least some embodiments, during read operations for cached gateways, block driver 10 sends the read request including a volume ID, start offset and length to storage controller 12. In at least some embodiments, storage controller 12 may translate the volume ID and offset to to an object key. Storage controller 12 may pass the read request information to cache controller 14, which may attempt to satisfy the read request from an appropriate local cache 28. If the data are not present in the local cache 28, the request is forwarded to block fetcher 22, which fetches the data from the appropriate volume on remote data store 66 via storage service 64. Once the data is obtained, local cache 28 is updated, mutations from write log 18 are applied, and a read response is returned to customer process 88. In at least some embodiments, if multiple blocks are requested, multiple read responses may be returned each indicating a relative offset for a respective block. In at least some embodiments, if sequential reads are detected, sequential blocks may be prefetched.

In at least some embodiments, during write operations, block driver 10 sends the write request including a volume ID and the write data to the storage controller 12 that is responsible for the volume. The write data is written to the write log 18, and metadata store 26 is updated to include a reference to the mutated data in buffer pool 20.

Buffer Pool

In at least some embodiments, a buffer pool 20 resides between storage controller 12 and local data store 86. Buffer pool 20 may perform one or more of, but not limited to, the following tasks. Note that some tasks may apply only to cached gateways:

Cache data for the logical offsets for write log 18 and local cache 28 from their physical locations on local data storage device(s).

Maintaining locks on buffers during read and write operations.

Applying an eviction technique, e.g. a least recently used (LRU) based eviction technique, on the physical storage for local cache 28. Note that this is not required for shadowing gateways.

For reads in cached gateways, if the requested data is not found in local cache 28, buffer pool 20 may communicate with block fetcher 22 to fetch the block from remote data store 66. Alternatively, in some embodiments, block fetcher 22 may communicate directly with storage service 64 to fetch blocks.

In at least some embodiments, buffer pool 20 may employ a database, for example a Berkeley database (BDB), as its metadata store 26. Table 1, shown below, shows information that may be stored in a metadata store 26, according to at least some embodiments. Note that the entries in Table 1 are not intended to be limiting according to content or arrangement.

TABLE 1

Example metadata store information

| Physical Disk/Offset | Type | Name | Offset | Last Used |
|---|---|---|---|---|
| <sdg/xxxxx> | F (Free) | N/A | N/A | N/A |
| <sdg/xxxxx> | B (Bad) | N/A | N/A | N/A |
| <sdg/xxxxx> | W (Write log) | N/A | write log offset | <time> |
| <sdg/xxxxx> | S (Snapshot) | snapshot ID | offset in volume | <time> |
| <sdg/xxxxx> | C (Chunk) | chunk ID | offset in volume | <time> |

In at least some embodiments, the physical disk offset is at a set boundary, for example at a 4 MB boundary. In at least some embodiments, this includes boundaries for data in both the volumes and in the write log 18. In at least some embodiments, the writes for a specific volume may be sequential writes, and thus fragmentation on disk may not need to be considered. Note that a "chunk" may correspond to a block, or to one or more blocks.

Note that the metadata store 26 may include both S (snapshot) and C (chunk) entries, and these need to be kept up-to-date with the scheme via which the storage controller 12 attempts to access blocks. For example, a block may be referred the first time using a snapshot ID, but every time after that using the chunk ID. This may be preserved in the metadata store 26. Upon a Snapshot Complete, storage controller 12 may refer to the blocks from the snapshot using the snapshot ID; hence, the C (chunk) entries in metadata store 26 may be converted into corresponding S (snapshot) entries.

Cached Gateway Operations

In at least some embodiments, when a read request is received, the write log 18 entry or entries for the block are looked up in the metadata store 26. If the read request can be satisfied using the write log 18 entry or entries, then all required entries are looked up in the metadata store 26, read into buffers, flattened, and the required pieces are returned. If the read request cannot be satisfied only using the write log 18 entry or entries, the offset for the cahce data block (e.g., a 4 MB block) is calculated from the offset in the read request. The location of the block is looked up in the metadata store 26. If the block is in local cache 28, the block is read from the local cache 28, and if not it is fetched from remote data store 66. The required write log 18 entries are fetched as described above, flattened with the block, and and the required pieces are returned. If the block is fetched from remote data store 66, the block is cached to local cache 28 and recorded in the metadata store 26. The last access time for the block in the local cache 28 is also updated.

In at least some embodiments, when a write request is received, the mutations are recorded at the next write log 18 offset and the metadata, i.e. offset and length, is recorded in the metadata store 26.

In at least some embodiments, when a block upload completes, the latest version of the block (with the applied mutations) is added to the local cache 28 and recorded in the metadata store 26. If a previous version of the block is present in local cache 28, this block is marked as free in metadata store 26.

In at least some embodiments, when a snapshot completes, the metadata store 26 may need to be reorganized as described above. That is, the block entries belonging to the snapshot may be converted into the corresponding snapshot entries on the remote data store 66.

Shadowing Gateway Operations

In at least some embodiments, read requests are passed through to local data store 86.

In at least some embodiments, when a write request is received, the write data is recorded at the next write log 18 offset and the appropriate metadata for the write isrecorded in the metadata store 26. The write request is also passed to the local data store 86.

In at least some embodiments, to upload a block to remote data store 66, an upload process calls buffer pool 20 to read the write log 18. The buffer pool 20 uses metadata store 26 to perform the translation from the logical write log 18 offset to the physical offset, and the data is then read into memory buffers. The buffers are then presented to the upload process. The upload process uploads the blocks to the remote data store 66 and releases the blocks to the buffer pool 20.

Write Log Purges

In at least some embodiments, if the write log 18 needs to be purged, buffer pool 20 obtains a write log offset for a volume for which the write log 18 can be purged. In at least some embodiments, the write log offset may be determined from metadata store 26, for example by performing a walk over the database which checks offsets for each entry. To purge the write log 18, the existing write log entries corresponding to the purgeable part of the log may be marked as free entries.

Example Implementations

Figure 3:
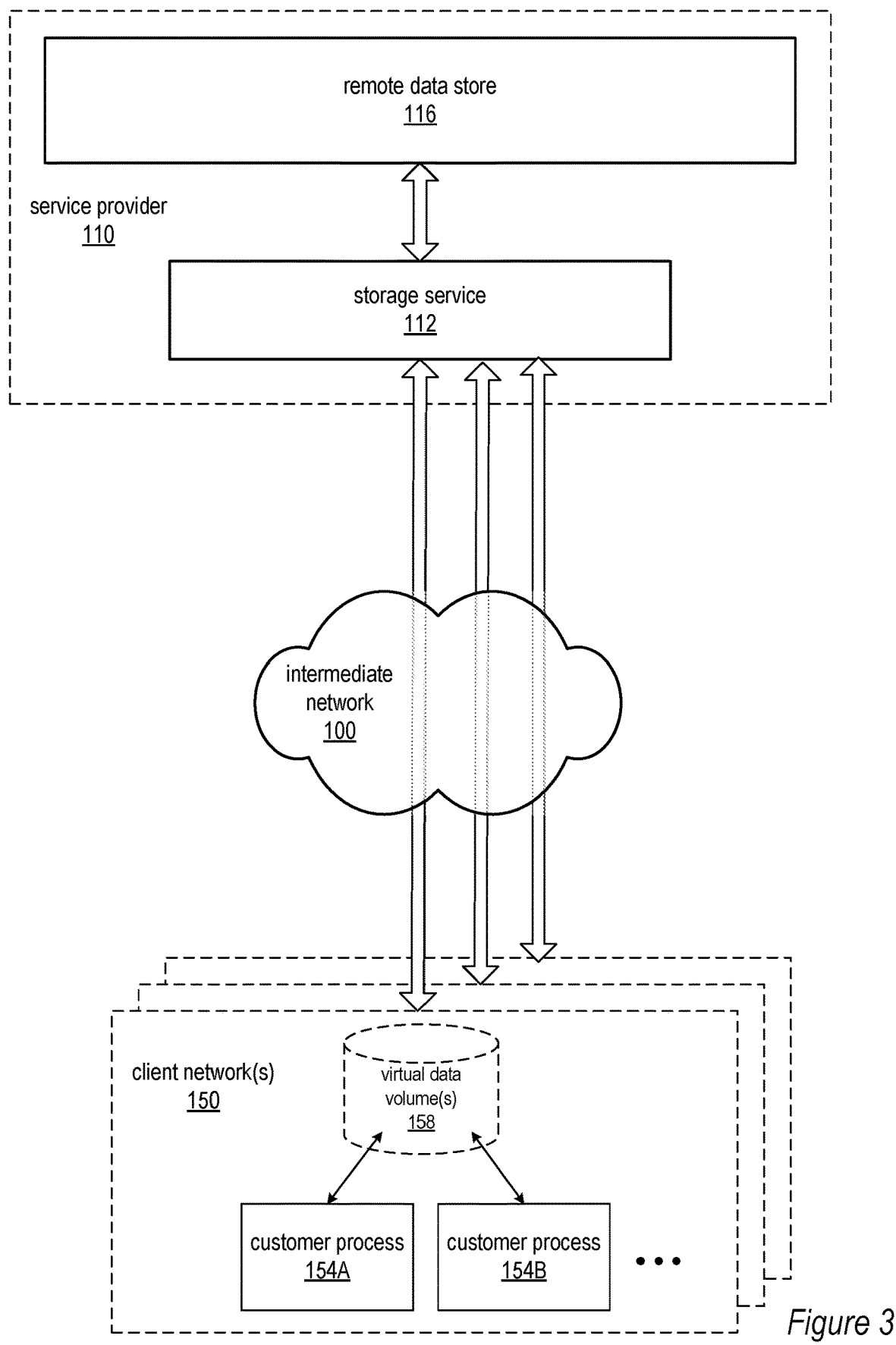
FIG. 3 is a high-level block diagram of an example network environment in which embodiments of a storage gateway may be implemented.

FIG. 3 is a high-level block diagram of an example network environment in which embodiments of a storage gateway may be implemented. A service provider 110 on an intermediate network 100 (e.g., the Internet) may provide one or more service customer networks (e.g., client network(s) 150), also coupled to intermediate network 100, access to a remote data store 116 via a storage service 112. Each client network 150 may correspond to a different service customer, or two or more client networks 150 may correspond to different data centers or localities of the same service customer, for example different regional offices of a business enterprise or different campuses of a school system. A service customer may be a business enterprise, an educational entity, a government entity, a private entity, or in general any entity that implements a computer network or networks, coupled to an intermediate network 100 such as the Internet, to provide networked computing services to one or more users. In some embodiments, storage service 112 may provide an interface, for example a Web service interface, via which each service customer's client network(s) 150 may access functionality provided by the storage service 112.

Customer processes 154A and 154B represent physical and/or virtual machines or systems connected to a client network 150 of a service customer. As an example of a function provided by storage service 112, a user, via a customer process 154, may create and mount data volumes in remote data store 116 via storage service 112. From the perspective of users on a client network 150, the data volumes provided by storage service 112 may appear as if they are local storage; hence, such a data volume may be referred to as a virtual data volume 158. A virtual data volume 158 actually maps to one or more physical storage devices or storage systems on which remote data store 116 is instantiated; however, this mapping is handled by the storage service 112, and is thus transparent from the perspective of the users on the client network 150. A user of a customer process 154 may simply see a volume mounted on the desktop or in a device listing. The user of a customer process 154 may create data, modify data, delete data, and in generally perform any data-related function on virtual data volume 158, just as if the volume 158 was implemented on a locally attached storage device.

Figure 4:
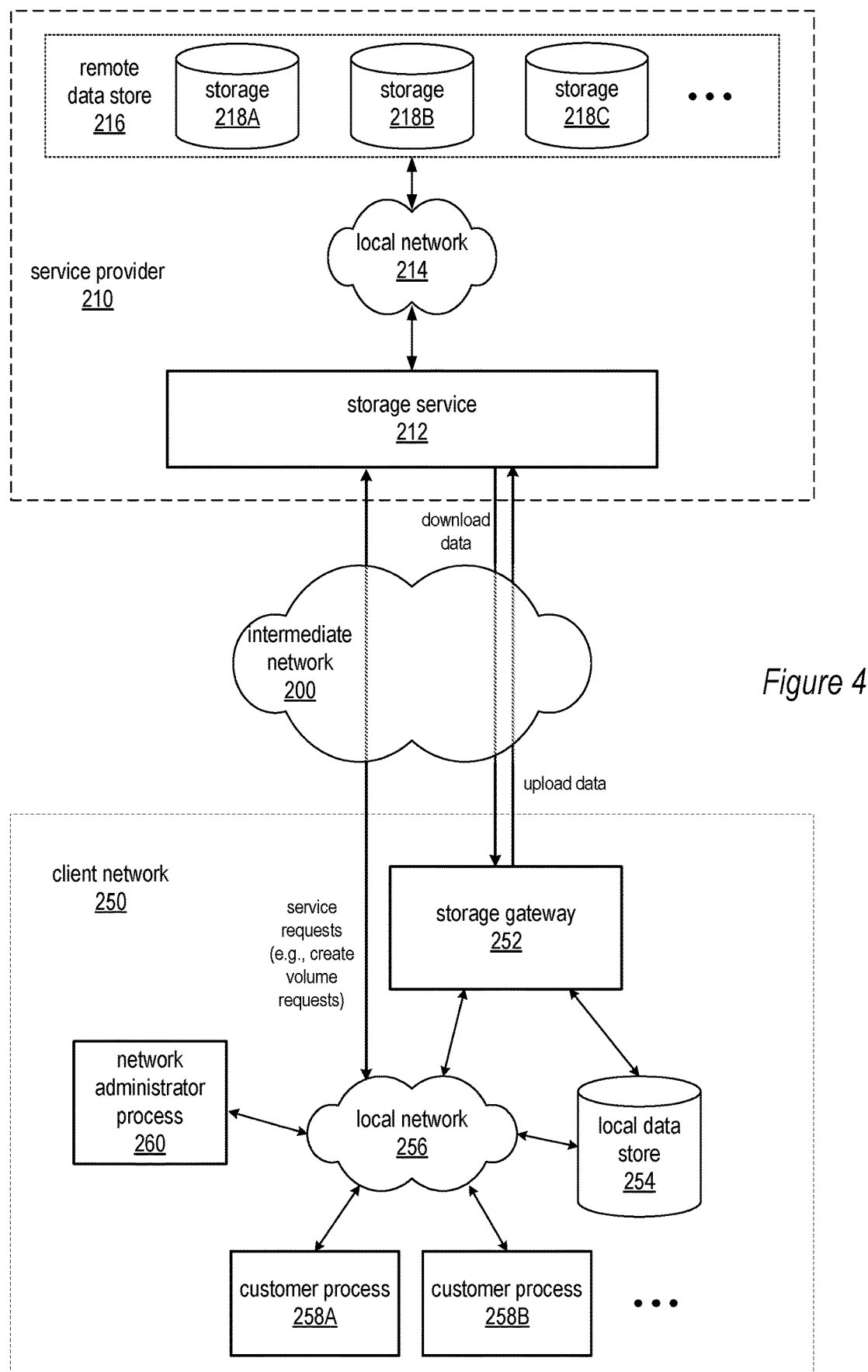
FIG. 4 is a block diagram of an example network environment that includes a storage gateway on site at a service customer network that serves as an interface between the service customer network and a storage service on a service provider network, according to at least some embodiments.

FIG. 4 is a block diagram of an example network environment that includes a storage gateway 252 on site at a service customer's client network 250 that serves as an interface between client network 250 and storage service 212, according to at least some embodiments. In at least some embodiments, storage gateway 252 may be a file and/or block storage appliance that is installed on-site at a service customer's data center.

Storage gateway 252 may, for example, be installed, activated, and configured to serve as a file system gateway, as a cloud volume gateway, collectively referred to as cached gateways, or as a shadowing gateway. A file system gateway serves as a NAS storage interface (e.g., using CIFS or NFS protocols) to the storage service 212. The remote data store 216 may be presented to the customer as an object store (e.g., REST), while actually implemented as block storage. A cloud volume gateway serves as an interface to virtualized volume storage provided by the storage service 212. The volume storage may be implemented as block storage. The gateway 252 provides local network access points, with the remote data store 216 (which may also be referred to as a cloud volume) serving as backend storage that provides flexible and essentially unlimited primary storage capacity. A shadowing gateway acts as a "bump in the wire" between a customer's applications and the customer's local data store to provide shadowing of the customer's write data (e.g., iSCSI writes) to remote storage provided by the storage service 212. The remote data store 216 may be implemented as block storage.

In cached gateway implementations, storage gateway 252 may store a local cache of frequently accessed data on a local data store 254, while securely encrypting and accelerating data movement back to service provider 210. Similarly, shadowing gateway implementations may securely encrypt and accelerate the movement of write data to service provider 210. This accelerated data movement, as compared to a standard Internet connection, may, for example, be achieved using one or more of data deduplication, compression, parallelization, and TCP window scaling techniques. Storage gateway 252 may significantly reduce the cost, utilization, maintenance, and provisioning headaches that are typically associated with managing on-site storage arrays as primary storage or backup storage. Storage gateway 252 may accomplish this by replacing the 100s of terabytes to petabytes of data a customer may otherwise store in-house on expensive hardware, e.g. NAS or SAN hardware, with a cost-effective appliance. With the storage gateway 252, customers may benefit from the low access latencies of on-site storage (provided by the local cache maintained by the gateway 252 in cached gateway implementations) while leveraging the durable, available, and scalable distributed storage infrastructure provided by the service provider 210.

Embodiments of the storage gateway 252 may work seamlessly with customers' on-site applications. In at least some embodiments, customers may configure the storage gateway 252 to support SAN (iSCSI), NAS (NFS, Microsoft® CIFS), or Object (REST) storage. In at least some embodiments, an iSCSI interface provided by the storage gateway 252 may enable integration with on-site block storage applications such as Microsoft® SharePoint® and Oracle® databases. In at least some embodiments, customers may utilize NFS and CIFS interfaces provided by the storage gateway 252 to consolidate file storage across environments including, but not limited to, Windows, Linux, and UNIX environments. In at least some embodiments, the storage gateway 252 may also be configured to support REST-based requests.

In at least some embodiments, storage gateway 252 may be implemented as a virtual device or appliance that may be downloaded or otherwise installed, activated, and configured on one or more computing devices such as server systems coupled to the client network 250 infrastructure at a customer data center. Alternatively, storage gateway 252 may be implemented as a dedicated device or appliance that may be coupled to the client network 250 infrastructure; the dedicated device or appliance may include software and/or hardware on which functionality of the gateway may be implemented.

In at least some implementations, storage gateway 252 communicates with the service provider 210 network via an intermediate network 200 (e.g., the Internet). The coupling of storage gateway 252 to intermediate network 200 may generally be via a high-bandwidth connection provided by the service customer's client network 250, as large amounts of data may be transferred across intermediate network 200 between storage service 212 and storage gateway 252. For example, at peak times, the connection may need to support the transfer of data at rates of 100 megabits/second (100 Mbit/s) or higher. However, in at least some embodiments, techniques such as a data deduplication technique may be employed to reduce bandwidth usage when uploading data from storage gateway 252 to storage service 212, and thus more of the connection's bandwidth may be available for other applications. Example data deduplication techniques that may be employed in at least some embodiments are described in U.S. patent application Ser. No. 12/981,393, titled "RECEIVER-SIDE DATA DEDUPLICATION IN DATA SYSTEMS," which is hereby incorporated by reference in its entirety, and in U.S. patent application Ser. No. 12/981,397, titled "REDUCED BANDWIDTH DATA UPLOADING IN DATA SYSTEMS," which is hereby incorporated by reference in its entirety.

In at least some embodiments, bandwidth on a connection between client network 250 and service provider 210 over intermediate network 200 may be allocated to storage gateway 252, and to other customer applications, for example via a network administrator process 260 at client network 250. Storage gateway 252 may continuously or nearly continuously upload mutated (new or changed) data to storage service 212, for example according to a data deduplication technique. However, the mutation rate of data at client network 250 may vary over time; for example, during the day, the customer process write throughput may be higher, while at night the write throughput may be lower. Thus, at busy times when the mutation rate is high, storage gateway 252 may fall behind in uploading the mutated data if the bandwidth allocated to the storage gateway 252 is not high enough to keep up; storage gateway 252 may then catch up at less busy times when the mutation rate is not as high. In at least some embodiments, if the storage gateway 252 falls behind more than a specified threshold, the storage gateway 252 may request the allocation of additional bandwidth. In at least some embodiments, the storage gateway 252 may raise an alarm to demand more bandwidth, if necessary.

While FIG. 4 shows a direct connection between storage gateway 252 and storage service 212, note that the connection between storage gateway 252 and storage service 212 may go through local network 256.

In at least some embodiments of a storage gateway 252, rather than retrieving data from remote data store 216 on demand, large blocks or chunks of data, even entire volumes of data, may be locally cached to a local data store 254. Storage gateway 252 may include or may have access to physical data storage and/or memory (local data store 254) on which a local cache of data, for example frequently-accessed data or critical data, may be maintained. Local data store 254 may be volatile or non-volatile storage or memory, or a combination thereof. Maintaining a local cache of frequently accessed data may generally improve data access times for customer processes 258, since many or most data accesses can be serviced from the local cache, rather than retrieving the data from remote data store 216. However, remote data store 216 may serve as the primary data store for the service customer's client network 250; thus, storage gateway 252 may communicate with storage service 212 via an intermediate network 200 to periodically, aperiodically, or continuously upload new or modified data from the local cache to remote data store 216, and to download requested data from remote data store 216 when necessary.

In FIG. 4, storage (218A, 218B, 218C, ... ) of remote data store 216 illustrates that the remote data store 216 may be implemented on or across several storage devices or systems connected to a local network 214 of service provider 210. Thus, a service customer's data may be spread across two or more physical storage devices or systems on the "back end." The back end storage devices may be, but are not necessarily, multi-tenant devices that are shared with other customers. However, as noted in reference to FIG. 3, from the perspective of the users and processes on client network 250, the client's data may be presented as virtual volumes or files.

In at least some embodiments, a service provider as described in reference to FIGS. 3 and 4 may also provide hardware virtualization technologies and possibly other virtualization technologies to customers. A service provider 200 may provide a range of virtualized computing technology and virtualized storage technology, including block storage technology that provides block storage capabilities (i.e., a block-based storage system) to customers. Virtual computing environments or systems, implemented according to the hardware virtualization technology provided by the service provider 200, may be supported by the block storage technology. The block storage technology may provide a virtualized storage system that, for example, is able to interact with virtual computing systems through standardized storage calls that render the block-level storage functionally agnostic to the structural and functional details of the volumes that it supports and to the operating systems executing on the virtual computing systems (or other systems) to which it provides storage availability.

Embodiments of a storage gateway 252 may integrate with on-site customer applications and the virtualized computing and storage technology provided by service provider 200, providing customers with access to elastic "cloud-based" computing and storage resources. For example, customers using the storage gateway 252 for SAN storage may create consistent, point-in-time block-based snapshots of their data. These snapshots may then be processed by hardware virtualization technology applications or instances (see, e.g., virtual computing system(s) 264 in FIG. 5) requiring the high I/O and low latency data access that a block-based storage system provides. As another example, customers may configure the storage gateway 252 for NAS storage via NFS or CIFS file protocols, and may create point-in-time snapshots of their file data accessible from hardware virtualization technology instances.

In some embodiments, objects written using a REST-based interface provided by storage gateway 252 may be accessed directly from virtualized storage technology provided by the service provider via HTTP or other protocols, or may be distributed using integrated content delivery technology provided by the service provider. In some embodiments, customers may also utilize highly scalable, distributed infrastructure provided by the virtualized storage technology for parallelized processing of these objects on hardware virtualization technology instances.

Figure 5:
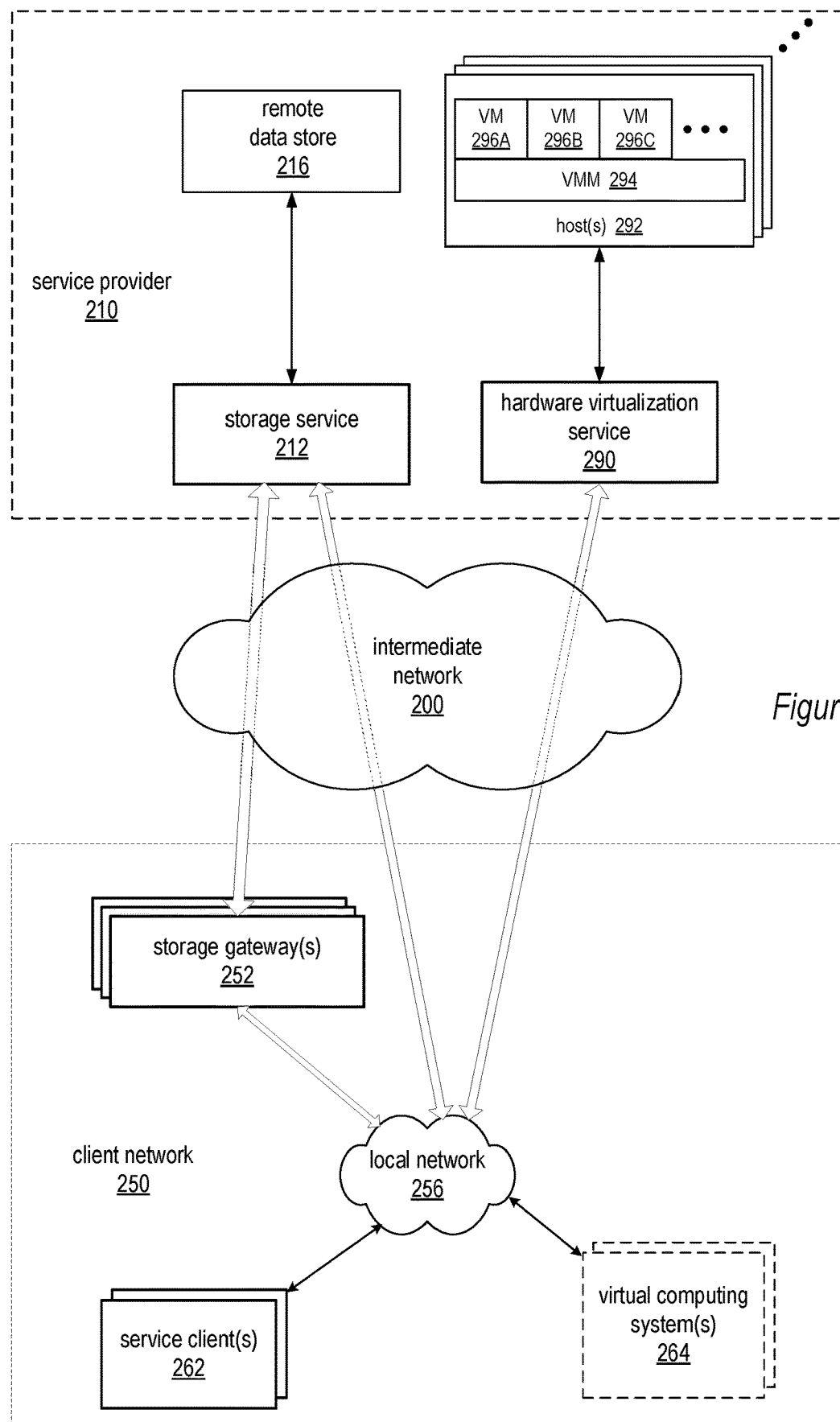
FIG. 5 is a block diagram of an example service provider that provides a storage service and a hardware virtualization service to customers of the service provider, according to at least some embodiments.

FIG. 5 is a block diagram of an example service provider that provides a storage service and a hardware virtualization service to customers of the service provider, according to at least some embodiments. A service customer's client network 250 may include one or more storage gateways 252 that serve as interfaces between client network 250 and storage service 212 of service provider 210, for example as described in reference to FIG. 4. Service client(s) may represent any administrator, user, or process that may access one of the services provided by service provider 210.

Hardware virtualization technology may enable multiple operating systems to run concurrently on a host computer 292, i.e. as virtual machines (VMs) 296 on the host 292. The VMs 296 may, for example, be rented or leased to the customers of the service provider 210. A hypervisor, or virtual machine monitor (VMM) 294, on a host 292 presents the VMs 296 on the host 292 with a virtual platform and monitors the execution of the VMs 296. Each VM 296 may be provided with one or more IP addresses; the VMM 294 on a host 292 may be aware of the IP addresses of the VMs 296 on the host. A local network of service provider 210 may be configured to route packets from the VMs 296 to Internet destinations (e.g., to service client(s) 262 on client network 250), and from Internet sources (e.g., service client(s) 262) to the VMs 296.

Service provider 210 may provide a service customer's client network 250, coupled to intermediate network 200 via local network 256, the ability to implement virtual computing systems 264 via a hardware virtualization service 290 coupled to intermediate network 200 and to the local network of service provider 210. In some embodiments, hardware virtualization service 290 may provide an interface, for example a Web service interface, via which a service client 262 may access functionality provided by the hardware virtualization service 290. At the service provider 210, each virtual computing system 264 may represent a virtual machine (VM) 296 on a host 292 system that is leased, rented, or otherwise provided to a service customer.

From an instance of a virtual computing system 264, a user may access the functionality of storage service 212 as previously described. Thus, embodiments of a virtualized system as illustrated in FIG. 5 may allow a client to create local instances of virtual computing systems 264 implemented on VMs 296 provided by the service provider 210, and to access data from and store data to a remote data store 216 implemented by the service provider 210, from the local instances of the virtual computing systems 264.

As previously described, one or more storage gateways 252 may be instantiated at the client network 250. At least one of the gateways 252 may be a cached gateway implementation that locally caches at least some data, for example frequently accessed or critical data. The storage gateway(s) 252 may communicate with storage service 212 via one or more high-bandwidth communications channels, for example to upload new or modified data from the local cache so that the primary store of data (the remote data store 216) is maintained in cached gateway implementations, or to upload new or modified data (write data) to a snapshot of a local primary data store on remote data store 216 in shadowing gateway implementations.

Cached Gateway Implementations

Figure 6:
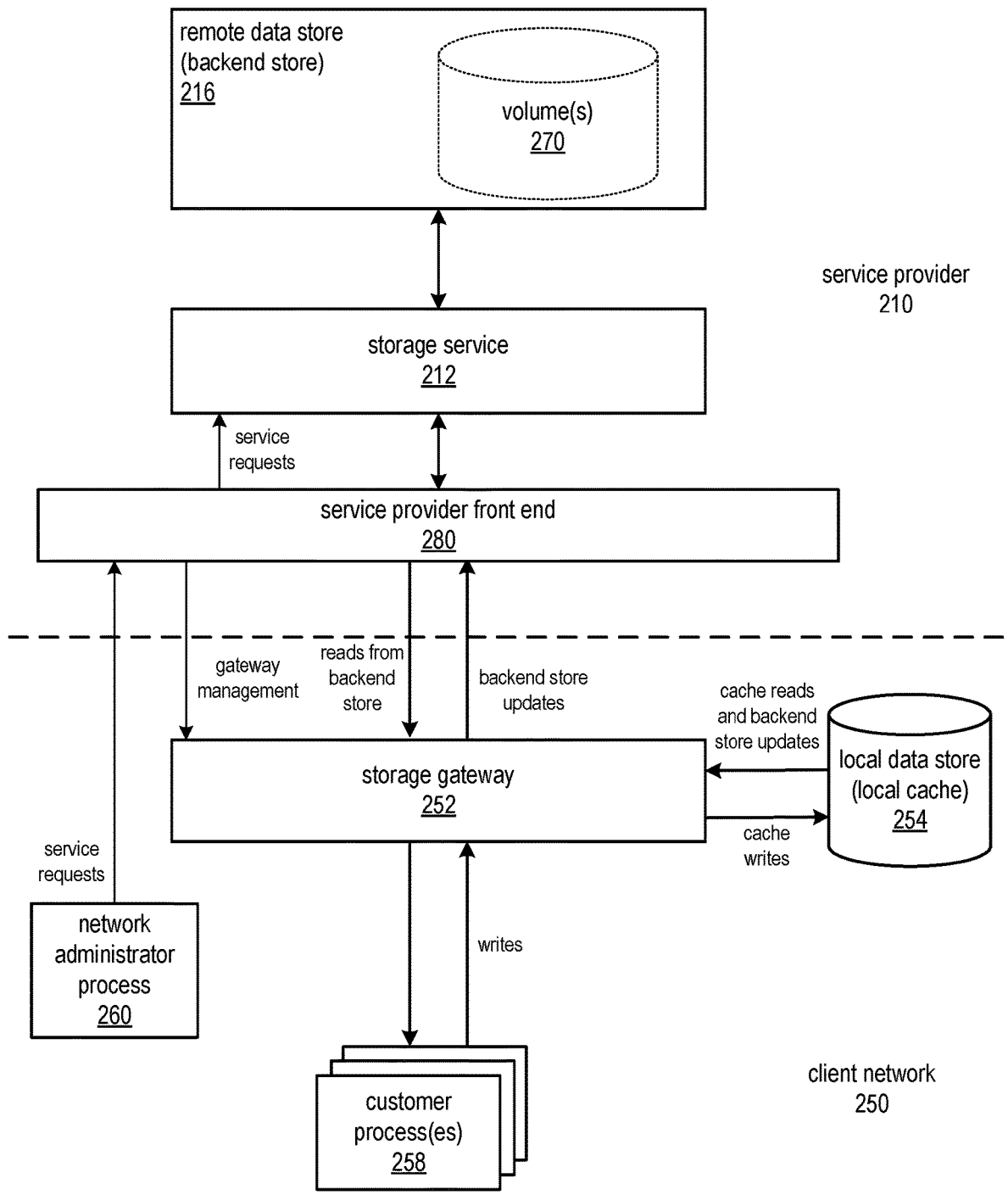
FIG. 6 is a high-level block diagram that broadly illustrates the architecture of and data flow in an example network environment in which an embodiment of a storage gateway is configured as a cached gateway.

FIG. 6 is a high-level block diagram that broadly illustrates the architecture of and data flow in an example network environment in which an embodiment of a storage gateway is configured as a file system gateway or as a cloud volume gateway, which may be collectively referred to as cached gateways. In at least some embodiments, storage gateway 252 may be a file and/or block storage appliance that is installed on-site at a service customer's data center. In FIG. 6, storage gateway 252 may, for example, be installed, activated, and configured to serve as a file system gateway or as a cloud volume gateway. A file system gateway serves as a NAS storage interface (e.g., using CIFS or NFS protocols) to the storage service 212. The remote data store 216 may be presented to the customer as an object store (e.g., REST), while implemented as block storage. A cloud volume gateway serves as an interface to virtualized volume storage provided by the storage service 212. The virtualized volume storage may be implemented as block storage. The gateway 252 provides local network access points, with the remote data store 216 (which may also be referred to as a cloud volume) serving as backend storage that provides flexible and essentially unlimited primary storage capacity.

Once storage gateway 252 is installed, activated, and configured, a network administrator process 260 of client network 250 may, for example, create new data volumes 270 or mount existing data volumes 270 on remote data store 216 via storage service 212. Create volume requests and other service requests may be made to the service 212 via service provider front end 280. The front end 280 may also manage connections and communications to and from storage gateway 252. The front end 280 may include one or more of, but is not limited to, firewalls, border routers, load balancers, gateway servers, gateway proxies, console processes, and in general any networking device and/or process that may be necessary to expose the storage service 212 to client network(s) 250 and to interface the storage service 212 to storage gateway(s) 252.

In at least some embodiments, storage gateway 252 initiates all connections to the service provider 210 via service provider front end 280; the service provider 210 does not initiate connections to the gateway 252. In addition, the network administrator process 260 does not initiate connections directly to the gateway 252; access by the network administrator process 260 to the gateway 252, for example to configure and manage the gateway 252, is through the service provider 210 via service provider front end 280.

Storage gateway 252 exposes one or more data ports (e.g., iSCSI ports) to the customer process(es) 258 on the client network 250. A customer process 258 may be any hardware, software, and/or combination thereof that exists on the client network 250 and that can connect to and communicate with the storage gateway 252 via the data protocol of the gateway 252's data ports (e.g., the iSCSI protocol). A customer process 258 may be, for example, a storage application such as Microsoft® SharePoint® and Oracle® databases, a server (e.g., an SQL server, a Microsoft® Exchange® server, etc.), a database application (e.g., an SQL database application, and Oracle® database application), a Microsoft® Exchange® application, or any other application or process executing on one or more devices on the client network 250 that is operable to communicate with the storage gateway 252 data port(s). Note that a customer process, as used herein, encompasses any software process that may be executing on one or more devices in the client network 250; however, the underlying hardware on which the process executes may be involved in or perform the connections and communications to the storage gateway 252 data port(s) on behalf of the process.

A mounted volume 270 may be presented to the customer process(es) 258 by storage gateway 252. Customer process(es) 258 may then perform reads from and writes to the volume 270 via the data ports exposed by the storage gateway 252, for example according to iSCSI protocol. Storage gateway 252 handles all read and write requests to volume 270. While the volume(s) 270 on remote data store 216 serves as the primary data store, storage gateway 252 may also store a local cache of frequently accessed data on a local data store 254. Local data store 254 may be implemented on storage hardware internal to the storage gateway 252, on storage hardware external to the storage gateway 252 provided by the service customer, or on a combination thereof.

For reads, storage gateway 252 may first check the local cache to see if a given read can be satisfied from the cache. If the read cannot be satisfied from the local cache, then storage gateway 252 may request the data from storage service 212, which gets the requested data (or a block or chunk of data that includes the requested data) from remote data store 216 and returns the requested data to the storage gateway 252. Storage gateway 252 may store the block or chunk of data received from storage service 212 to the local cache.

For writes, storage gateway 252 may write the new or updated data to the local cache. In at least some embodiments, the write data may be appended to a block-based write log implemented in the local cache. Storage gateway 252 may include a sender-side data upload process (not shown) that communicates with a receiver-side data upload process (not shown) at service provider 210 to periodically, aperiodically, or continuously upload new or modified data in the local cache to the primary data store 216. The uploading of write data from the write log may be performed asynchronously to the processing of the read and write operations from the initiating processes to the local data store 254. In at least some embodiments, this upload process may employ one or more of data deduplication, compression, parallelization, and TCP window scaling techniques. Example data deduplication techniques that may be employed in at least some embodiments as illustrated in FIG. 6 are described in U.S. patent application Ser. Nos. 12/981,393 and 12/981,397, which were previously incorporated by reference in their entireties.

The local cache may be limited in size, while the remote data store 216 may provide essentially unlimited storage space. Thus, storage gateway 252 may remove, replace, or overwrite older and/or relatively inactive data blocks in the local cache with newer and/or active data blocks.

Shadowing Gateway Implementations

Figure 7:
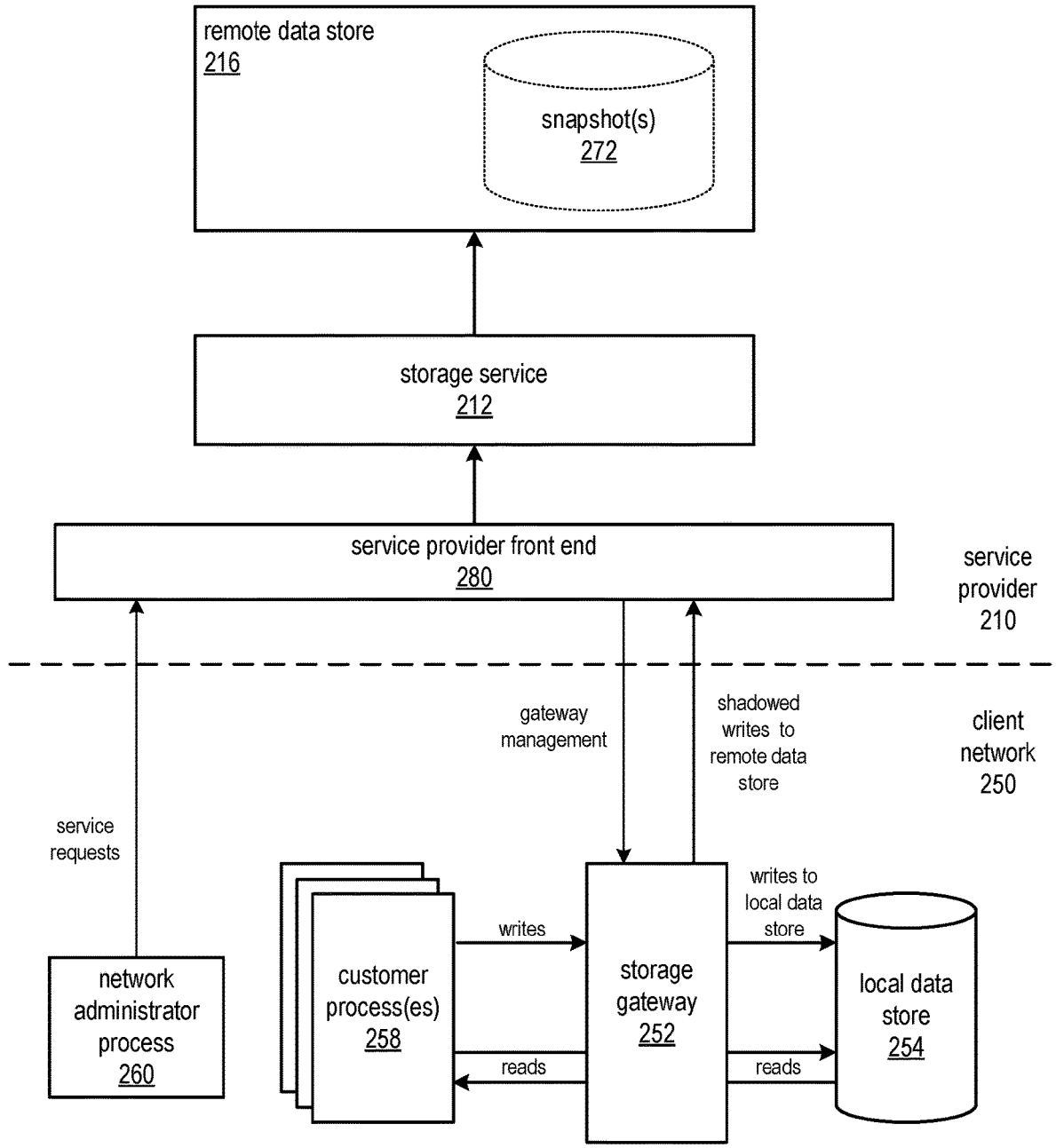
FIG. 7 is a high-level block diagram that broadly illustrates the architecture of and data flow in an example network environment in which an embodiment of a storage gateway is configured as a shadowing gateway.

FIG. 7 is a high-level block diagram that broadly illustrates the architecture of and data flow in an example network environment in which an embodiment of a storage gateway is configured as a shadowing gateway. In FIG. 7, storage gateway 252 may be installed, activated, and configured to serve as a shadowing gateway that acts as a "bump in the wire" between a customer's applications and the customer's local data store to provide shadowing of the customer's write data (e.g., iSCSI writes) to remote storage provided by the storage service 212. The remote data store 216 may be implemented as block storage.

In the embodiment illustrated in FIG. 7, local data store 254 serves as the primary data store for the customer process(es) 258 on client network 250, in contrast to the cached gateway implementation in FIG. 6 where remote data store 216 serves as the primary data store. Once storage gateway 252 is installed, activated, and configured as a shadowing gateway, the storage gateway 252 exposes one or more data ports (e.g., iSCSI ports) to the customer process(es) 258 on the client network 250. The customer process(es) 258 on client network 250 may then read from and write to the local data store 254 via the storage gateway 252 data port(s). A customer process 258 may be any hardware, software, and/or combination thereof that exists on the client network 250 and that can connect to and communicate with the storage gateway 252 via the data protocol of the gateway 252's data ports (e.g., the iSCSI protocol). A customer process 258 may be, for example, a storage application such as Microsoft® SharePoint® and Oracle® databases, a server (e.g., an SQL server, a Microsoft® Exchange® server, etc.), a database application (e.g., an SQL database application, and Oracle® database application), a Microsoft® Exchange® application, or any other application or process executing on one or more devices on the client network 250 that is operable to communicate with the storage gateway 252 data port(s). Note that a customer process, as used herein, encompasses any software process that may be executing on one or more devices in the client network 250; however, the underlying hardware on which the customer process executes may be involved in or perform the connections and communications to the storage gateway 252 data port(s) on behalf of the process.

The read and write requests may be received by the gateway 252 data port(s). For reads, the requests may be passed directly to the local data store 254 without further interference or processing by gateway 252, and the requested data may be passed directly from local data store 254 to customer process 258. Write requests directed to the local data store 254 are also passed to the local data store 254 by storage gateway 252. However, in addition to passing the write requests to the local data store 254, the storage gateway 252 may shadow the new or updated data indicated by the write requests to the remote data store 216 via the storage service 212.

In at least some embodiments, to shadow new or updated data to the remote data store 216, storage gateway 252 may locally store or buffer the write data to be uploaded to the to the remote data store 216, for example in a first-in-first-out (FIFO) write log. In at least some embodiments, the write log may be implemented in a block storage format, with the write log comprising one or more blocks (e.g., 4 MB blocks). Write data received in the write requests may be appended to the write log. The write data from two or more write requests may be written to the same block in the write log. Metadata for the write data relative to a block, e.g. offset in the write log block and length, as well as an offset in the target data store, may be stored to a metadata store.

Storage gateway 252 may include a sender-side data upload process (not shown) that communicates with a receiver-side data upload process (not shown) at service provider 210 to periodically, aperiodically, or continuously upload the locally stored write data from the write log to the shadowed data volume at remote data store 216. The uploading of write data from the write log may be performed asynchronously to the processing of the read and write operations from the initiating processes to the local data store 254. The upload process may upload the write data from the write log in blocks. Once a write log block has been successfully uploaded, the corresponding block may be marked as free in the write log.

In at least some embodiments, the upload process may employ one or more of data deduplication, compression, parallelization, and TCP window scaling techniques. Example data deduplication techniques that may be employed in at least some embodiments as illustrated in FIG. 7 are described in U.S. patent application Ser. Nos. 12/981,393 and 12/981,397, which were previously incorporated by reference in their entireties.

Note that a service provider front end 280 may manage connections to storage gateway 252. In at least some embodiments, storage gateway 252 initiates connections to the service provider 210 via front end 280; the service provider 210 does not initiate connections to the gateway 252. The front end 280 may include one or more of, but is not limited to, firewalls, border routers, load balancers, gateway servers, gateway proxies, console processes, and in general any networking device and/or process that may be necessary to expose the storage service 212 to client network(s) 250 and to interface the storage service 212 to storage gateway(s) 252.

In at least some embodiments, storage gateway 252 initiates all connections to the service provider 210 via service provider front end 280; the service provider 210 does not initiate connections to the gateway 252. In addition, the network administrator process 260 does not initiate connections directly to the gateway 252; access by the network administrator process 260 to the gateway 252, for example to configure and manage the gateway 252, is through the service provider 210 via service provider front end 280.

As a shadowing gateway, the shadowing operations provided by the storage gateway 252 may be effectively transparent to from the perspective of users on the client network 250. The customer process(es) 258 perform reads and writes to the data port(s) (e.g., iSCSI port(s)) exposed by the storage gateway 252 on the client network 250. From the customer process 258 perspective, the storage gateway 252 may appear as any other data target (e.g., iSCSI target). Read requests from the customer process(es) 258 received on the data port(s) are passed on to the local data store 254 that serves as the primary data store. Write requests from the customer process(es) 258 received on the data port(s) are passed on to the local data store 254 and shadowed to the remote data store 216. The shadowing operations of the gateway 252 may be performed in the background without significantly affecting performance of the primary data store or of the client network 250.

An example use case for the "bump in the wire" shadowing gateway configuration illustrated in FIG. 7 is for disaster recovery. Storage gateway 252 sends updates of data from client network 250 to storage service 212, which stores the data in a shadow volume or volumes, also referred to as a snapshot 270. The data may be stored in the snapshot 270 in a block storage format. The data are also stored to a local data store 254. If something happens that results in the corruption or loss of a portion or all of a locally stored volume, the corrupted or lost data may be recovered from a snapshot 270 of the volume stored in data store 216. Storage provider 210 may provide an interface via which a customer network administrator (e.g., via network administrator process 260) may request the recovery of a snapshot 270 of a portion or all of a locally stored volume from a shadowed volume on remote data store 216. In at least some embodiments, at least a portion of the write log maintained by storage gateway 252 may be uploaded to the remote data store 216 prior to recovering a snapshot 270 of the data to ensure that the shadowed volume from which data is to be recovered is as up-to-date as possible. Note that, in some cases, at least some data may be recovered directly from the write log maintained by storage gateway 252.

Customer Process-Gateway Communications

As previously described, a customer administrator, via network administrator process 260, may communicate with storage gateway 252 (e.g., a shadowing gateway) via the service provider 280 front end, for example to configure the gateway 252. In at least some embodiments, one or more customer processes 258 may also be configured to communicate with the storage gateway 252 via the service provider 280 front end to make requests of the gateway 252. For example, a customer process 258 may be an SQL server that is configured to communicate with storage gateway 252 via the service provider 280 front end.

Shadowing Gateway Bootstrapping Techniques

As illustrated in FIG. 7, once storage gateway 252 is installed, activated, and configured as a shadowing gateway, the storage gateway 252 exposes one or more data ports (e.g., iSCSI ports) to the customer process(es) 258 on the client network 250. The customer process(es) 258 on client network 250 may then read from and write to the local data store 254 via the storage gateway 252 data port(s). The read and write requests are passed to the local data store 254, and the write data indicated by the write requests are shadowed to the remote data store 216 so that snapshot(s) 272 of the local data store may be updated.

However, when a shadowing gateway comes online in a customer's network, either when initially installed, activated and configured or after being offline for some reason, there may be data in the local data store 254 that is not in the snapshot(s) 272 on the remote data store 216. Thus, at least some embodiments may provide a bootstrapping process for shadowing gateways during which at least some data from the local data store 254 may be uploaded to the remote data store 216 so that the snapshot(s) can be populated and/or updated to accurately reflect the data that is currently on the local data store 254.

Figure 8:
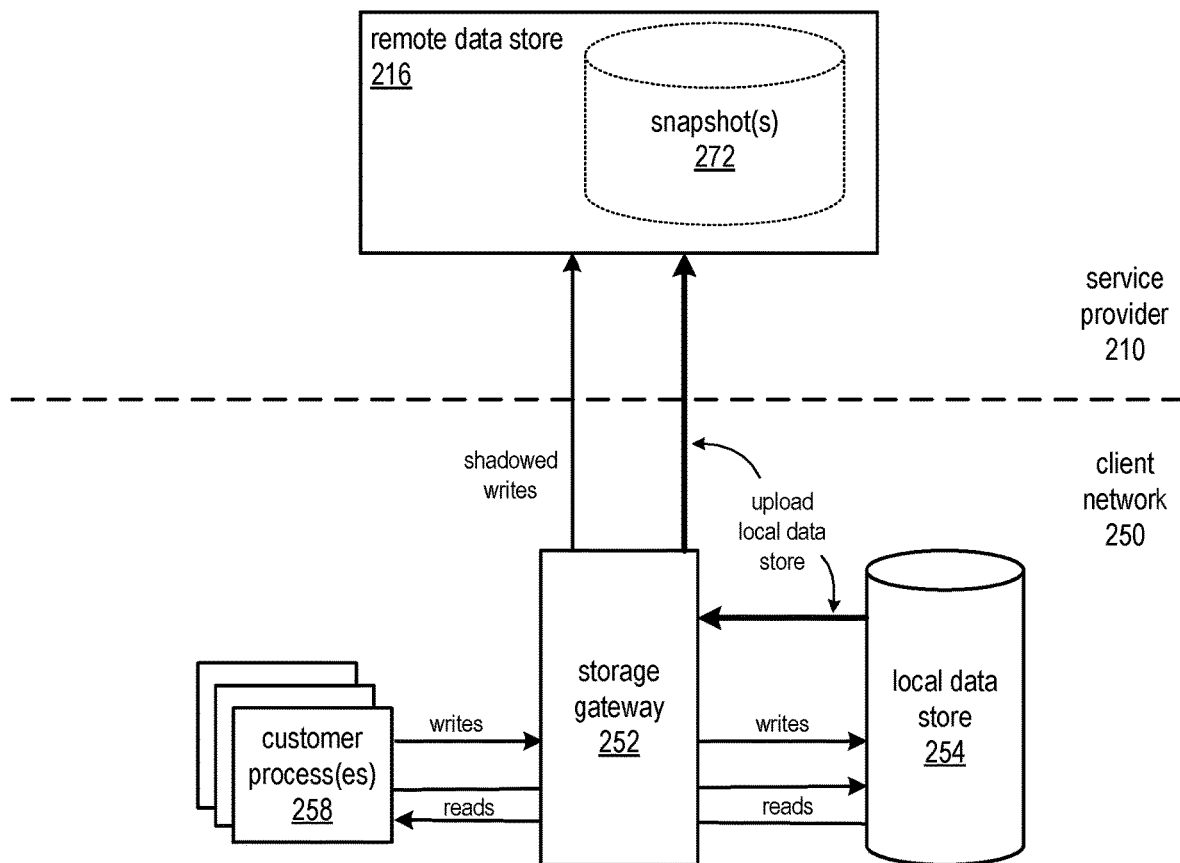
FIG. 8 is a high-level block diagram that broadly illustrates bootstrapping a shadowing gateway in an example network environment, according to at least some embodiments.

FIG. 8 is a high-level block diagram that broadly illustrates bootstrapping a shadowing gateway in an example network environment, according to at least some embodiments. When storage gateway 252 comes online as a shadowing gateway on the client network 250, the gateway 252 may determine that there is data in the local data store 254 that needs to be uploaded to the remote data store 216 to make the snapshot 272 consistent with the local data store 254. An upload process of the gateway 252 may then begin to upload blocks of data from the local data store 254 to the remote data store 216 at service provider 210. The storage gateway 252 may also expose its data ports to customer process(es) 258, begin accepting and processing read requests and write requests directed to the local data store 254, begin caching the new write data indicated by the write requests to the write log, and begin uploading the write data from the write log to the remote data store 216. The upload of data from the local data store 254 may thus be performed in the background while the storage gateway 252 is performing its shadowing function on the client network 250. When the upload of data from the local data store 254 is complete, the storage gateway 252 continues performing its shadowing function.

Figure 9:
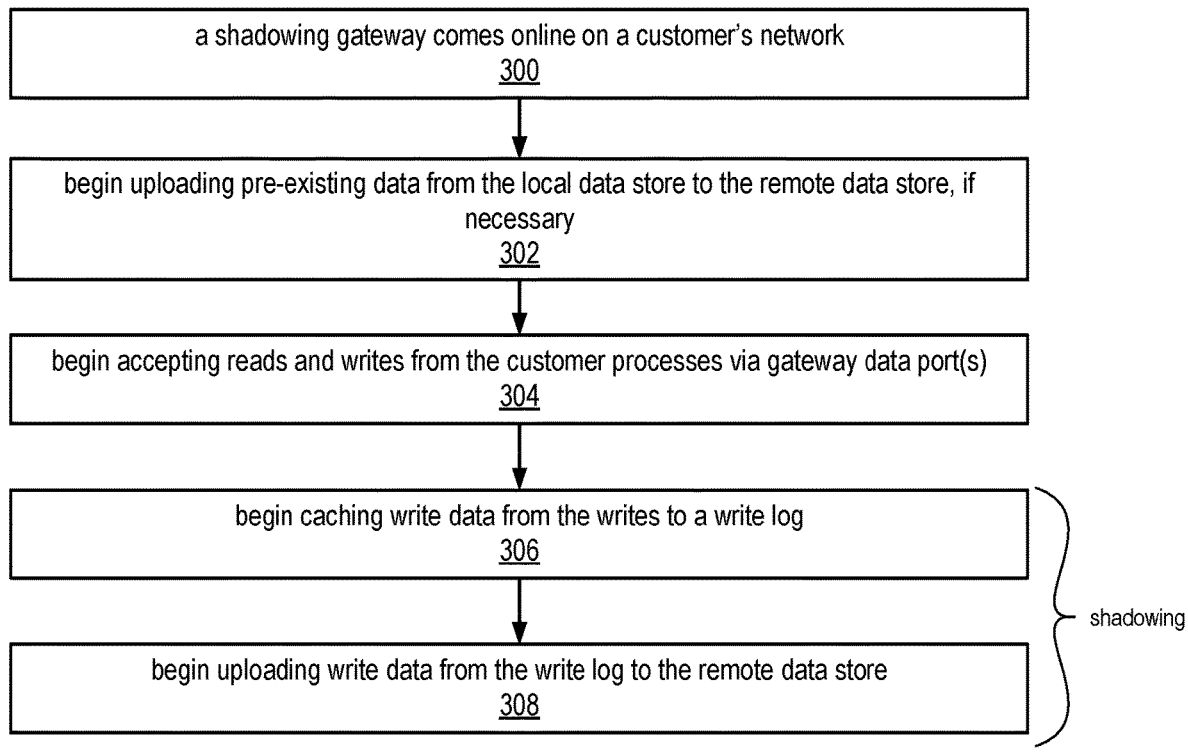
FIG. 9 is a flowchart of a bootstrapping process for a shadowing gateway, according to at least some embodiments.

FIG. 9 is a flowchart of a bootstrapping process for a shadowing gateway, according to at least some embodiments. As indicated at 300, a shadowing gateway comes online on a customer's network. For example, a new instance of a storage gateway may be installed, activated, and configured as a shadowing gateway on the network. As another example, an existing instance of a shadowing gateway may come back online after being offline for some reason; while the gateway was offline, customer process(es) may have communicated directly to the local data store to read and write data. As another example, a shadowing gateway may have entered a pass-through mode during which shadowing operations are temporarily suspended for some reason, for example due to the write log becoming full, and may be exiting the pass-through mode and resuming shadowing operations.

As indicated at 302, the shadowing gateway may begin uploading pre-existing data from the local data store to the remote data store, if necessary. For example, if this is a new shadowing gateway and the local data store is already populated, the existing data in the local data store needs to be uploaded to the remote data store so that a consistent snapshot can be generated. As another example, if an existing shadowing gateway comes back online or resumes shadowing operations upon exiting pass-through mode, new data may have been written to the local data store, and thus the snapshot on the remote data store needs to be made consistent with the data currently on the local data store.

As indicated at 304, the shadowing gateway may begin accepting reads and writes from the customer processes via the gateway data port(s) exposed on the customer's network. As indicated at 306, the shadowing gateway may begin caching write data from the writes to a write log, and begin uploading write data from the write log to the remote data store as indicated at 308.

The upload of data from the local data store begun at 302 may be performed in the background while the shadowing gateway accepts read and write requests and performs its shadowing function on the customer's network. When the upload of data from the local data store is complete, the shadowing gateway continues performing its shadowing function.

Note that the order of the elements in FIG. 9 may be different. For example, element 302 may be performed after any one of elements 304 through 308. In other words, the shadowing gateway may begin accepting reads and writes and performing its shadowing function prior to beginning to upload the pre-existing data from the local data store.

Figure 10:
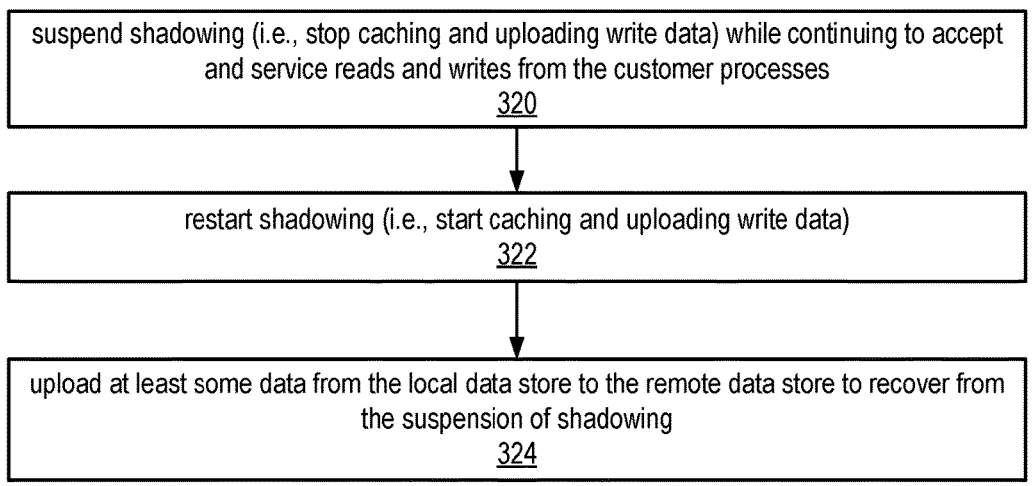
FIG. 10 is a flowchart of a shadowing gateway entering and recovering from a pass-through mode, according to at least some embodiments.

FIG. 10 is a flowchart of a shadowing gateway entering and recovering from a pass-through mode, according to at least some embodiments. As indicated at 320, a shadowing gateway may enter a pass-through mode by suspending its shadowing function (i.e., stop caching and uploading write data) while continuing to accept and service reads and writes directed to the local data store from the customer processes on the customer's network. The gateway may enter pass-through mode upon detecting some condition that may cause the shadowing function to fail. As an example, the shadowing gateway may enter the pass-through mode upon detecting that the write log is full and cannot be successfully uploaded. The gateway may alert the local network administrator of the detected condition; the administrator may then address the problem indicated by the alert. For example, the administrator may allocate more memory to the write log, and/or allocate more bandwidth to the gateway upload process. The administrator may then inform the gateway that the problem has been addressed.

When the shadowing gateway determines that the pass-through mode can be exited, for example by receiving an indication that a detected problem that caused the pass-through mode has been addressed, the gateway may restart shadowing (i.e., start caching and uploading write data), as indicated at 322.

Upon exiting pass-through mode, there may be data in the local data store that has not been uploaded to the remote data store. Since the gateway continues to receive and process write requests during pass-through mode, new data may have been written to the local data store. Thus, the shadowing gateway may perform a bootstrap as illustrated in FIGS. 8 and 9 to upload at least some data from the local data store to the remote data store to recover from the pass-through mode, as indicated at 324.

In at least some embodiments, an optimized bootstrapping process for shadowing gateways may be employed to reduce the amount of data that is uploaded from the local data store to the remote data store. The optimized bootstrapping process may detect blocks of data that have already been uploaded to the remote data store, and thus avoid uploading blocks that have already been uploaded. The optimized bootstrapping process may leverage tracking data that is generated and maintained for a storage gateway process during general uploading of data from a gateway to the remote data store.

Figure 11:
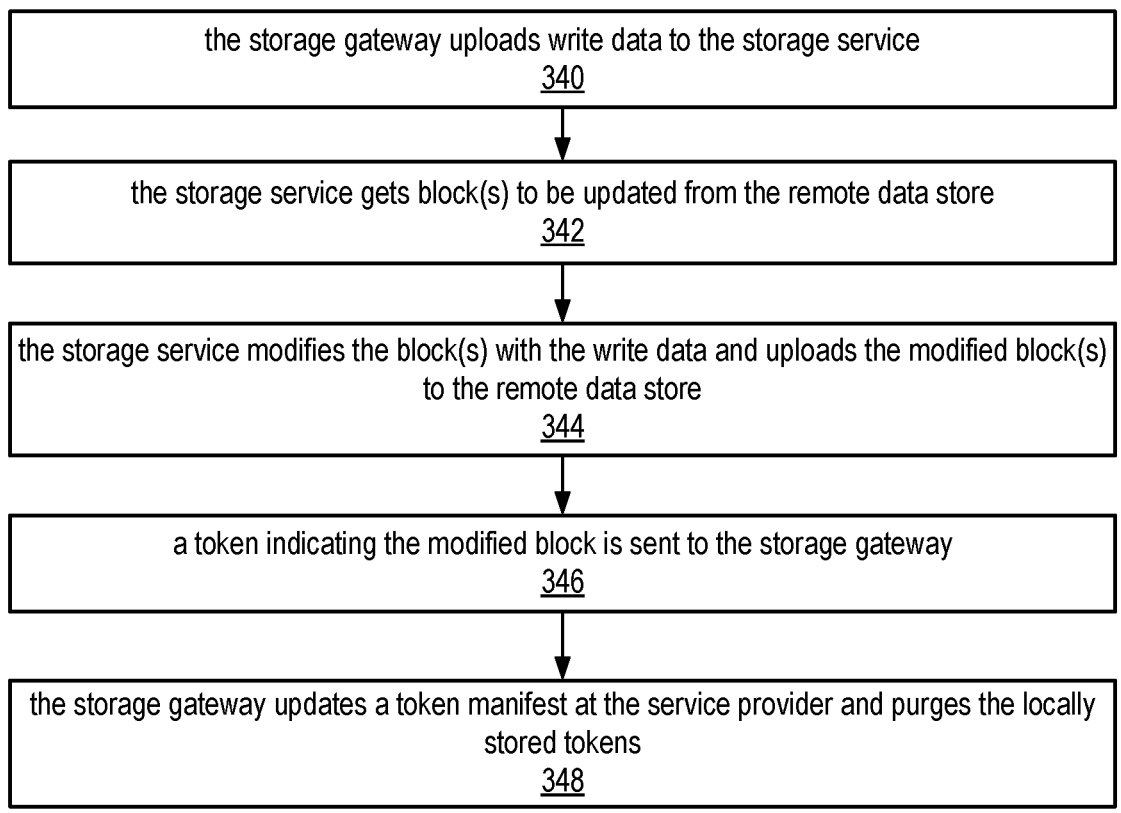
FIG. 11 is a flowchart of a method for uploading, updating, and tracking blocks from a gateway to a remote data store, according to at least some embodiments.

FIG. 11 is a flowchart of a method for uploading, updating, and tracking blocks from a gateway to a remote data store, according to at least some embodiments. During normal gateway operations, the gateway uploads write data to the remote data store at the service provider, specifically to the storage service, as indicated at 360. The storage service receives the write data and gets the respective block(s) (e.g., 4 MB blocks) from the remote data store as indicated at 342. The storage service then modifies the respective block(s) according to the write data and uploads the modified block(s) back to the remote data store with a new version name, as indicated at 344. For each modified block, a token indicating the modified block is sent back to the storage gateway, as indicated at 346. The storage gateway keeps track of these tokens; every time a block is modified, the reference block that is being modified needs to be sent to the storage service.

As indicated at 348, the storage gateway may periodically or aperiodically update a token manifest at the service provider and purge at least a portion of the locally tracked tokens. The storage gateway may have to track a large number of tokens. In at least some embodiments, a manifest may be provided on the remote data store that may relieve the storage gateway of the burden of having to locally track a large number of tokens. The storage gateway may periodically or aperiodically call the storage service to update the manifest with token(s) that the gateway has received, and may purge the respective locally stored tokens.

In at least some embodiments, the optimized bootstrapping process may leverage the manifest to determine what blocks have and have not been uploaded by making a call to check hashes of each of the blocks in the manifest to determine which blocks indicated by the manifest match blocks on the local data store versus which blocks indicated by the manifest do not match blocks on the local data store and thus need to be uploaded. In other words, the manifest is used to detect which blocks on the local data store are dirty blocks, and which are not. Thus, the optimized bootstrapping process attempts to determine, via the manifest, which blocks have already been uploaded so that the already-uploaded blocks are not uploaded again, and only dirty blocks are uploaded. In at least some embodiments, for the blocks that the optimized bootstrapping process determines do need to be uploaded (the dirty blocks), a data deduplication technique may be applied when uploading these blocks to reduce the amount of data that is actually uploaded from the dirty blocks.

Figure 12:
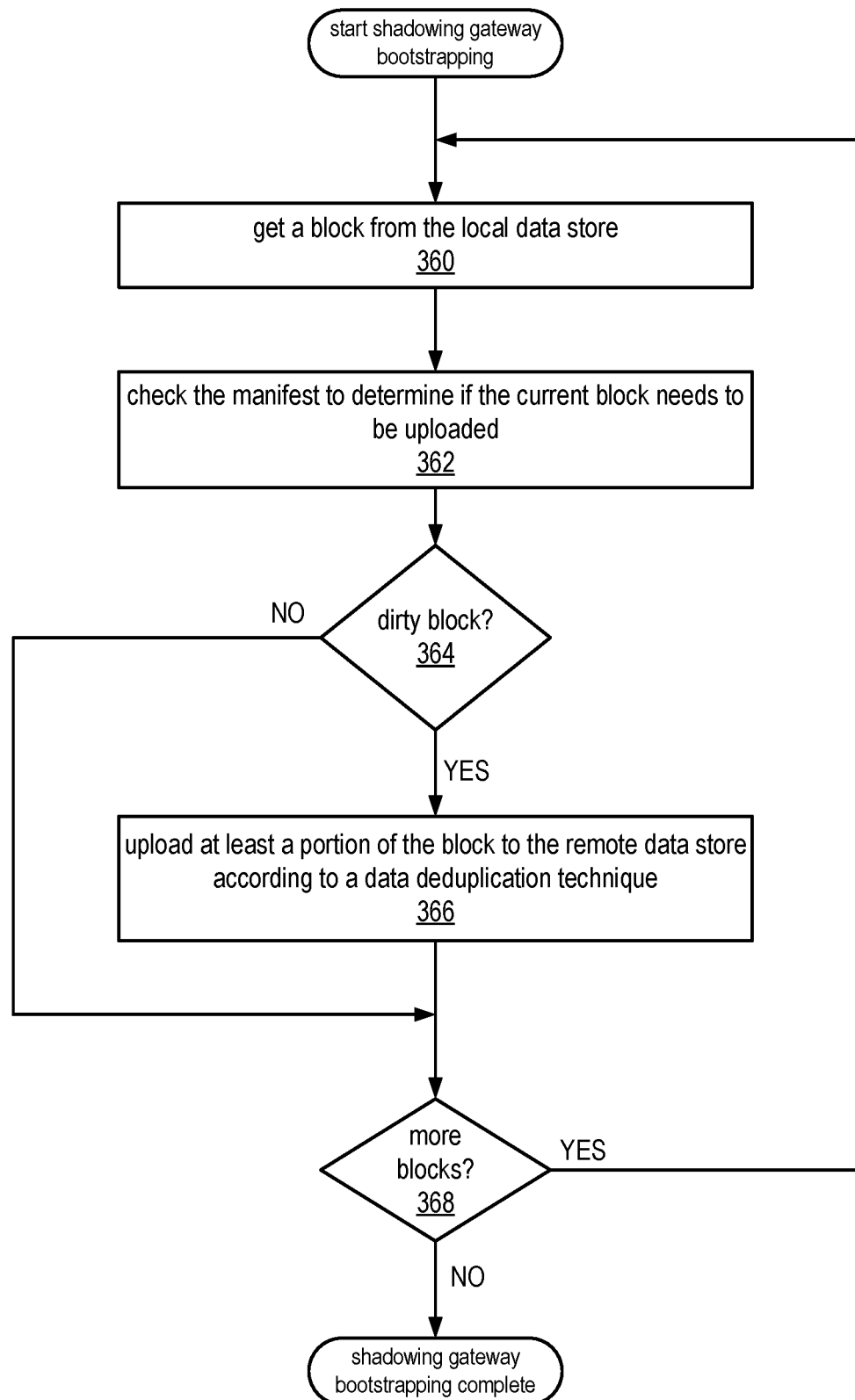
FIG. 12 is a flowchart of an optimized bootstrapping process for a shadowing gateway, according to at least some embodiments.

FIG. 12 is a flowchart of an optimized bootstrapping process for a shadowing gateway, according to at least some embodiments. A bootstrapping process may be started for a shadowing gateway, for example when the gateway exits pass-through mode. As indicated at 360, a block is obtained from the local data store. As indicated at 362, the manifest, which may be stored on the remote data store, may be checked to determine if the current block is a dirty block that needs to be uploaded. At 364, if the current block is dirty according to the manifest, at least a portion of the block may be uploaded to the remote data store according to a data deduplication technique, as indicated at 366. The method then proceeds to 368. At 364, if the current block is not dirty according to the manifest, the method proceeds directly to 368. At 368, if more blocks are to be processed, the method returns to element 360 to process a next block. Otherwise, the bootstrapping process is done.

Storage Gateway Security Model

Figure 13:
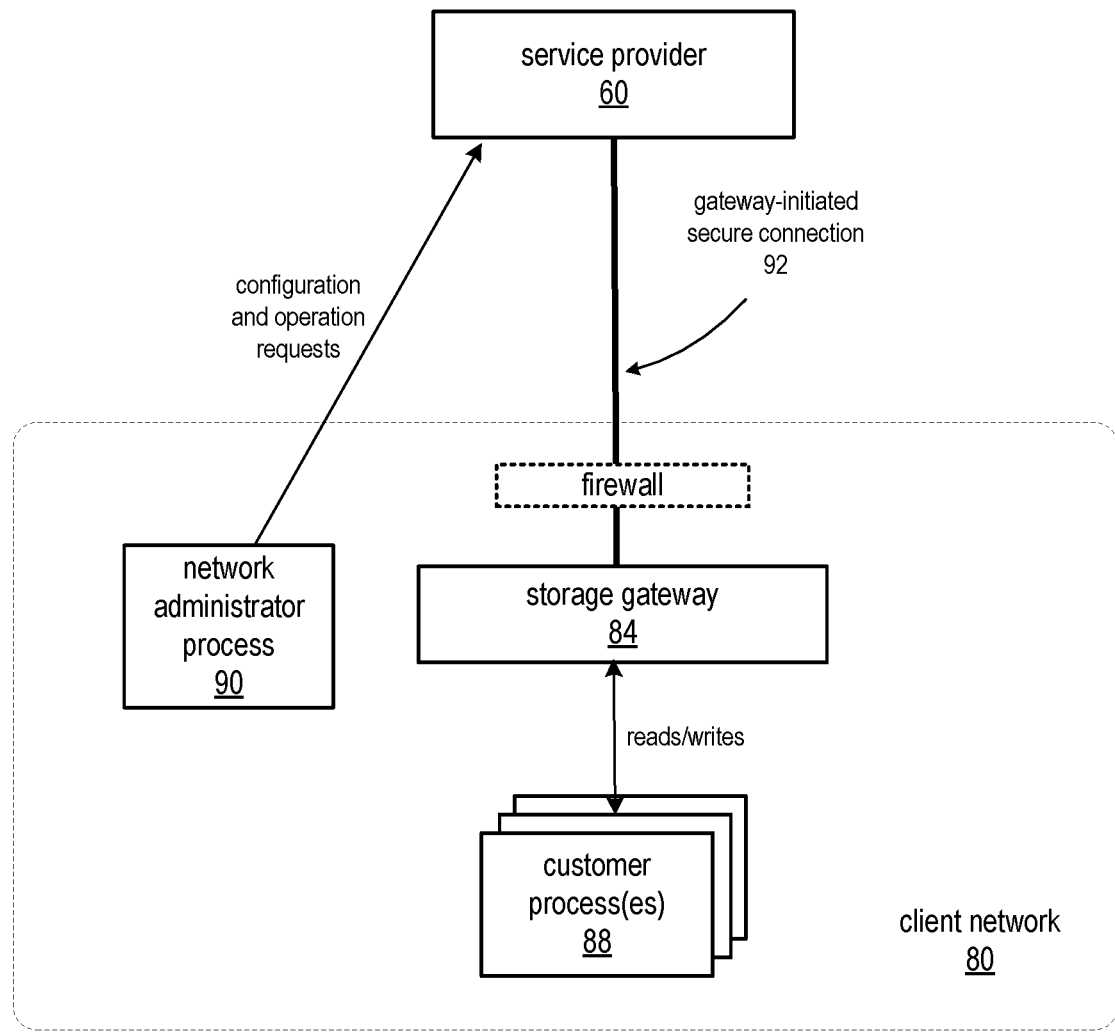
FIG. 13 illustrates aspects of a storage gateway security model, according to at least some embodiments.

Embodiments of the storage gateway may be implemented according to a security model that provides data protection for the customer as well as protection against misuse and unauthorized use (e.g., pirating) of the gateway by the customer or third parties. FIG. 13 illustrates aspects of a storage gateway security model, according to at least some embodiments.

In at least some embodiments, an aspect of the security model is that a storage gateway 84 is delivered and initially installed on a client network 80 without security credentials or other identifying information for the gateway 84 to use in communications with the service provider 60. An activation process may be employed via which a storage gateway 84 on a customer network can register with the service provider 60. In at least some embodiments of the activation process, the storage gateway 84 may initiate a connection (e.g., an SSL (Secure Socket Layer)/TCP connection) with and identify itself to the service provider 60 as a correct gateway for a respective customer account to obtain the necessary security credentials. During the activation process, the service customer specifies a name for the gateway 84. In at least some embodiments, the service customer logs into the customer's account with the service provider 60 and provides information to the service provider 60, including but not limited to the gateway name, that is used in registering the gateway 84. However, the service customer does not log in to the storage gateway 84, and therefore the service customer's security credentials and other account information are not exposed on the gateway 84. This may minimize the security risk for the service customer. This gateway name, along with other metadata related to the gateway 84 and to the service customer, may be stored by the service provider 60 and used in tracking and identifying the respective gateway 84. Note that a service customer may have one or more gateways 84 installed and activated on a client network 80, with each having a unique identifying name and other metadata. FIGS. 15 through 17B, further described below in the section titled Storage gateway activation process, illustrate an activation process that may be employed in at least some embodiments. In the activation process, the gateway 84 may initiate a connection to the service provider 60 and provide metadata about the gateway 84 platform, along with a public key, to the service provider 60. The service provider 60 may then provide a temporary, unique activation key to the gateway 84 that is used in the activation process. In addition, a service customer may be required to log in to the customer's account via a service provider console process to activate the gateway 84; thus, the gateway 84 can be matched with the account of the service customer that attempts to activate the gateway 84. The security credentials and other metadata (e.g., the customer-supplied gateway name) obtained by the storage gateway 84 via the activation process may then be used by the storage gateway 84 in communications with various processes of the service provider 60 network to identify the gateway 84 to the service provider 84 processes.

Figure 18:
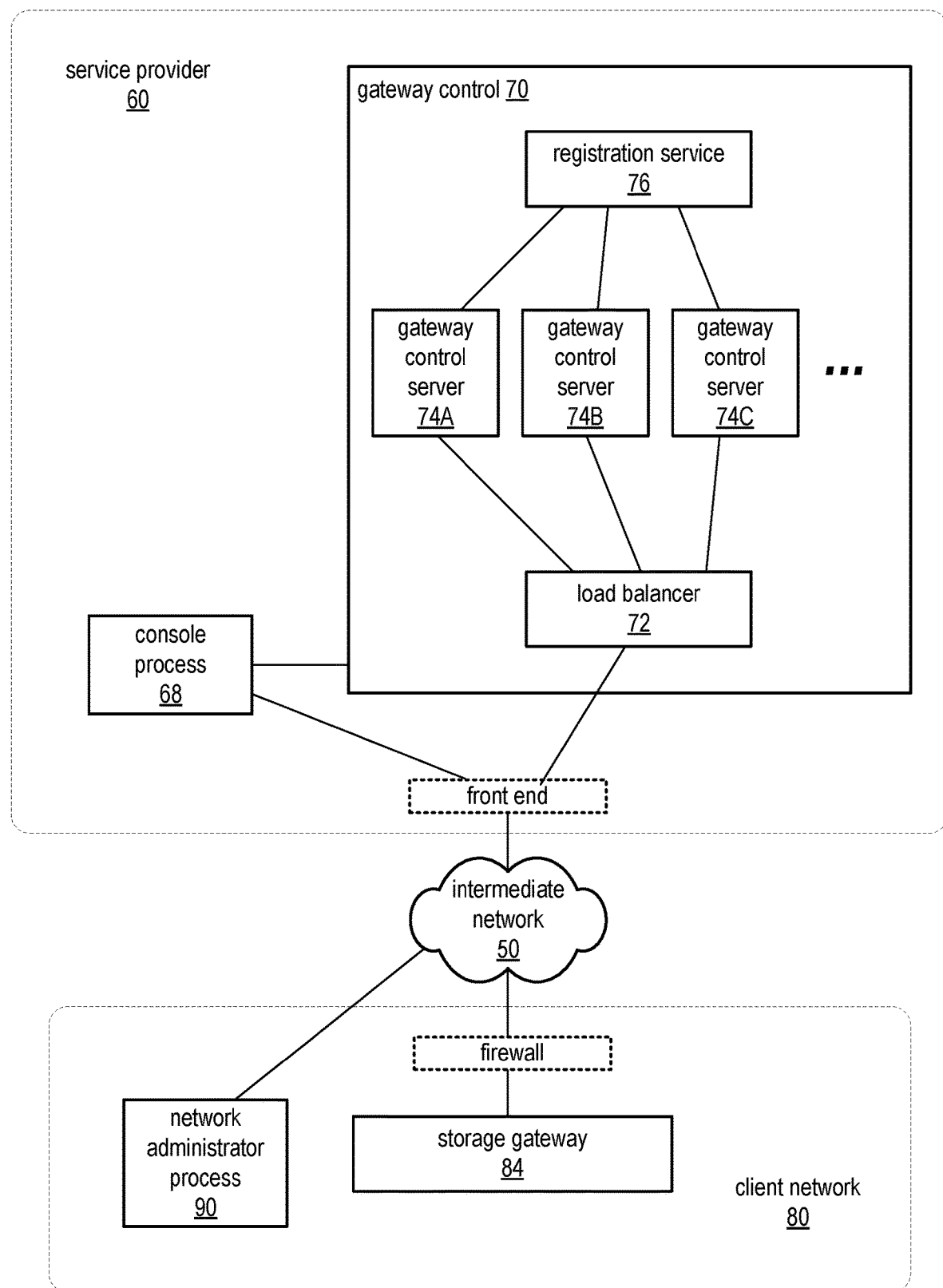
FIG. 18 is a high-level block diagram that illustrates example gateway control architecture that may be employed in at least some embodiments.
Figure 19:
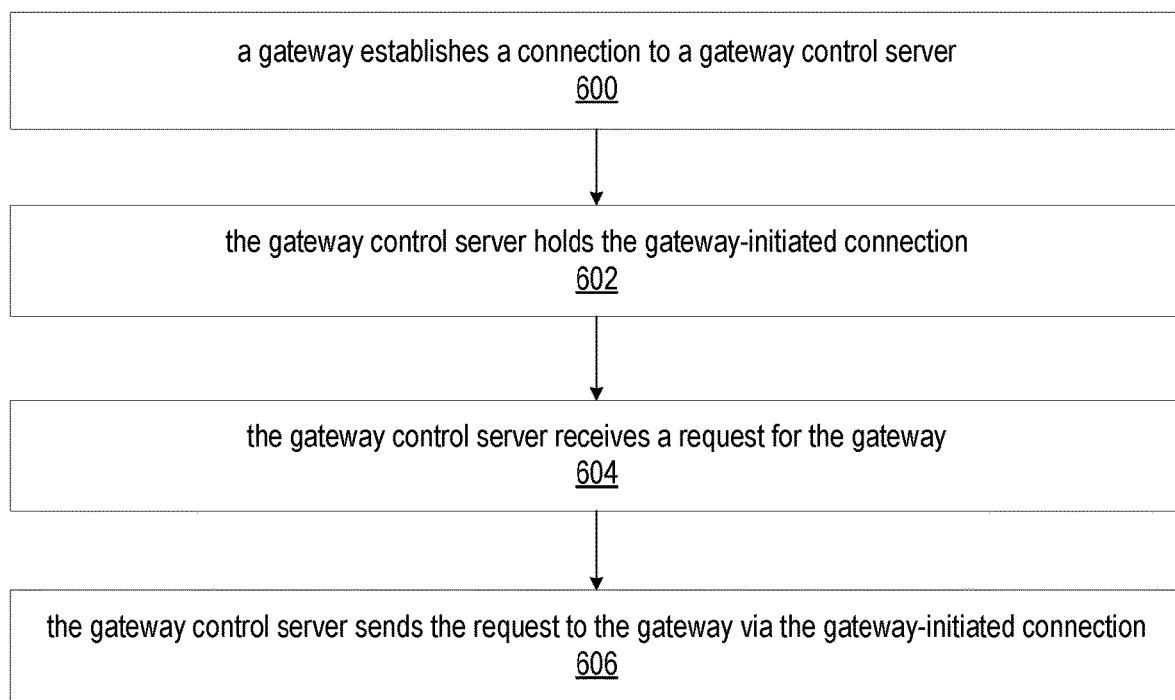
FIG. 19 is a flowchart of the method for remote gateway management using a gateway-initiated connection and a long polling technique, according to at least some embodiments.
Figure 20:
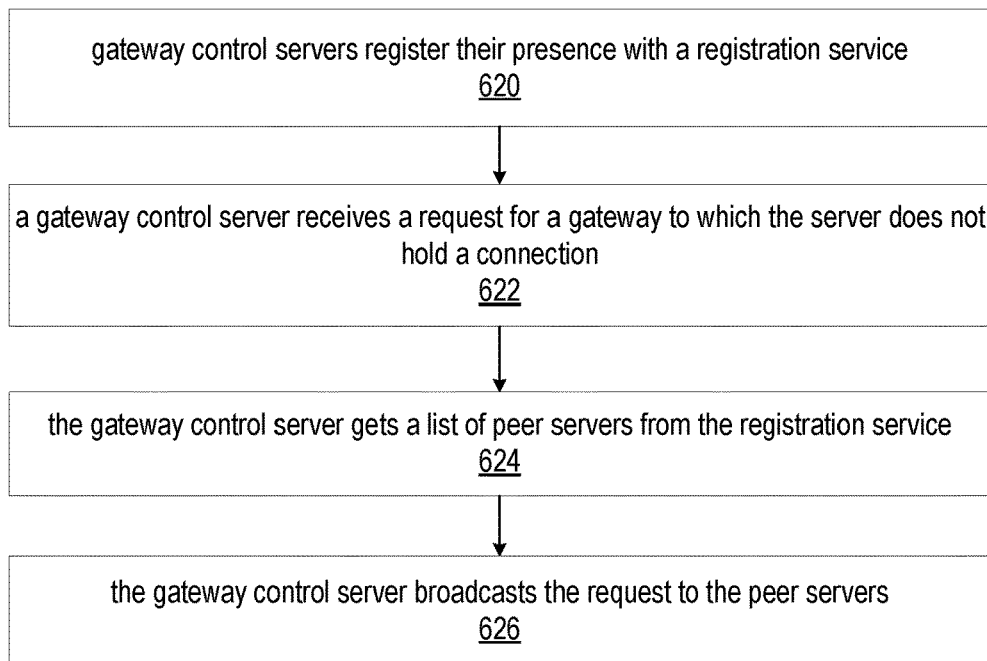
FIG. 20 is a flowchart of a method for a gateway control server to broadcast a gateway request to its peer servers, according to some embodiments.

In at least some embodiments, another aspect of the security model, as illustrated in FIG. 13, is that the storage gateway 84 only accepts externally-initiated connections to one or more data ports (e.g., iSCSI ports) exposed to the customer process(es) 88 on the client network 80. The storage gateway does not accept other externally initiated connections, and initiates all necessary connections to external processes. For example, in at least some embodiments, the storage gateway 84 initiates at least one secure connection 92 (e.g., an SSL (Secure Socket Layer)/TCP connection) to the service provider 60; the service provider 60, however, cannot initiate connections to the gateway 84. An example method for remote gateway management using gateway-initiated connections and a long polling technique that may be used in at least some embodiments is illustrated in FIGS. 18 through 20.

In addition, as illustrated in FIG. 13, in at least some embodiments, the service customer (e.g., network administrator process 90) does not directly connect to the storage gateway 84 to configure and manage the gateway 84; instead, configuration and operation requests for the storage gateway 84 are made through the service provider 60, which passes the requests to the gateway 84 via the secure communications channel 92 initiated by the gateway 84. For example, as illustrated in FIGS. 18 through 21, configuration and operation requests for a gateway 84 may be performed by or via a network administrator process 90 through a console process on the service provider 60 network. In at least some embodiments, the console process forwards a received configuration request or operation request directed to the customer's gateway 84 to a gateway control plane that maintains gateway-initiated connections 92. The gateway control plane locates a current connection to the gateway 84 that is the target of the request, for example a connection maintained on a particular gateway control server, and the request is forwarded to the gateway 84 via the connection.

Thus, in at least some embodiments, a user, network administrator, or process of the customer cannot directly initiate connections to or "log in" to the storage gateway 84, nor can external persons or processes such as an operator or process on the service provider 60 network initiate a connection to the storage gateway 84. This, along with other aspects of the gateway security model, may help to protect the security credentials and other operational information on the storage gateway 84 from being intentionally or unintentionally compromised by external persons or processes.

In another aspect of the security model, all communications between the storage gateway and the storage service during activation and operation of the gateway may be secured and encrypted. As noted above, an aspect of the security model is that communications between the storage gateway and the storage service are performed over gateway-initiated secure connections (e.g., SSL/TCP connections). An encryption technique, for example public/private key encryption, may be used in communications over the gateway-initiated secure connections.

Figure 14:
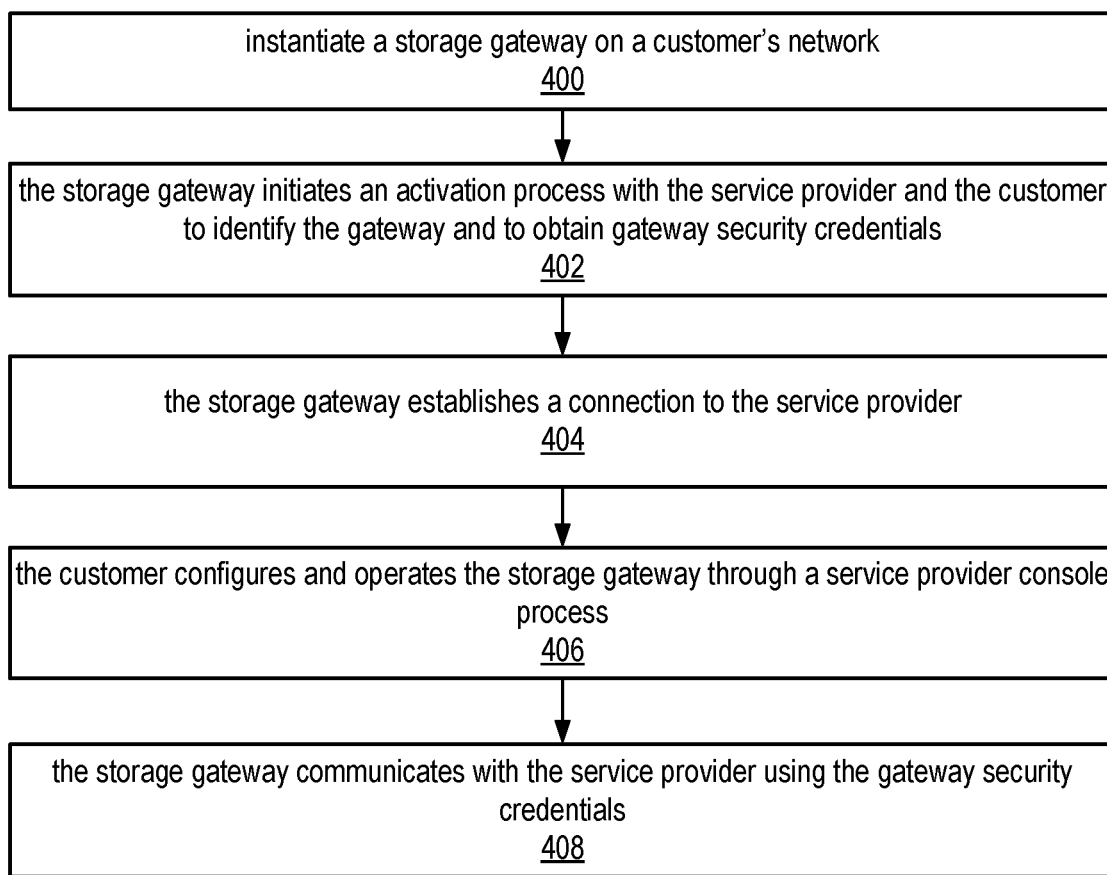
FIG. 14 is a flowchart that illustrates at least some aspects of a gateway security model during activation, configuration, and operation of a storage gateway, according to at least some embodiments.

FIG. 14 is a flowchart that illustrates at least some aspects of a gateway security model during activation, configuration, and operation of a storage gateway, according to at least some embodiments. As illustrated at 400, a storage gateway may be instantiated on a customer network. For example, to instantiate the storage gateway, the storage gateway may be installed as a virtual or physical appliance on the service customer's local network or data center, typically behind a firewall. For example, in at least some embodiments, the storage gateway may be implemented as a virtual appliance that may be downloaded to or otherwise installed on one or more computing devices such as server systems on the service customer's local network. Alternatively, the storage gateway may be implemented as a dedicated device or appliance that may be coupled to the service customer's local network; the dedicated device or appliance may include software and/or hardware that implements the functionality of the storage gateway. As illustrated at 402, the instantiated storage gateway initiates an activation process with the service provider and the customer to identify the gateway and to obtain gateway security credentials. In at least some embodiments, the security credentials include a certificate signed with a gateway-provided public key. An example activation process is described below in reference to FIGS. 15 through 17B. Note that the activation process may be initiated by the gateway when the gateway is initially installed on the customer network, and may also be initiated at other times, for example when powering on after the gateway device has been powered down for upgrade, maintenance, or for some other reason. As indicated at 404 of FIG. 14, the storage gateway establishes a secure connection to the service provider. An example method for a gateway-initiated connection that uses a long polling technique that may be used in at least some embodiments is illustrated in FIGS. 18 through 21. As indicated at 406 of FIG. 14, the customer configures and operates the storage gateway through a service provider console process. An example method for remote gateway management using gateway-initiated connections and a long polling technique that may be used in at least some embodiments is illustrated in FIGS. 18 through 21. As illustrated at 408 of FIG. 14, the storage gateway communicates with the service provider, for example to communicate with a storage service process, using the gateway security credentials and possibly other metadata obtained during the activation process to identify the gateway to the service provider.

Storage Gateway Activation Process

Embodiments of a storage gateway may, for example, serve as an on-premise storage device and as an interface between a service customer's network and a storage service provided by a service provider. In at least some embodiments, the storage gateway may be implemented as a virtual device or appliance that may be downloaded or otherwise installed on one or more computing devices such as server systems coupled to a local network infrastructure of the customer at a customer data center. Alternatively, the storage gateway may be implemented as a dedicated device or appliance that may be coupled to a local network infrastructure of the customer. The dedicated device or appliance may include software and/or hardware that implements the functionality of the gateway.

In at least some embodiments, in order to use a storage gateway after the gateway is installed, the gateway must be activated with the service provider. This section describes a method via which identification, authentication, and authorization of a storage gateway may be performed during bootstrapping, or activation, of the storage gateway. In the gateway activation method, the storage gateway is identified and associated with the customer's service provider account. However, the customer's credentials are not exposed to the storage gateway during the activation process. In at least some embodiments, the customer logs into the customer's account with the service provider and provides information to the service provider, including but not limited to a gateway name, that is used in registering the gateway 84. However, the customer does not log in to the storage gateway, and therefore the customer's security credentials and other account information are not exposed on the gateway. This may minimize the security risk for the customer. In at least some embodiments, the service provider account that is used by the customer in the activation process may be the same account that the customer used to manage other resources that are provided to the customer by the service provider, including but not limited to other storage resources provided by a storage service and virtualized hardware resources provided by a hardware virtualization service, as illustrated in FIG. 5.

Figure 15:
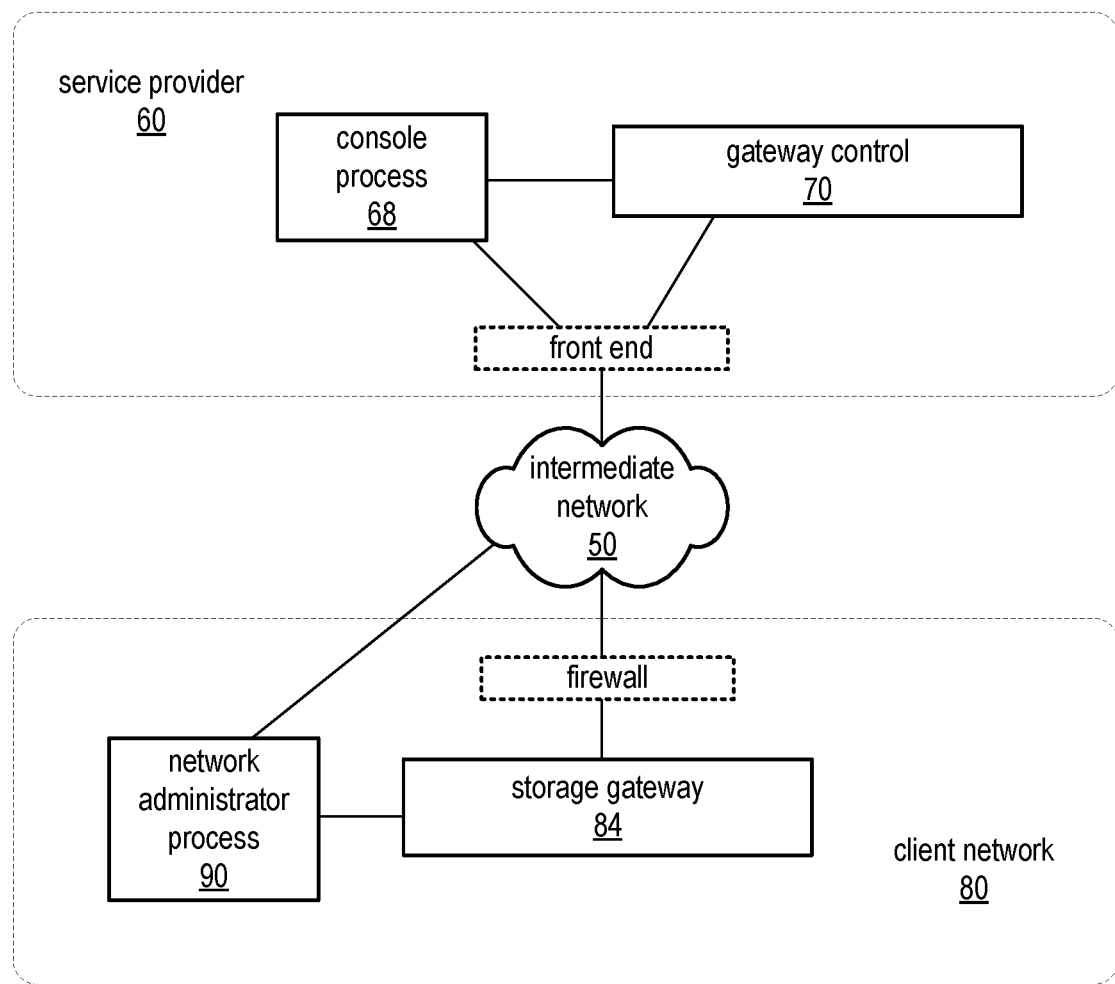
FIG. 15 is a high-level block diagram of an example networking environment that illustrates the service customer and service provider components or entities that participate in a gateway activation process, according to at least some embodiments.

FIG. 15 is a high-level block diagram of an example networking environment that illustrates the service customer and service provider components or entities that participate in a gateway activation process, according to at least some embodiments. These participants may include, but are not limited to, a storage gateway 84, a network administrator process 90, a console process 68, and gateway control 70. A storage gateway 84 may be installed as a virtual or physical appliance on a service customers local network or data center (e.g., client network 80), typically behind a firewall. For example, a storage gateway 84 may be a virtual appliance that, for example, executes within a virtual machine, and may be downloaded and instantiated on a server device on client network 80. A console process 68 on the service provider 60 network may be accessible by or via a network administrator process 90, for example from a device on client network 80 or from a device external to client network 80, to sign on to the customer's account. For example, the console process 68 may provide a web interface or some other interface via which a network administrator, via network administrator process 90, may sign on to the respective service customer's account to view and manage the account and resources provided by the service provider 60. A gateway control 70 process or plane of the service provider 60 network may perform tracking and management functions for one or more storage gateway(s) 84 installed at one or more customers of the service provider 60. Gateway control 70 and console process 68 may, for example, be implemented on one or more server computer devices on service provider 60 network. In at least some embodiments, gateway control 70 may be implemented as a control plane that includes two or more gateway control servers to provide load balancing and high availability.

Figure 16A:
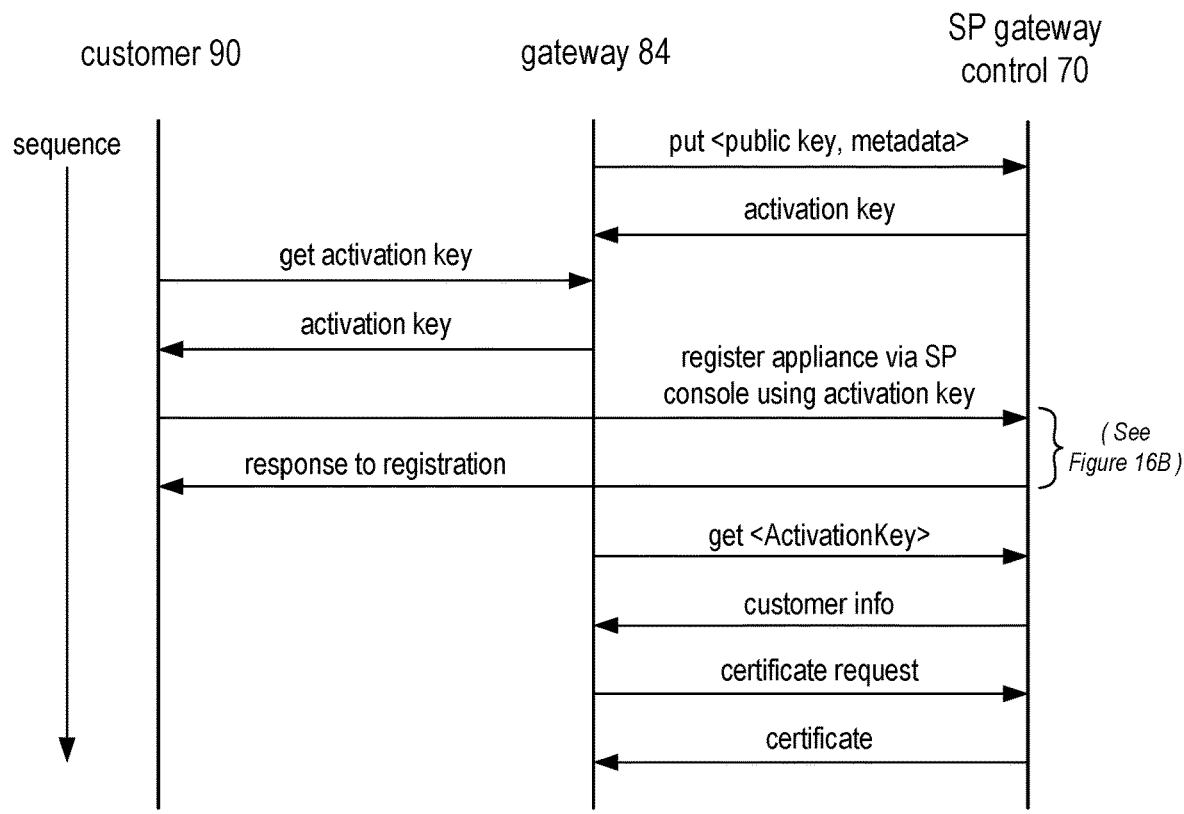
FIGS. 16A and 16B are process flow diagrams that illustrate interactions among the components illustrated in FIG. 15 during a gateway activation process, according to at least some embodiments.
Figure 16B:
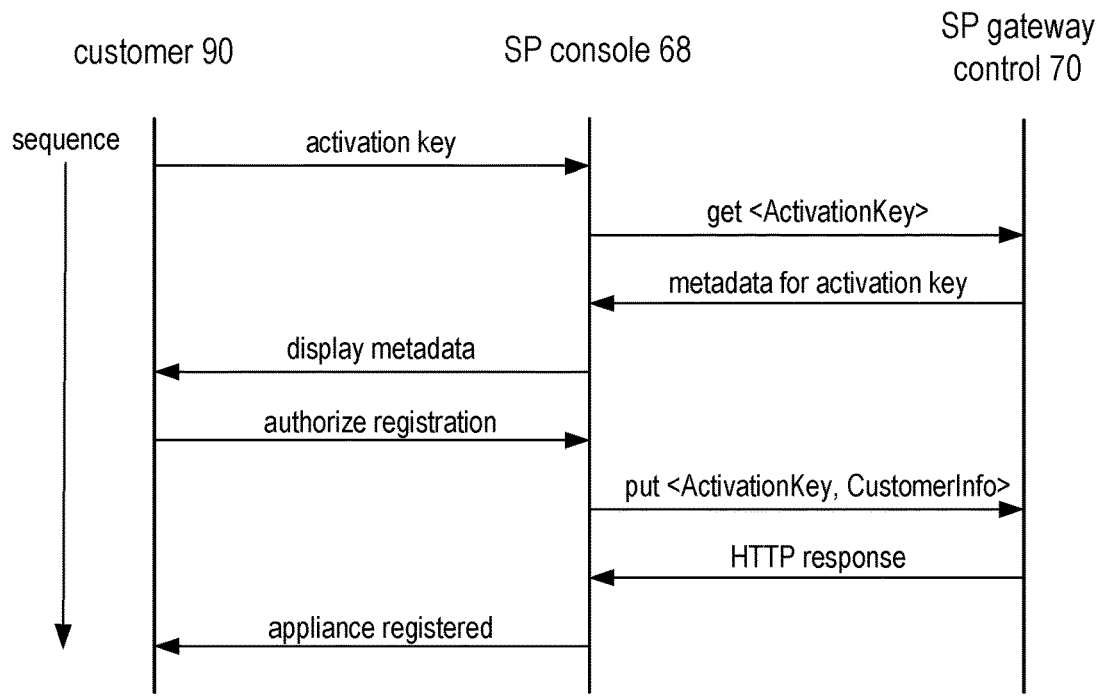

FIGS. 16A and 16B are process flow diagrams that illustrate interactions among the components illustrated in FIG. 15 during a gateway activation process, according to at least some embodiments. The activation process involves two points of interaction from the customer's perspective. First, the customer interacts with the gateway 84, as shown in FIG. 16A. Second, the customer interacts with the service provider (SP) console 68, as shown in FIG. 16B.

FIG. 16A illustrates interactions among the customer (represented by network administrator process 90 in FIG. 15), gateway 84, and the service provider (SP) gateway control 70 during the activation process. After the gateway 84 is installed and/or powered on, the gateway 84 generates a public key (e.g., an RSA keypair), and collects metadata about the hardware and/or software of the device that the gateway 84 has been installed on. For example, the metadata may include an IP address, a MAC address, or other hardware and software characteristics of the device. The gateway 84 then publishes the public key and the metadata, for example via an HTTP POST, to gateway control 70. In response, gateway control 70 may generate an activation key, and returns the activation key to the gateway 84. The activation key may be a globally unique identifier (GUID), for example an N-bit, randomly generated number. Gateway control 70 may store the activation key along with the public key and the metadata obtained from the gateway 84.

After receiving the activation key from gateway control 70, the gateway 84 advertises the activation key within the client network 80 at a fixed port (IP address:port) on the gateway 84 VM or device. The customer, via network administrator process 90, may then access the fixed port of the gateway 84 to obtain the activation key; the access is redirected to the service provider (SP) console 68 process with the activation key in the query string.

In at least some embodiments, the activation key is valid for a fixed time or lifespan (for example, 30 minutes), after which the activation key expires. In at least some embodiments, since the activation key is valid only for a specified lifespan, a background garbage collection process may be provided at the service provider 60 that removes expired activation keys. In at least some embodiments, the lifespan for an activation key may be longer on the service provider 60 side than on the gateway 84 to handle borderline cases (for example, 45 minutes on the service provider 60 side, 30 minutes on the gateway 84).

FIG. 16B illustrates interaction among the customer (represented by network administrator process 90 in FIG. 15), service provider (SP) console 68, and the service provider (SP) gateway control 70 during the activation process. Once the network administrator process 90 has obtained the activation key from the gateway 84, the activation key may be used to add the gateway 95 to the customer's service provider 60 account. After being redirected to the SP console 68, the customer logs in to the account (e.g., via network administrator process 90), and the activation key from the query string is used to fetch the metadata that the gateway 84 published to the gateway control 70. At least some of this metadata is displayed to the customer (e.g., via network administrator process 90). The metadata returned from gateway control 70 to the SP console 68 and displayed to the customer 90 is the metadata previously provided to gateway control 70 by the gateway 84, and may be used to inform the customer 90 about the gateway 84 to be activated. The displayed metadata may confirm to the customer 90 that the respective gateway 84 indicated by the metadata is the gateway 84 that has been installed at the customer's network. For example, an IP address of the gateway 84 may be displayed, which the customer 90 may confirm is the IP address of the gateway 84. In addition, the credentials (e.g, customer account number and/or other customer identification information) obtained from the customer 90 to log in to the account may be used in authenticating the customer 90 as the customer who owns the respective gateway 84 and associating the customer 90 with the respective gatewaey 84.

The customer 90 may also be prompted, by SP console 68, to enter additional information, for example a name for the gateway 84. After viewing and verifying the displayed metadata, the customer 90 may authorize registration of the gateway 84 with gateway control 70 via SP console 68, for example by selecting a "confirm" or "activate" or "register" user interface element. When the customer 90 authroizes registration of the gateway 84 via SP console 68, SP console 68 may pass the activation key obtained from the custsomer 90 to gateway control 70. Customer information such as a customer-supplied name for the gateway 84, the customer account ID, and so on, may also be passed to gateway control 70. The customer-supplied activation key is matched against the activation key previously provided to gateway control 70 by gateway 84. The customer information (e.g., the name of the gateway 84) is stored by gateway control 70 along with, for example, the metadata previously provided by the gateway 84.

In at least some embodiments, all data exchanged between SP console 68 and SP gateway control 70, and between gateway 84 and SP gateway control 70, may be encrypted. In at least some embodiments, sensitive data such as the customer's credentials, access key or secret key is not passed in the activation process.

Referring again to FIG. 16A, in at least some embodiments, the SP gateway control 70 is responsible for maintaining all information pertaining to registration and activation of the gateway 84. The gateway 84 meanwhile continuously polls SP gateway control 70 asking for information to generate a certificate signing request (CSR). Once SP gateway control 70 has received authorization from the customer 90 via SP console 68 as illustrated in FIG. 16B and matches the customer-supplied activation key to the activation key provided by gateway 84, SP gateway control 70 may respond to the gateway 84 GET request by providing metadata including but not limited to at least some of the customer information received from the customer 90 as indicated in FIG. 16B. The gateway 84 then generates a CSR and sends to SP gateway control 70. In response to the CSR, SP gateway control 70 generates a certificate and signs the certificate with gateway 84's previously provided public key. In at least some embodiments, the certificate may contain customer and/or gateway information, for exampe the customer account ID and the customer-supplied gateway 84 name. SP gateway control 70 then responds by sending the self-signed certificate, encrypted with the public key previously provided by gateway 84, to the gateway 84. The certificate may then be used for authentication in future communications from the gateway 84 to the service provider 60.

In at least some embodiments, to help prevent a customer from activating multiple gateways 84 using the same activation key, system/hardware-specific information may also be included along with the activation key which is published to the SP gateway control 70 by the gateway 84.

Figure 17A:
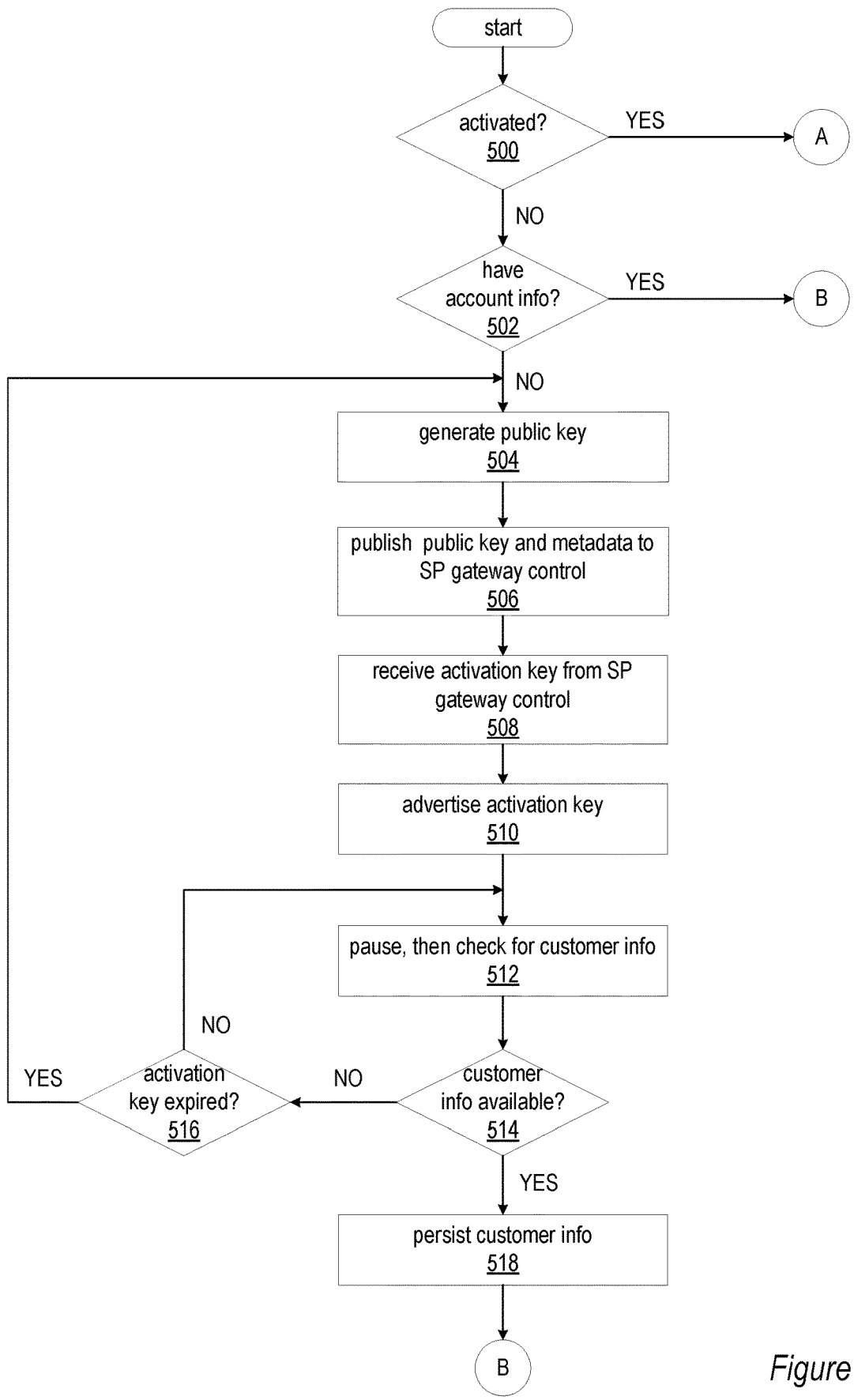
FIGS. 17A and 17B are a flowchart of the activation process from the perspective of a storage gateway, according to at least some embodiments.
Figure 17B:
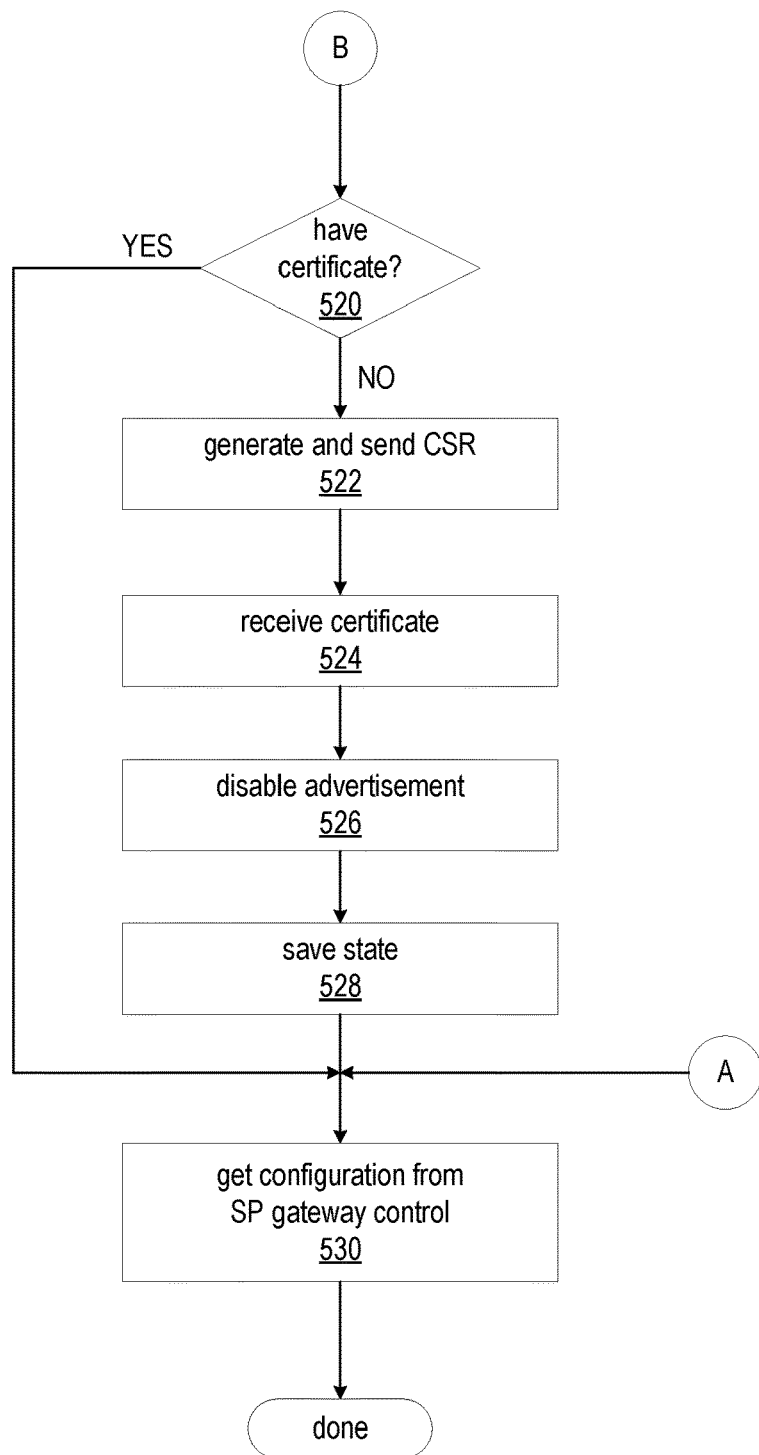

FIGS. 17A and 17B are a flowchart of the activation process from the perspective of a storage gateway, according to at least some embodiments. As indicated at 500 of FIG. 17A, after the gateway is installed and/or powered on, the gateway checks persistent storage to determine if it has already been activated. For example, the gateway may have been powered down for upgrade, maintenance, or for some other reason. If the gateway has been activated, the activation process proceeds to element 530 of FIG. 17B, where the gateway may obtain configuration information from the SP gateway control.

At 500 of FIG. 17A, if the gateway has not been previously activated, the activation process proceeds to element 502 of FIG. 17A, where the gateway checks if it has any persisted customer information for generating a certificate signing request (CSR). If the gateway has the persisted customer information, the process proceeds to element 520 of FIG. 17B. If the gateway does not have the persisted customer information, the process goes to element 504 of FIG. 17A. At 504, the gateway generates a public key (e.g., an RSA keypair). The gateway may also collect metadata about the hardware and/or software of the device that the gateway has been installed on. For example, the metadata may include an IP address, a MAC address, or other hardware and software characteristics of the device. The gateway then publishes the public key and metadata to the SP gateway control, as indicated at 506. At 508, the gateway receives an activation key from the SP gateway control. At 510, the gateway advertises the activation key on a fixed port (IP address:port) on the service customer's network.

As indicated at 512 through 516 of FIG. 17A, the gateway may then poll the SP gateway control for customer information that is required for generating a CSR. The customer information may include, but is not limited to, an account ID of the customer and a customer-specified name for the gateway. At 512, the gateway may pause, e.g. for a minute or for some other period, and then check to see if it has received the information from the SP gateway control. At 514, if the information has not been received, then the gateway checks to see if the activation key has expired, as indicated at 516. In at least some embodiments, the activation key is valid for a fixed time or lifespan (for example, 30 minutes), after which the activation key expires. At 516, if the activation key has not expired, then the activation process returns to element 512 of FIG. 17A to continue polling the SP gateway control. At 516, if the activation key has expired, then the activation process returns to element 504 of FIG. 17A to obtain a new activation key from the SP control plane.

At 514 of FIG. 17A, if the customer information has been received from the SP gateway control, then the activation process proceeds to element 518 of FIG. 17A, where the gateway stores the customer information to persistent memory. In at least some embodiments, the received customer information may be encrypted, and therefore the gateway may decrypt the information before storing the information. The process then proceeds to element 520 of FIG. 17B.

Referring to FIG. 17B, at 520, the gateway may check to see if it already has a certificate. At 520, if the gateway does already have a certificate, the process may proceed to element 530 of FIG. 17B, where the gateway may obtain configuration information from the SP gateway control. At 520, if the gateway does not have a certificate, the process proceeds to element 522. At 522, the gateway generates a CSR and sends the CSR to the SP control plane. At 524, the gateway receives a security certificate from the SP control plane in response to receiving the CSR; the certificate may serve as security credentials for the gateway. At 526, the gateway may disable the advertisement of the activation key (see step 510 of FIG. 17A). At 528, the gateway may save its current state to persist information (certificate, customer-specified gateway name etc.) that has been obtained in the activation process.

At this point, the activation process is complete. At 530, the gateway may obtain configuration information from the SP gateway control. In at least some embodiments, once the customer has been notified that the gateway has been successfully activated, the customer may configure the installed and activated gateway via the SP console. The SP console may provide a user interface, for example a web interface, to which the customer can log on to the customer's account, select the gateway (which may be identified by the customer-specified name), and specify a configuration for the gateway. In at least some embodiments, the SP console passes this configuration on to the SP gateway control, which then configures the specified gateway via a connection (e.g., and SSL/TCP connection) initiated by the gateway itself.

Activation Key Security

As indicated at 510 of FIG. 17A, the activation key is made available at a public IP address on the service customer's network, and may be passed unencrypted from the customer to the SP console in the query string. Although the activation key has a limited lifespan and the IP address is only known to the customer, there is still a short window of time in which the activation key is exposed at the IP:Port. While the activation key by itself is no good without the metadata that is also published by the gateway to the SP gateway control, the gateway may be vulnerable to some extent during this short window of time. In at least some embodiments, the customer may utilize security groups or other security measures to help prevent malicious users or processes from obtaining an activation key and activating someone else's gateway. In addition, since the customer is required to log in to the SP console process to activate a gateway, the gateway can be matched with the customer account that attempts to activate it.

Remote Gateway Management Using Gateway-Initiated Connections

Embodiments of a storage gateway may, for example, serve as an on-premise storage device and as an interface between a service customer's network and a storage service provided by a service provider. In at least some embodiments, an installed storage gateway may be activated, tracked, configured, and managed remotely via gateway control technology implemented at the service provider. FIG. 18 is a high-level block diagram that illustrates example gateway control architecture that may be employed in at least some embodiments. In at least some embodiments, as illustrated in FIG. 18, gateway control 70 may include a group of two or more gateway control servers 74 (e.g., gateway control servers 74A, 74B, 74C, . . . ). The multiple gateway control servers 74 may provide load balancing and high availability. During operation, at a given time, a particular installed and activated storage gateway 84 on a service customer's network 80 is connected to a particular one of the gateway control servers 74. However, note that the storage gateway 84 may be connected to a different gateway control server 74 at some other time.

A gateway control server 74 that is currently connected to storage gateway 84 may manage the storage gateway 84 by sending requests or commands to the storage gateway 84 via intermediate network 50. Requests initiated from the gateway control server 74 to manage the storage gateway 84 may include, but are not limited to, configuration change requests and operation requests. However, since the storage gateway 84 may be deployed behind a client network 80 firewall, a gateway control server 74 may not be able to reach the gateway 84 from outside the firewall unless an exception rule is created for the gateway 84. In addition, in at least some embodiments, the security model for the storage gateway 84 may dictate that external processes, including but not limited to service provider processes, are not allowed to initiate connections to the storage gateway 84.

In at least some embodiments, to enable a gateway control server 74 to send requests or commands to storage gateway 84 while enforcing the security model that does not allow the service provider to establish connections to the gateway 84, methods and apparatus for remote gateway management using gateway-initiated connections are provided. In the remote gateway management method, a gateway initiates a connection to the service provider by sending a connection request. In at least some embodiments, the connection is established to a particular gateway control server 74 via a load balancer 72. However, the gateway 84 does not send requests messages to the service provider via the gateway-initiated connection. Instead, the service provider (e.g., a gateway control server 74) holds the connection pending requests to be sent to the gateway 84, while the gateway 84 waits for a response. Upon receiving a request for the gateway 84, for example from a network administrator process 90 or some other process on the client network 80 on which the gateway 84 is instantiated, the service provider (e.g., a gateway control server 74) sends the request to the gateway 84 via the gateway-initiated connection that the service provider (e.g., a gateway control server 74) has been holding. The gateway 84 may also send a response to a request to the service provider 80 via the gateway-initiated connection.

In at least some embodiments, a gateway control server 74 to which a connection from gateway 84 is established (e.g., gateway control server 74A) may register the connection with registration service 76. If a gateway control server 74 receives a request for a gateway 74 to which it does not hold a connection, the gateway control server 74 may query the registration service 76 to find out which gateway control server 74 holds the connection, and forward the request to the gateway control server 74 that holds the connection to the gateway 84. In some embodiments, as an alternative, a gateway control server 74 that receives a request for a gateway 74 to which it does not hold a connection may simply broadcast the request to two or more other gateway control servers 84.

In at least some embodiments, the service provider 80 may employ a ping process to monitor the gateway-initiated connections. In the ping process, a gateway control server 84 that maintains a connection to a gateway 74 may periodically or aperiodically send a ping message to the gateway 84. The gateway 84 responds to the ping message. Upon detecting that the gateway 84 has not responded to the ping message(s) for some specified time-out period, the gateway control server 74 may drop the connection, and may un-register the connection with the registration service 76.

In at least some embodiments, the ping messages may be sent to the gateway(s) 74 at periodic intervals. At least some embodiments may adjust the ping intervals according to the reliability of the connections to specific gateways 84 so that ping messages are sent at shorter intervals to a gateway 84 for which the connection has been unreliable and at longer intervals to a gateway for which the connection has been generally reliable. The ping interval may be increased over time to a given gateway 84 as the connection remains reliable, and may be decreased to a given gateway 84 for which the connection has been unreliable.

In at least some embodiments, a gateway 84 may detect if its gateway-initiated connection has been terminated or dropped. Upon detecting that the connection has terminated, the gateway 84 may send another connection request to the service provider 80 to re-establish the connection. Note that the connection may be re-established to a different gateway control server 74 than the one that formerly held the connection. In at least some embodiments, a gateway 84 may determine that its gateway-initiated connection has been dropped by monitoring the ping messages and determining that a ping message has not been received over the connection for a specified time-out period.

Thus, in the remote gateway management method, a gateway 84 establishes a connection to the service provider, anticipating and waiting for request(s) from the service provider. The service provider holds the connection pending requests for the gateway 84. Upon receiving a request for the gateway 84, the service provider forwards the request to the respective gateway over the gateway-initiated connection. The service provider and the gateway both monitor and manage the connection so that, if the connection drops for some reason, the drop is detected and the gateway 84 re-establishes the connection.

FIG. 19 is a flowchart of a method for remote gateway management using a gateway-initiated connection, according to at least some embodiments. As indicated at 600, the gateway establishes a connection to a gateway control server via a connection request. For example, the gateway may establish an outbound SSL/TCP connection with the gateway control server through a load balancer, as illustrated in FIG. 18, via a connection request. As indicated at 602 of FIG. 19, once the connection to the gateway is established, the gateway control server holds on to the connection and keeps the connection alive. As indicated at 604 of FIG. 19, the gateway control server receives a request for the gateway. For example, a gateway control server 74 may receive a configuration request or operation request for the gateway 84 from the respective network administrator process 90 via a console process 68, as illustrated in FIG. 18. After the gateway control server receives the request for the gateway, the gateway control server forwards the request to the gateway via the gateway-initiated connection, as indicated at 606 of FIG. 19.

Referring again to FIG. 18, a service customer may access the service provider console 60 to initiate configuration change requests or operation requests for an indicated storage gateway 84. For example, a network administrator, via network administrator process 90. may send a request to a gateway 84 via a console process 68. The console process 68 may then send the request to a gateway control server 74 behind load balancer 72. However, the gateway control server 72 to which the console process 68 sends the request may not be the gateway control server 72 that holds the connection to the respective gateway 84. For example, gateway control server 72B may hold the connection to gateway 84, while the request for gateway 84 may be sent to gateway control server 72A. Therefore, a gateway control server 72 that receives the request from console process 68 (e.g., gateway control server 72A) may need to forward the request to the gateway control server that holds the connection to the gateway 84 (e.g., gateway control server 72B) in order to deliver the request to the appropriate gateway 84. Thus, at least some embodiments may provide a method or methods for a gateway control server 72 (e.g., server 72A) to get a request for a particular gateway 84 received from the console process 68 to the gateway control server 72 (e.g. server 72B) that currently holds a connection to the particular gateway 84 indicated by the request.

In some embodiments, to accomplish this, a gateway control server 72 (e.g., server 72A) that receives a request for a gateway 84 to which the server 72 does not hold a connection may broadcast the request to all of its peer gateway control servers 72. FIG. 20 is a flowchart of a method for a gateway control server to broadcast a gateway request to its peer servers, according to some embodiments. As indicated at 620, when each gateway control server 72 is instantiated, the server 72 may register with a registration service 76. When a gateway control server 72 exits, the server 72 is unregistered from the registration service 76. The registration service 76 may, for example, be backed by a database service or a distributed storage service. As indicated at 622, a gateway control server 72 (e.g., server 72A) may receive a request for a gateway 84 to which the server 72 does not hold a connection. To broadcast the request to its peer gateway control servers 72, the gateway control server 72 (e.g., server 72A) may poll the registration service 76 to discover its peer gateway control servers 72 (e.g., servers 72B and 72C), as indicated at 624. The gateway control server 72 (e.g., server 72A) may then forward the gateway request to all of the servers 72 discovered via the registration service 76, as indicated at 626. The gateway control server 72 that currently holds the connection to the gateway 84 indicated by the request (e.g., server 72B) may then send the request to the respective gateway 84.

Figure 21:
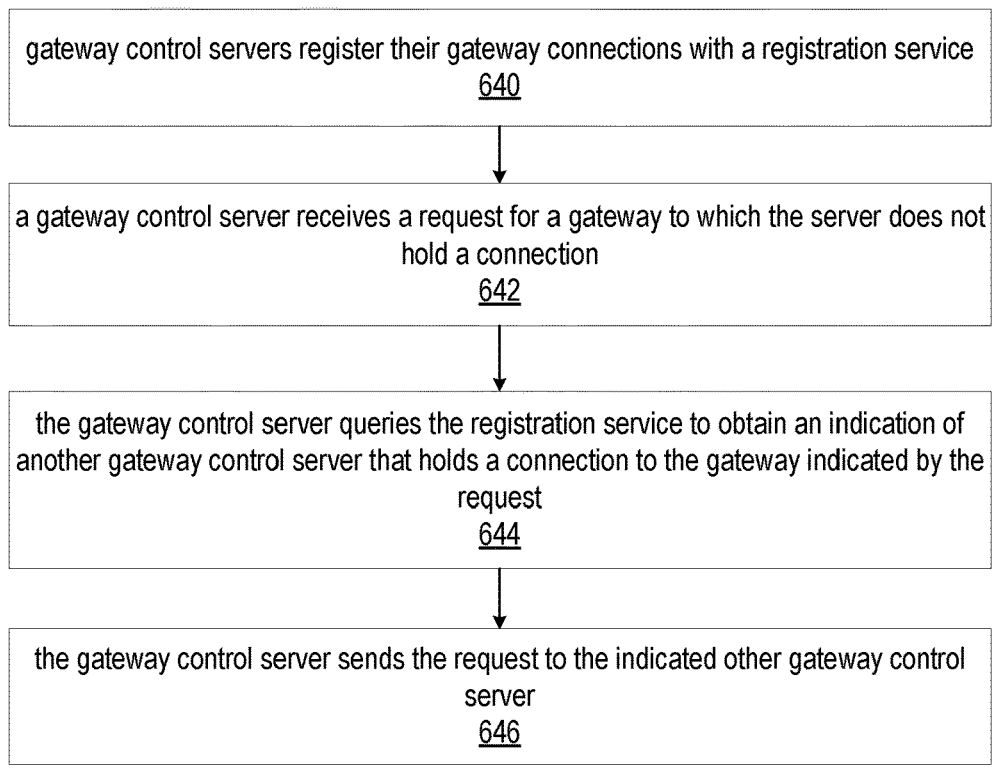
FIG. 21 is a flowchart of an alternative method for getting a gateway request to the appropriate gateway control server, according to some embodiments.

FIG. 21 is a flowchart of an alternative method for getting a gateway request to the appropriate gateway control server, according to at least some embodiments. As indicated at 640, when a gateway control server 72 (e.g., server 72B) receives a connection request from a gateway 84, the server 72 registers the pairing with the gateway 84 in the registration service 76. As indicated at 642, a gateway control server 72 (e.g., server 72A) may receive a request for a gateway 84 to which the server 72 does not hold a connection. As indicated at 644, the gateway control server 72 (e.g., server 72A) that receives the request for a gateway 84 to which the server 72 does not hold a connection may then query the registration service 72 to find out which gateway control server 72 (e.g., server 72B) currently holds a connection with the gateway 84, and may then forward the request to the gateway control server 72 (e.g., server 72B) indicated by the registration service 76, as indicated at 646. The gateway control server 72 that currently holds the connection to the gateway 84 indicated by the request (e.g., server 72B) may then send the request to the respective gateway 84 via the gateway-initiated connection.

In at least some embodiments, when a request is delivered to and handled by a gateway 84, a status is returned from the gateway 84 to the gateway control server 72 that currently holds the connection to the gateway 84 (e.g., server 72B), which subsequently returns the status to the gateway control server 72 from which it previously received the forwarded request (e.g., server 72A), which then returns the status to the console process 68. The console process 68 may then provide an indication of results of the request to the customer process (e.g., network administrator process 90) that initiated the request. If a request fails to reach the target gateway 84 for some reason, for example if the gateway 84 indicated by the request is unavailable or cannot be found, the console process 68 may provide an indication of failure of the request to the customer process (e.g., network administrator process 90) that initiated the request. The customer process may retry the request, if necessary or desired.

Figure 22:
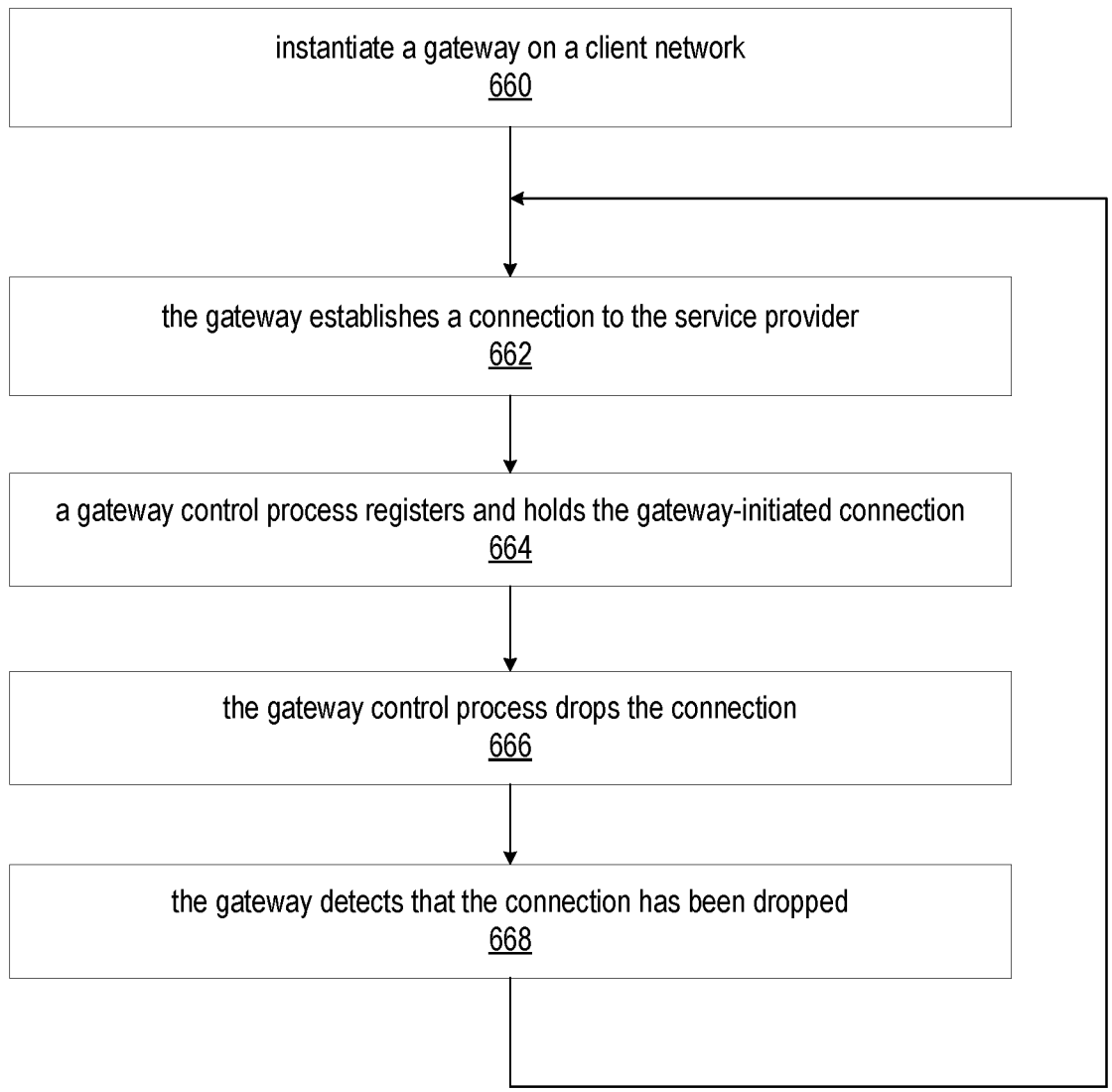
FIG. 22 is a flowchart of a method for establishing, monitoring and maintaining gateway-initiated connections, according to at least some embodiments.

FIG. 22 is a flowchart of a method for establishing, monitoring and maintaining gateway-initiated connections, according to at least some embodiments. As indicated at 660, a gateway may be instantiated on a client network. As indicated at 662, after instantiation, the gateway sends a connection request to the service provider to establish a secure connection (e.g., an SSL (Secure Socket Layer)/TCP connection) to the service provider. In at least some embodiments, a gateway control process at the service provider may hold the connection, and may register the connection with a registration service, as indicated at 664. Requests for the gateway received by the service provider may then be forwarded to the gateway over the gateway-initiated connection.

As indicated at 666, the gateway control process may drop the connection. For example, in at least some embodiments, the gateway control process may periodically or aperiodically ping the gateway over the connection and may, upon detecting that the gateway is not responding to the ping, drop the connection. If registered with a registration service, the gateway control process may unregister the connection.

As indicated at 668, the gateway may detect that the connection has been dropped. For example, in at least some embodiments, the gateway control process may periodically or aperiodically ping the gateway over the connection. The gateway may detect that the connection has been dropped by determining that pings from the service provider are not being received over the connection.

Note that other methods for detecting dropped connections from either the service provider side or the client network/gateway side may be employed in some embodiments.

Gateway Proxies

FIG. 18, described above, illustrates a service provider network that includes a gateway control 70 implemented as a gateway control plane that includes multiple gateway control servers 74. In at least some embodiments, the service provider network may include a gateway proxy plane that includes multiple gateway proxy nodes and that may be used by the gateway control plane to communicate with storage gateways. The gateway proxies may be used to hold and manage the gateway-initiated connections for the gateway control servers 74. The gateways 84 initiate connections to the gateway proxies; the gateway proxies may maintain the communications channels to the gateways 84, and may help in ensuring the secure exchange of messages between the service provider (e.g., the gateway control servers 74) and the gateways, as well as helping to prevent misuse such as multiple copies of the same gateway 84.

Gateway-Proxy Interactions

Figure 23A:
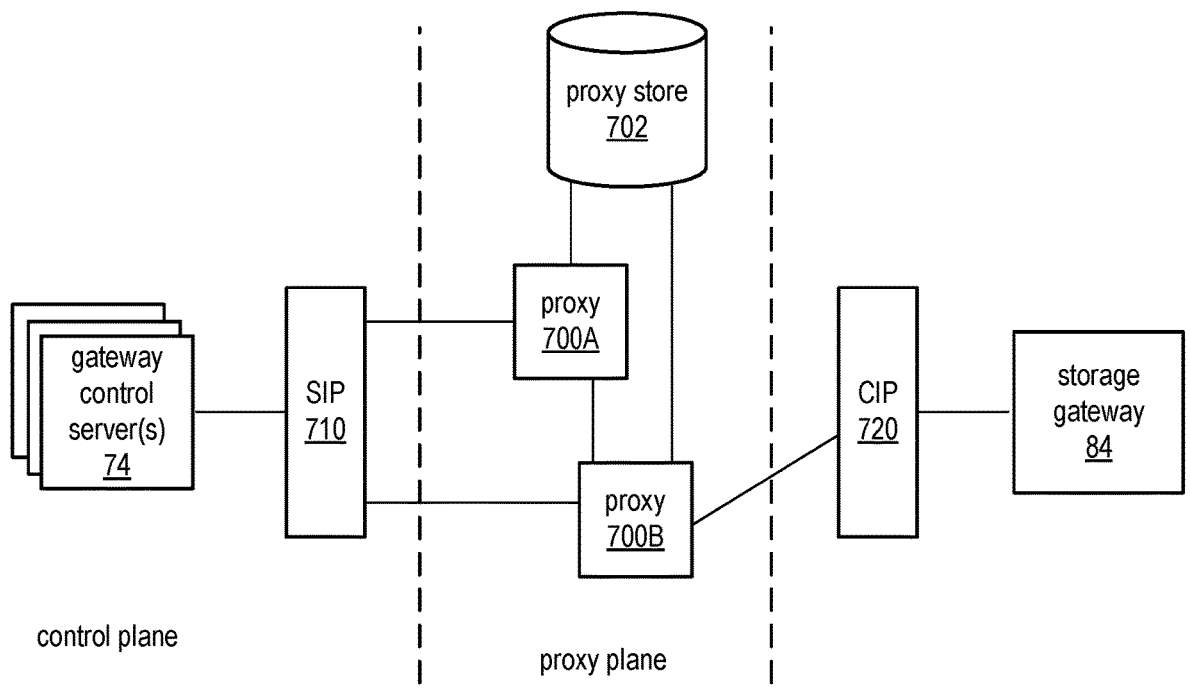
FIG. 23A is a block diagram that broadly illustrates an architecture for a service provider network that includes a gateway proxy plane, according to at least some embodiments.

FIG. 23A is a block diagram that broadly illustrates an architecture for a service provider network that includes a gateway proxy plane, according to at least some embodiments. The gateway proxy plane may include two or more proxy nodes 700, a proxy store 702, a client-side interface process (CIP) 720 that is exposed to the external network, and a server-side interface process (SIP) 710 between the proxy nodes 700 and gateway control server(s) 74 that is not exposed to the external network. In some embodiments, the gateway proxies 700 may be implemented on the same physical devices as the gateway control server(s) 74. In other embodiments, the gateway proxies 700 may be implemented on separate devices than the gateway control server(s) 74.

A storage gateway 84 that is installed and activated initiates a secure connection request (e.g., an SSL/TCP connection request) to the gateway proxy nodes 700 via the CIP 720. The proxy node 700 (in this example, proxy node 700B) that receives the connection request examines the gateway's certificate associated with the connection request to find the gateway identifier and customer account identifier of the gateway 84 that initiated this connection. The customer and gateway 84 may be authenticated using the gateway identifier and customer account identifier from the certificate. After authenticating the customer and gateway 84, the proxy node 700 then publishes to the proxy store 702 that it is the authoritative proxy 700 to communicate with the connected gateway 84. The proxies (e.g., proxy 700A and 700B) may query the proxy store 702 to discover other proxies that currently hold connections to particular gateways.

In at least some embodiments, proxy store 702 may be implemented as a database. The database may be either a distributed or a centralized database. In at least some embodiments, the proxy store 702 may store the following associations:

(gateway ID, account ID, proxy endpoint)

When a message is to be sent to a gateway 84, a proxy 700 may query the proxy store 702 to find which proxy 702 has a connection to the gateway 84. In at least some embodiments, there exists only one entry per gateway 84 in the proxy store 702.

Gateway Control Server-Proxy Interactions

Figure 23B:
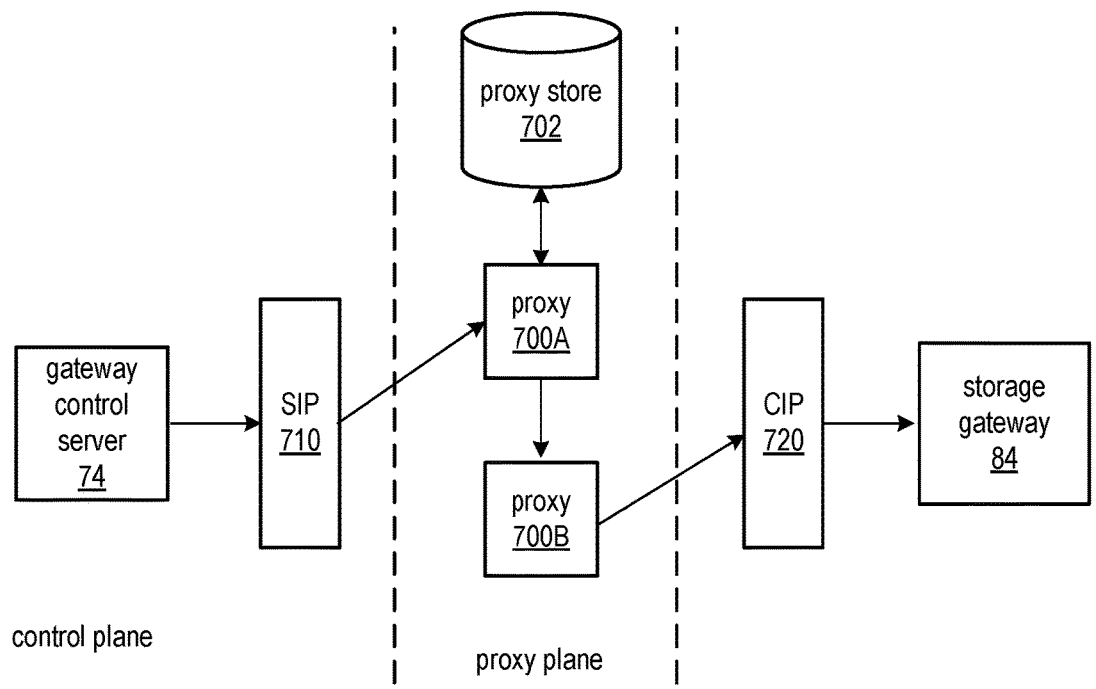
FIG. 23B illustrates a gateway control server messaging a gateway through a gateway proxy plane, according to at least some embodiments.

FIG. 23B illustrates a gateway control server messaging a gateway through the gateway proxy plane, according to at least some embodiments. As shown in FIG. 23B, in at least some embodiments, the gateway control server 74 may have a message that needs to be sent to a particular gateway 84. The gateway control server 74 sends the message to the gateway proxy nodes 700 via the SIP 710. If the proxy node 700 that receives the message holds the connection to the gateway 84, the proxy node 700 forwards the message to the gateway 84 via the connection. However, if the proxy node 700 that receives the message does not hold the connection to the gateway 84, the proxy node 700 queries the proxy store 702 to determine which proxy node 700 holds the connection to the gateway 84, and forwards the message to the authoritative proxy node 700 (in this example, proxy 700B). The authoritative proxy node 700 then forwards the message to the gateway 84 via the connection.

Figure 23C:
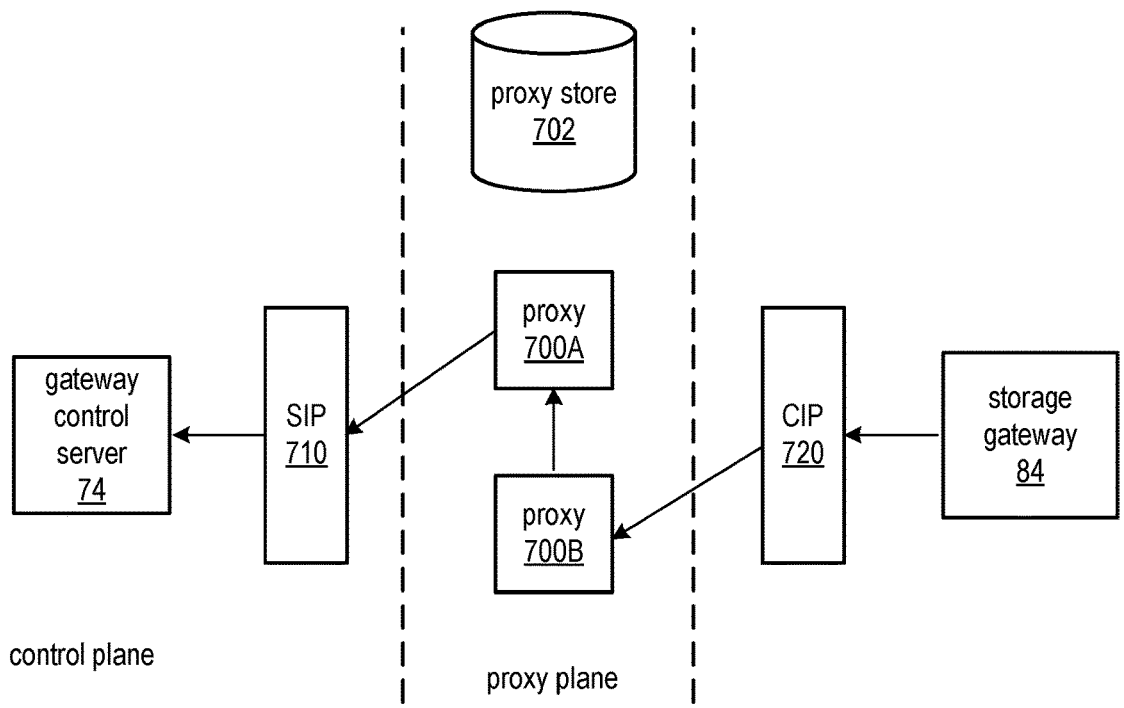
FIG. 23C illustrates a gateway responding to a gateway control server request through the gateway proxy plane, according to at least some embodiments.

FIG. 23C illustrates a gateway responding to a gateway control server request through the gateway proxy plane, according to at least some embodiments. In at least some embodiments, a response from gateway 84 to gateway control server 74 may follow the reverse path that the request from the gateway control server 74 to the gateway 84 followed as shown in FIG. 23B, starting at the CIP 720 receiving the response from gateway 84. The CIP 720 sends the response to the proxy node (proxy 700B) from which it received the request. Note that proxy 700B does not know which gateway control server 74 the response is for. Proxy 700B completes the request by sending the response to the proxy node (proxy 700A) from which it received the request. Proxy 700A then sends the response to the gateway control server 74 that initiated the request.

Connection Monitoring and Management

In at least some embodiments, a ping process may be implemented that is used by the proxies in managing the gateway-initiated connections. In at least some embodiments, a gateway 84 initiates a secure connection, e.g. an SSL/TCP connection, to a gateway proxy 700 via the CIP 720, as previously described. The gateway proxy 700 may periodically or aperiodically send a ping message to the gateway 84. Each ping message may include a timeout; if the gateway 84 does not receive a ping within the time interval, it closes the current connection and re-initiates a connection via the CIP 720. In at least some embodiments, there is only one proxy-gateway mapping in the proxy store 702 at any point in time. If a gateway proxy 700 sends a ping and does not get a response from the gateway 84, it closes its connection to the gateway 84.

In at least some embodiments, on every ping, the gateway proxy 700 checks to see if it is the authoritative proxy for a given gateway 84 by querying the proxy store 702 to determine if another proxy 700 has published a connection to the gateway 84. If it is not the authoritative proxy, the proxy 700 closes the connection to the gateway 84. This may handle cases where multiple connections to the proxy nodes 700 have been initiated by the same gateway 84, for example if the certificate of a gateway 84 has been copied to another gateway and both gateways try to initiate connections.

Figure 23D:
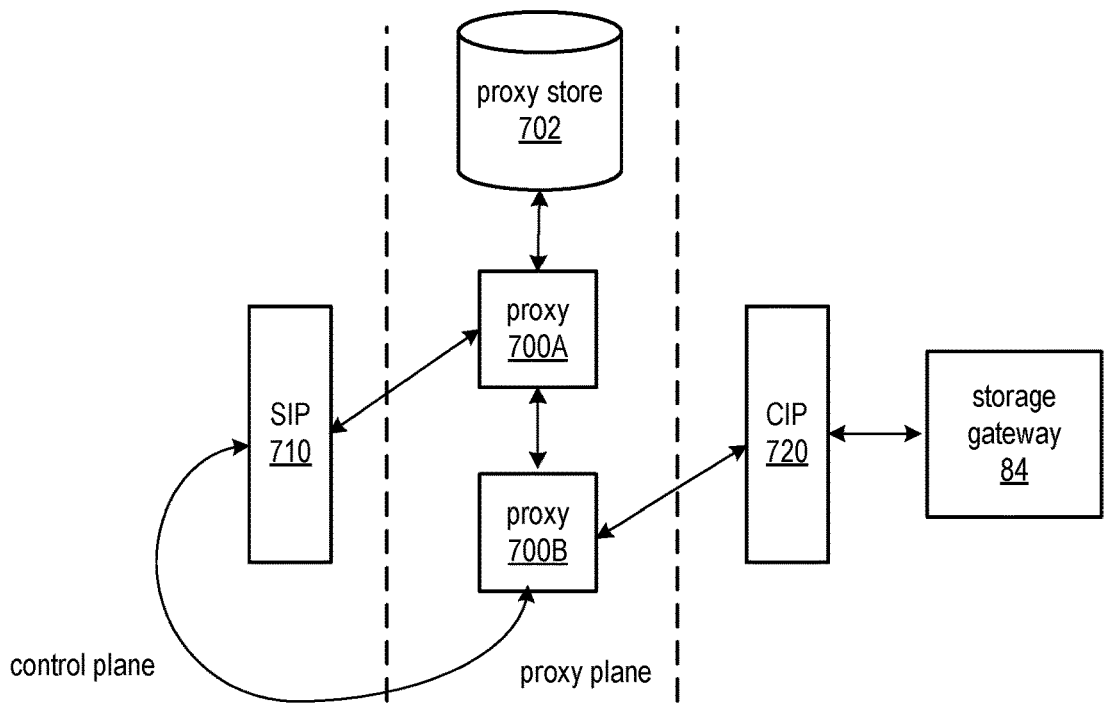
FIG. 23D illustrates ping message exchange for a gateway proxy plane, according to at least some embodiments.

FIG. 23D illustrates ping message exchange for a gateway proxy plane, according to at least some embodiments. In at least some embodiments, a ping in relation to gateway proxies is an end-to-end ping. A reason for pings is that the TCP "keepalive" functionality has a minimum interval of 2 hours, while embodiments may need to detect connection timeouts or terminations at shorter time intervals.

In at least some embodiments, a ping follows the path as shown in FIG. 23D. A gateway proxy node (in this example, proxy 700B) sends a ping message via the SIP 710. The message hits one of the gateway proxy nodes 700, in this example proxy 700A. Proxy 700A finds the authoritative proxy 700 (in this example, proxy 700B) for the gateway 84 by querying the proxy store 702, and forwards the pin message to proxy 700B. Proxy 700B forwards the message to the gateway 84, and the reply from the gateway 84 follows the same path. In at least some embodiments, once proxy 700B gets a reply to a ping from the gateway 84, it increases its ping interval to the gateway 84. If a gateway 84 connection breaks, the ping interval may be reset to a minimum value. Thus, poor gateway-proxy connections tend to get pinged more often.

The end-to-end ping method described above, in which the proxy 700 initiates the ping message by first sending the ping message to the SIP 710, may help to ensure that the gateway proxy nodes 700 are reachable from the control plane. If a ping fails, the proxy 700 may assume that it is not reachable from the control plane (e.g., due to a network partition) and close the connection to the gateway 84.

Remote Gateway Management Using Long-Polling Connections

In some embodiments, a long polling technique may be used for gateway-initiated connections. Referring back to FIG. 18, long polling is a polling technique that emulates an information push from a server (e.g., a gateway control server 74) to a client (e.g., the storage gateway 84). In the long polling technique, a client (e.g., the storage gateway 84) initiates a long-polling connection to the server (e.g., a gateway control server 74) and requests information from the server as in a standard client/server poll. However, if the server does not have any information available for the client, instead of sending an empty response, the server holds the client's request and waits for information for the client to become available. Once the information becomes available, the server (e.g., a gateway control server 74) may respond to the client's long polling request, the response including the information to be sent to the client (e.g., the storage gateway 84).

In a gateway-initiated connection method that uses long-polling, the gateway 84 establishes a connection to a gateway control server 74 via a long polling request. For example, the gateway 84 may establish an outbound SSL/TCP connection with the gateway control server 74 through a load balancer 72, as illustrated in FIG. 18, via a long polling request. The gateway control server 74 holds on to the request and keeps the connection alive. The gateway control server 74 receives a request for the gateway 84. For example, a gateway control server 74 may receive a configuration request or operation request for the gateway 84 from the respective network administrator process 90 via a console process 68, as illustrated in FIG. 18. After the gateway control server 74 receives the request for the gateway 84, the gateway control server 74 sends a response to the gateway's long polling request; the response includes the request for the gateway 84 (e.g., a configuration request or operation request). In some embodiments, as an alternative, the gateway control server 74 may send the received request to the gateway 84 on the established connection to the gateway that the gateway control server is maintaining without responding to the long polling request.

Block Storage I/O Operations on a Storage Gateway

Embodiments of a storage gateway may be implemented as a cached gateway or a shadowing gateway, as previously described. In an example embodiment, a cached gateway may be though of as an on-premise block-based appliance that leverages on-premise (local) storage for most frequent accessed data and remote storage provided by a storage service for essentially infinite total capacity. FIG. 6 is a high-level block diagram that broadly illustrates the architecture of and data flow in an example network environment in which an embodiment of a cached gateway is implemented. A cached gateway may serve as an interface between a service customer's local network and a storage service at a service provider's network. In at least some embodiments, a cached gateway may expose an iSCSI interface to processes on the customer network, although other data interfaces may be exposed in some embodiments. As such, the cached gateway may appear as a data interface target (e.g., an iSCSI target) operating within the client network, e.g., the cached gateway may appear on the client network as a storage array. The cached gateway may, for example, expose logical unit numbers (LUNs), e.g., block-based storage devices such as hard disks, to processes executing on devices within the client network. The processes in turn may initiate data sessions (e.g., SCSI sessions) with LUNs and send data commands (e.g., SCSI commands) to the cached gateway.

Figure 24:
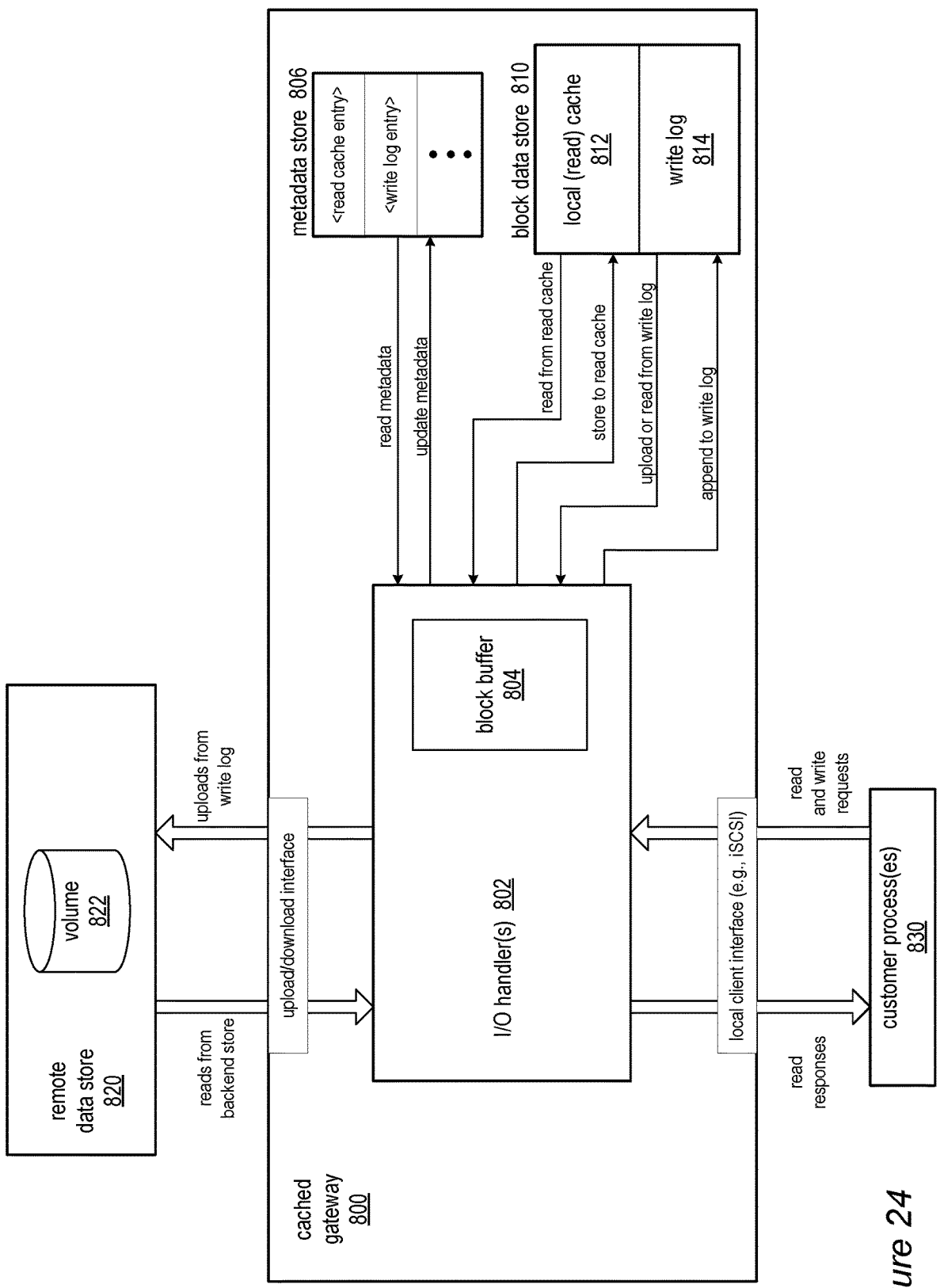
FIG. 24 illustrates a general architecture for and data I/O operations of a cached gateway, according to at least some embodiments.

FIG. 24 illustrates a general architecture for and data I/O operations of a cached gateway, according to at least some embodiments. In general, in a cached gateway 800, when write data is received from a customer process 830, the data is appended to a write log 814; the data is later uploaded to the remote data store 820 from the write log 814 by an upload process. Metadata for the write data relative to a block, e.g. block location, block type, offset(s) and length, may be added to a metadata store 806. In at least some embodiments, the metadata store 806 may be implemented as a database, for example a Berkeley database (BDB). A cached gateway 800 may also locally cache at least some data to a local cache 812, e.g. frequently and/or recently used data, which may improve response to customer read requests as some reads may be satisfied from local cache 812 instead of from the remote data store 820. Local cache 812 may also be referred to as a read cache. The metadata store 806 may also contain location and other information for locally cached read data in local cache 812. While FIG. 24 shows an embodiment in which one metadata store 806 includes both read cache entries and write cache entries, in some embodiments the read cache entries and write cache entries may be maintained in separate metadata stores 806. In at least some embodiments, data read requests from customer processes 830 may be serviced from the write log 814 or local cache 812, if possible; the requested data may be fetched from the remote data store 830 if not. Data from the local cache 812 or the remote data store 830 that is fetched and buffered (e.g., to a block buffer 804) to satisfy a read request may be updated with data from the write log 814, if updates exist in the write log 814 for the data, before the data is returned to the customer process 830 to satisfy the read request.

In at least some embodiments, both the write log 814 and data cache 812 may be implemented in a common, local block-based data store 810. The block data store 810 may be implemented in volatile memory, non-volatile memory, or in a combination thereof. The block data store 810 may be implemented on physical memory within the physical device on which cached gateway 800 is implemented, on memory external to the physical device on which cached gateway 800 is implemented (e.g., on one or more storage devices allocated to the gateway 800 by the customer), or on a combination thereof.

Write log data and cached read data may both be stored to the block data store 810 in a block storage format, for example as 4 MB (four megabyte) blocks. The cached read blocks in the block data store 810 may be considered as a read cache, and the write log blocks in the block data store may be considered as a write buffer. The metadata store 806 may contain entries for locating both read cache 812 blocks and write log 814 blocks in the block data store 810. Blocks may be read from the read cache 812 (or from the write log 814) to satisfy read requests, and blocks may be uploaded from the write log 814 to the remote data store 820 via an upload process. In at least some embodiments, when uploading a write block from the write log 814, the uploaded data may be added to the read cache 812 as a new read block. The uploaded write log 814 blocks may be marked as "free" in the block data store 810, and the metadata store 806 appropriately updated to reflect the changes to the block data store 810.

In at least some embodiments, a write request may modify or mutate only a relatively small portion of a block. Thus, in at least some embodiments, when uploading a block from write log 814, only the mutated portion may be uploaded to remote data store 820, for example using a data deduplication technique as previously mentioned. In addition, the write log 814 may include two or more overlapping writes (i.e., writes to the same logical block) stored in different write log 814 blocks. When uploading write data from the write log 814, the two or more overlapping writes may be combined for uploading. This combining may be performed outside the data store, e.g. in a block in block buffer 804; the blocks in write log 814 itself are not mutated.

As mentioned above, in at least some embodiments, when uploading a write block from the write log 814, the uploaded data may be added to the read cache 812 as a new read block. For at least some cases, for example when a write block includes numerous mutations and/or when a large portion of the write block has been mutated, the write block is simply copied to the read cache 812 as a new read block, and the metadata store 806 is updated. However, as mentioned above, a write request may modify or mutate only a relatively small portion of a write log 814 block. Thus, in at least some cases, the respective block may first be fetched from remote data store 820, and the fetched block updated with the mutation(s) from the write log 814, before adding the block to the read cache 812, to ensure that the entire block in read cache 812 is up-to-date. As mentioned, the write log 814 may include two or more overlapping writes (i.e., writes to the same logical block) stored in different write log 814 blocks, and thus the fetched block may be updated according to one or more write log 814 blocks. In at least some embodiments, the fetched block may be stored to block buffer 804 for updating from the write log 804 blocks before being added to the read cache 812.

Generally, new writes are stored to previously freed write log 814 blocks in the block data store 810; however, if the block data store 810 is detected as being full or nearly full, one or more cached read blocks may be purged to make room for the write data. Note that read blocks may be purged from the block data store 810 for other reasons, for example to clear space for new read data. Different techniques or policies may be used to purge read blocks from the block data store 810 in various embodiments. For example, in some embodiments, a least recently used (LRU) policy may be applied to purge the stalest read blocks from the block data store 810.

In at least some embodiments, the cached gateway 800 may provide an interface to two or more volumes 822 on the remote data store 820. In at least some embodiments, a separate write log 814 and read cache 812 may be maintained by the cached gateway 800 for each volume 822. In at least some embodiments, the separate write logs 814 and read caches 812 for two or more volumes 822 may be implemented in the same block data store 810. However, in at least some embodiments, the write logs 814 and read caches 812 for different volumes 822 may be logically or physically separated on the block data store 810. In addition, in at least some embodiments, separate metadata stores 806 may be maintained for the separate volumes 822.

While FIG. 24 shows read cache 812 and write log 814 as logically separate in block data store 810, in at least some embodiments read blocks and write log blocks for a given volume 822 may be physically intermixed in block data store 810. For example, a first physical block may be a read block, a second through fifth physical blocks may be write blocks, the next two physical blocks may be read blocks, and so on.

Figure 25:
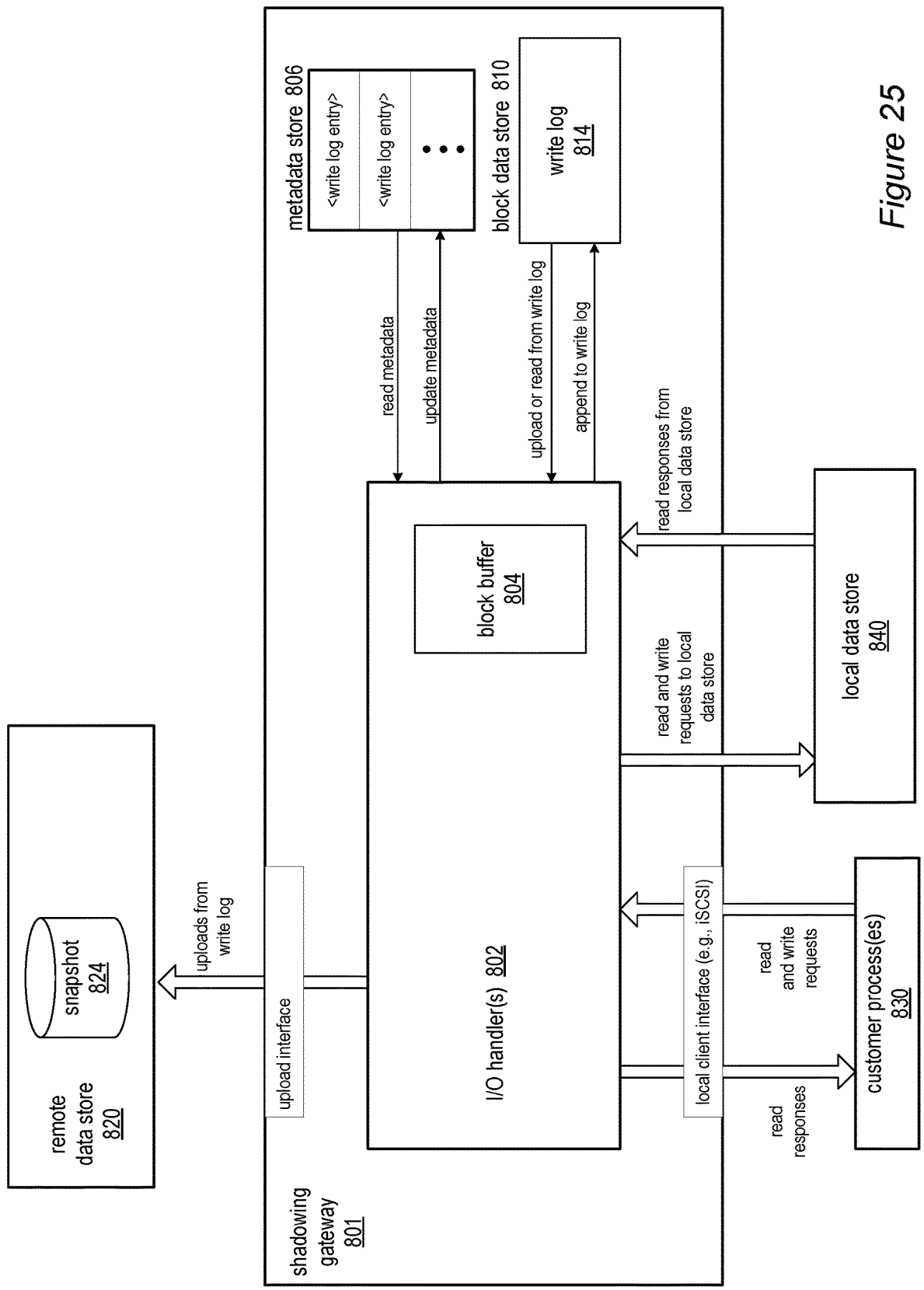
FIG. 25 illustrates a general architecture for and data I/O operations of a shadowing gateway, according to at least some embodiments.

As mentioned, FIG. 24 illustrates a general architecture for and data I/O operations of a cached gateway, according to at least some embodiments. However, a storage gateway may also be configured as a shadowing gateway, for example as illustrated in FIG. 7. FIG. 25 illustrates a general architecture for and data I/O operations of a shadowing gateway, according to at least some embodiments. A shadowing gateway 801 may include a similar architecture, components, and data I/O operations as illustrated and described for cached gateway 800 in FIG. 24, except that a shadowing gateway 801 does not include a read cache 812 or entries in metadata store 806 for the read cache 812, and the read-related operations described above for a cached gateway are not performed. Write operations for a shadowing gateway may be similar to those for a cached gateway, except that writes are not added to a read cache. In addition, read and write requests from customer process(es) 830 are forwarded to a local data store 840. Write data from the write requests, however, are shadowed to remote data store 820. In at least some embodiments, the write data are appended to the write log 814 in block data store 810, and the write data in the write log 814 are periodically or aperiodically uploaded to the remote data store 820, which maintains a snapshot 824 of the primary data store on local data store 840.

In at least some embodiments, the write log 814 and write operations for cached gateways, for example as illustrated in FIG. 24, and for shadowing gateways, for example as illustrated in FIG. 25, may be optimized for write performance. In at least some embodiments, at least some I/O operations of a gateway 800 may use block data store 810 as a sequential data store. In particular, the write log 814 may be treated as a sequential data structure, and write operations to the write log 814 may be implemented as sequential write operations. In at least some embodiments, the write log 814 may be treated as a one-dimensional data buffer implemented as a linear or circular queue. For cached gateways, data downloaded from remote data store 820 may be stored in read cache 812 separately from the write data sent from the customer process(es) 830 to the gateway 800, which is stored in write log 814. For both cached gateways and shadowing gateways, write requests may be received from the customer process(es) 830 in any order (i.e., the write requests may be non-ordered or non-sequential), and write data indicated by the non-ordered write requests received from the customer process(es) 830 may be of arbitrary sizes and may be directed to arbitrary locations or offsets in the target data store. However, the arbitrary write data received from the customer process(es) 830 in non-ordered write requests is sequentially written and appended to the write log 814. In at least some embodiments, the appending may be done at a sub-block level; that is, two or more instances of write data may be appended within the same block in the write log 814. Metadata for the updates to the write log 814, e.g., offset and length of the write data in the write log 814 blocks as well as offset in the target data store, is stored to the metadata store 806.

FIG. 26 is a flowchart of a method for writing to a write log on a block data store, according to at least some embodiments. Implementing the write log 814 as a sequential data structure, for example as a one-dimensional queue, may enable the I/O handler 802 to perform sequential writes of arbitrary write data received from customer process(es) 830 to the block data store 810. As indicated at 850, one or more write requests may be received from a customer process 830. The write requests may be received in any order (i.e., the write requests may be non-ordered), and the write data indicated by the write requests received from the customer process(es) 830 may be of arbitrary sizes and may be directed to arbitrary locations or offsets in the target data store. As indicated at 852, sequential writes may be performed to sequentially write the arbitrary write data to the write log 814 on block data store 810. As indicated at 854, the data in the sequential writes to the block data store 810 may be written to contiguous locations in the block data store 810, for example in contiguous locations (e.g., sectors) on a disk storage device that implements the block data store 810. Note that contiguous locations may be, but are not necessarily, within the same write log block. Using sequential writes to a storage device may reduce or eliminate the need to perform random sector seeks on the underlying storage device. Performing random sector seeks negatively impacts I/O operations. For example, disk I/O throughput may be increased by 10× to 100× by using contiguous writes when compared to non-sequential, non-contiguous writes that require random sector seeks. As indicated at 856, the metadata store 806 may be appropriately updated to reflect the writes to the write log 814. In at least some embodiments, metadata for the writes may be sequentially added to the metadata store 806, which may allow reading of the metadata store 806 by processes that need to access data in the write log 814 more efficient than if the metadata was more randomly added to the metadata store 806.

In at least some embodiments, it may not always be possible to write all write log 814 data to contiguous locations in the block data store 810. For example, there may be a read cache 812 block between two write log 814 blocks. Thus, at 854, embodiments may attempt to write the write log 814 data to contiguous locations as much as possible, but may have to skip some locations (e.g., blocks) if the locations are marked as being used. The metadata store 806 is appropriately updated so that the write log 814 data can be located, even if the data are not stored in contiguous blocks.

As described above, logically, the arbitrary write data is appended to the end of the write log. To implement this, in at least some embodiments, the block buffer 804 is reserved in blocks of the same size used in the write log 814 (e.g., 4 MB blocks). An allocated buffer block is appended to until full. Another buffer block may be allocated for appending new write data; full buffer blocks may be asynchronously and sequentially flushed to the write log 814 on the block data store. Full blocks in the write log 814 may be asynchronously and sequentially uploaded to the remote data store 820 by the upload interface; uploaded blocks from the write log 814 may be marked as "free".

Figure 27:
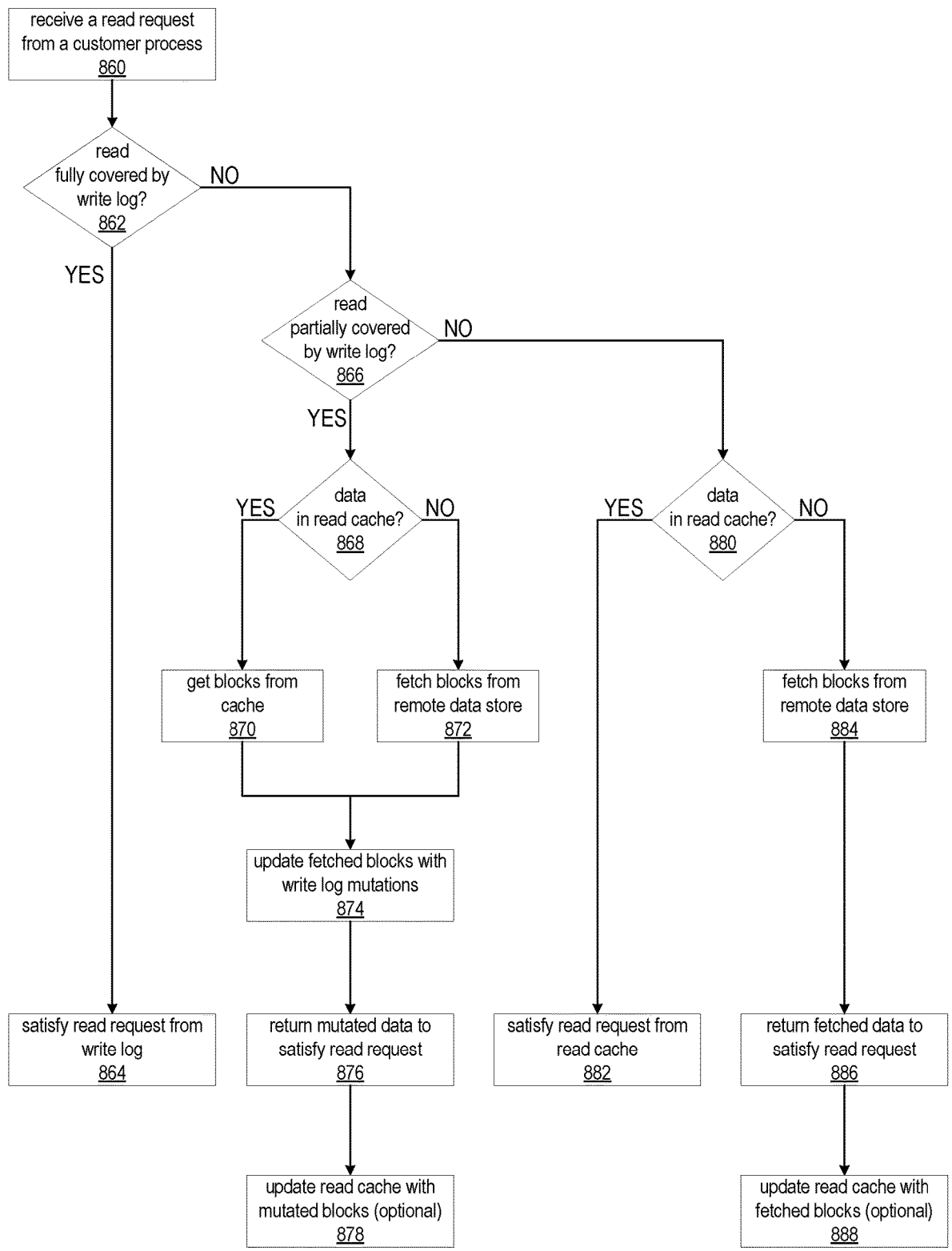
FIG. 27 is a flowchart of a method for satisfying a read request, according to at least some embodiments of a cached gateway.

In cached gateway implementations as illustrated in FIG. 24, to maintain data consistency, read data may need to be merged with write data before the gateway 800 returns the requested data to a customer process 830. FIG. 27 is a flowchart of a method for satisfying a read request, according to at least some embodiments of a cached gateway. As indicated at 860, a read request is received from a customer process 830. In at least some embodiments, when a read request is received from a customer process 830, the gateway 800 looks up the data range of the read in the metadata store 806 to determine if there is data in the write log 814 that overlaps the read range. At 862 of FIG. 27, if overlapping data is found in the write log 814 that fully covers the read range, the data from the write log 814 may be used to directly satisfy the read request, as indicated at 864. Otherwise, at 866 of FIG. 27, if overlapping data is found in the write log 814 that partially covers the read range, the read cache 812 may be checked to see if data is present for the data range, as indicated at 868. If data is in the read cache 812, then one or more data block(s) may be fetched from the read cache 812, as indicated at 870. Otherwise, one or more blocks may be fetched from remote data store 820, as indicated at 872. Note that, in some embodiments, blocks may be fetched from both the read cache and remote data store 820 to satisfy some read requests. At 874 of FIG. 27, the fetched data blocks may then be updated with mutated data from the write log 814. At 876 of FIG. 27, the mutated data may be returned to the requesting process 830 to satisfy the read request. In some embodiments, the updated blocks may be added to the read cache 812, as indicated at 878 of FIG. 27.

In some embodiments, blocks read from the remote data store 820 to satisfy a read request may be added to the read cache 812 and updated from the write log 814 prior to sending the blocks to the requesting process 830. Alternatively, the blocks may be buffered, for example to block buffer 804, and updated in the buffer. The updated blocks may then be sent from the buffer 804 to the requesting process 830 and added to the read cache 814 from buffer 804.

In some embodiments, blocks in read cache 812 that are to be used to satisfy a read request may be updated in place with data from the write log 814 and then sent from the read cache 812 to the requesting process 830 to satisfy the read request. Alternatively, the blocks may be read from the read cache 812 and buffered, for example to block buffer 804, and updated in the buffer. The updated blocks may then be sent from the buffer 804 to the requesting process 830 and added to the read cache 814 from buffer 804. The previous versions of the blocks in the read cache 812 that were read into the buffer may be marked as free and/or overwritten by the newly updated blocks.

At 866 of FIG. 27, if no overlapping data is found in the write log 814, the read cache 812 may be checked to see if the read request can be satisfied from the read cache 812, as indicated at 880 of FIG. 27. At 880 of FIG. 27, if the read request can be satisfied from the read cache 812, then data from the read cache 812 may be returned to the customer process 830 to satisfy the read request, as indicated at 882 of FIG. 27. At 880 of FIG. 27, if the read request cannot be satisfied from the read cache 812, one or more data block(s) may be fetched from remote data store 820, as indicated at 884 of FIG. 27. Data from the fetched blocks may be returned to the customer process 830 to satisfy the read request, as indicated at 886 of FIG. 27. In some embodiments, the blocks fetched from remote data store 820 to satisfy a read request may be added to the read cache 812, as indicated at 888 of FIG. 27.

In at least some embodiments, a gateway 800 may allow customers to request, a snapshot of the write log 814 to be taken and uploaded to the remote data store 820, for example through a console process provided by the service provider. In addition, or instead, the gateway 800 may periodically or aperiodically automatically take and upload a snapshot of the write log 814 to the remote data store 820. Uploading a snapshot of the write log 814 may, for example, provide protection of data from hardware and software failures. In at least some embodiments, the snapshot is a point-in-time snapshot; only mutated data that is in the write log at the time the snapshot is requested is uploaded in the snapshot. In at least some embodiments, for cached gateway implementations, when the mutated data is uploaded, the locally stored read cache 812 may also be updated with at least some of the data being uploaded so that the data does not need to be downloaded from the remote data store 820 for future reads. After the mutated data is uploaded to the remote data store 820, the data in the write log 814 and the corresponding data in the metadata store 806 can be discarded (e.g., marked as "free"), and the space can be reused.

Coalescing Write Data for Upload to the Remote Data Store

As previously described, write log blocks may be periodically or aperiodically uploaded to the remote data store. In at least some embodiments, a data deduplication technique may be used in uploading the write log blocks. However, the described data deduplication technique operates during the upload process on whatever data is in the block(s) that are staged to be uploaded. Since arbitrary writes from the customer process(es) are sequentially appended to the write log, and the customer process(es) may write more than once to the same location in the target data store, a write log block or blocks may include more than one write directed to the same location (e.g., offset and/or range) of the target data store.

Thus, at least some embodiments may implement a pre-upload coalescing technique for the write data in the write log blocks. In this technique, the metadata for a write log block (or blocks) being staged for uploading may be examined to determine if there is more than one write in the write log block(s) directed to the same location in the target data store. If there is more than one write to given location, then the earlier write(s) may be suppressed when building a buffer block to be uploaded. Thus, a block that is passed to the upload process for uploading, e.g. according to the data deduplication technique, may include only one write (the most recent write) to a given location, rather than possibly two or more writes to the same location that may be present if the pre-upload coalescing technique was not applied.

Redundant Storage Gateways

In at least some embodiments, two or more storage gateways as described herein may be grouped into a storage gateway group to provide redundancy and failure recovery in a client network. Embodiments may allow the client to create a storage gateway group and to add storage gateways to the group. Gateway data for each storage gateway in the group may be replicated to at least one other storage gateway in the group. When one of the gateways in the group becomes unavailable for some reason (e.g., fails, loses network connectivity, etc.), one or more other gateways in the group may take over gateway operations for the unavailable gateway, using the replicated data in the group to seamlessly resume the gateway operations. Client processes that previously communicated with the unavailable gateway may be manually or automatically directed to the gateway(s) that are taking over the unavailable gateway's operations.

As previously noted, embodiments of a storage gateway may be implemented as a cached gateway or a shadowing gateway. Embodiments of storage gateway groups as described herein are primarily directed to cached gateways that each may host one or more volumes for which the data are stored on a remote data store, and this section generally assumes that the gateways in the storage gateway group are cached gateways. FIG. 6 is a high-level block diagram that broadly illustrates the architecture of and data flow in an example network environment in which an embodiment of a cached gateway is implemented. FIG. 24 illustrates a general architecture for and data I/O operations of a cached gateway, according to at least some embodiments. In an example embodiment, a cached gateway may be though of as an on-premise block-based appliance that leverages on-premise (local) storage for most frequent accessed data and remote storage provided by a storage service for essentially infinite total capacity. A cached gateway may serve as an interface between a service client's local network and the storage service at a service provider's network. In at least some embodiments, a cached gateway may expose an iSCSI interface to processes on the client network (e.g., iSCSI initiators on computer systems), although other data interfaces may be exposed in some embodiments. As such, the cached gateway may appear as a data interface target (e.g., an iSCSI target) operating within the client network. A cached gateway may, for example, host data stored on a remote storage; the data may, for example, be exposed as one or more logical unit numbers (LUNs) to processes executing on devices within the client network. The processes in turn may initiate data sessions (e.g., SCSI sessions) with LUNs and send data commands (e.g., SCSI commands) to the cached gateway.

For the purpose of this document, a collection of client data presented on the client network by the cached gateway may be referred to as a volume; however, note that data for the volume may be stored on the remote data store, with frequently or recently accessed data cached locally by the cached gateway, in a block storage format as previously described in this document. The cached gateway may be described as "hosting" a volume; a cached gateway may host one or more volumes, or may not host any volumes, at a given time. In addition, one or more cached gateways at one or more client networks may each host one or more volumes, with the data for the volumes stored on the remote data store. Client data for multiple volumes for one or more clients may thus be concurrently stored in the block storage format on the remote data store; note that, in at least some embodiments, the block data for the volumes may be, but is not necessarily commingled on one or more multi-tenant storage devices at the service provider's network by the storage service.

A group of two or more cached gateways may be created at a client network. Cached gateways within the group may, for example, each host one or more volumes, with the data for the volumes stored on a remote data store provided by the service provider and managed by the storage service. In addition to performing the cached gateway functionality as previously described (e.g., receiving I/O requests directed to one or more volumes from client processes, storing write data indicated by the write requests to a write log, and uploading write data from the write log to the remote data store), each cached gateway in the group may also forward write data received from client process(es) to one or more peer gateways in the storage gateway group, and receive write data from one or more peer gateways in the storage gateway group. Other gateway operational information, e.g. snapshot requests, upload events, etc., may also be forwarded to and received from other gateways in the group. In at least some embodiments, write data received by a gateway from one or more other gateways in the group may be stored similarly to the write data received directly from client processes, but in one or more separate write log(s) that may be specific to the respective volume(s) to which the write data is directed. Metadata stores for the write log(s) of the respective volume(s) may also be maintained. Alternatively, the write data received by a storage gateway from two or more other storage gateways may be commingled in a flat file or write log. In at least some embodiments, the local store of client data (e.g., read and write logs) for a volume hosted by a gateway that caches data received by the gateway via write requests from client process(es) may be optimized for servicing reads and writes to the respective volume, for example as described in the section titled Block storage I/O operations on a storage gateway. However, the write data received from other gateway(s) is just to be stored; read requests to the respective volume(s) do not have to be serviced. Thus, at least some embodiments may sequentially write all of the write data received from other storage gateways for the respective volume(s) to a common flat file or write log so that the write data is written in a quick and efficient manner.

If one of the cached gateways in the group becomes unavailable for some reason, one or more other cached gateways in the group may take over gateway operations from the unavailable gateway, each gateway using the write data previously received from the unavailable gateway directed to particular volume(s) and stored to a write log, and possibly also using write data received from the gateway by other gateways in the group, to resume gateway operations for the volume(s) previously hosted by the unavailable gateway with little or no data loss. Client processes may be automatically or manually directed to the gateway(s) that have taken over hosting of the respective volume(s). Note that the gateway(s) that take over operations for an unavailable gateway may continue to provide an interface to volume(s) that were already hosted by the gateway after taking over gateway operations for volume(s) previously hosted by the unavailable gateway.

While embodiments of storage gateway groups as described herein are primarily directed to cached gateways, and this section generally assumes that the gateways in the storage gateway group are cached gateways, it is to be noted that in some embodiments, two or more shadowing gateways may be grouped into a storage gateway group. FIGS. 7 and 25 illustrate example embodiments of shadowing gateways. For example, a group of shadowing gateways may be configured with one shadowing gateway serving as the authoritative gateway that provides an interface to a primary data store implemented on local storage and shadows write data directed to the primary data store to a remote data store, and one or more other gateways serving as redundant gateways to which the write data is provided by the authoritative gateway. Each redundant gateway may store the received write data to a respective write log. If the authoritative gateway becomes unavailable, one of the other gateways in the group may take over as the authoritative gateway using at least the write data stored in its write log. As another example, in some embodiments, iSCSI multipath connectivity may be used to connect two or more shadowing gateways in a storage gateway group to the primary data store. Multipath connectivity enables multiple redundant paths from the client process(es) to the primary data store. One of the shadowing gateways may serve as the authoritative shadowing gateway that performs the shadowing gateway functionality as previously described. If that gateway becomes unavailable, however, another shadowing gateway in the storage gateway group may take over as the authoritative gateway, for example after being selected by a distributed election within the group.

Figure 28:
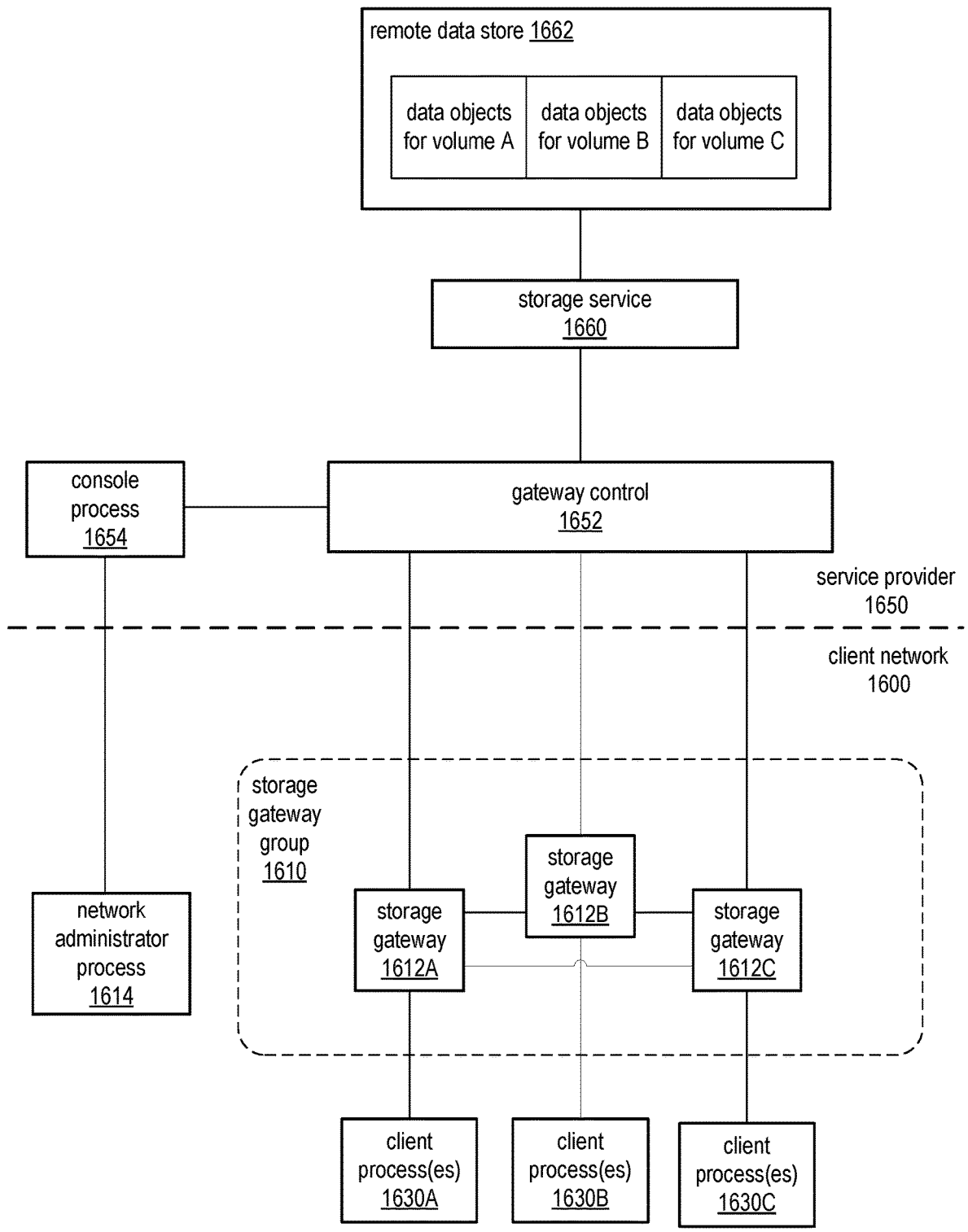
FIG. 28 illustrates a configuration for an example storage gateway group on a client network, according to at least some embodiments.

FIG. 28 illustrates a configuration for an example storage gateway group on a client network, according to at least some embodiments. A client of a service provider 1650 may obtain one or more storage gateways 1612. Each storage gateway 1612 may be installed on a client network 1600 and activated, for example according to an activation process as described in the section titled Storage gateway activation process. After activation, each storage gateway 1612 may be configured by the client. For example, each storage gateway 1612 may be configured to serve as a cached gateway, and may be assigned local storage for gateway data. The configuration may be performed, for example, according to a remote gateway management technique as described in the section titled Remote gateway management using gateway-initiated connections.

During the activation process or during configuration, a storage gateway 1612 may be configured as a member of a storage gateway group 1610. For example, in some embodiments, a gateway management user interface to a console process 1654 may be presented to a network administrator via network administrator process 1614. The user interface may include one or more user interface elements via which the administrator may specify that particular gateway(s) 1612 are to be added to a specific storage gateway group 1610. The console process 1654 may message the gateway control 1652 plane of the service provider 1650, which may then forward the configuration command to the respective gateway 1612, for example via a gateway-initiated connection as described in the section titled Remote gateway management using gateway-initiated connections.

In at least some embodiments, upon being directed to join a storage gateway group 1610, a storage gateway 1612 may open a separate connection to each of one or more other gateways 1612 in the group. In the example shown in FIG. 28, three storage gateways (1612A, 1612B, and 1612C) are shown as members of group 1610, and each of the storage gateways 1612 in the group 1610 are shown as being connected to each other gateway 1612 in the group 1610. Note that there may be fewer or more storage gateways 1612 in a group 1610. Further note that a client network 1600 may include more than one storage gateway group 1610, and may also include one or more storage gateways 1612 that are not in a storage gateway group 1610.

In at least some embodiments, to provide fault isolation and redundancy for failure conditions, each storage gateway 1612 in the group 1610 may be instantiated as or on a separate physical device. In addition, other measures may be taken to provide fault isolation, for example providing each gateway 1612 with a separate power supply or even locating the gateways 1612 in different data centers.

One or more volumes may be created and associated with particular storage gateways 1612 in storage gateway group 1610. For example, in some embodiments, a gateway management user interface to a console process 1654 may be presented to a network administrator via network administrator process 1614. The user interface may include one or more user interface elements via which the administrator may create volumes and associate each volume with a particular gateway 1612 in the storage gateway group 1610. The console process 1654 may message the gateway control 1652 plane of the service provider 1650, which may then forward the volume creation request to the storage service 1660. The storage service may create the volume, and the respective gateway 1612 may be messaged to inform the gateway 1612 that the gateway hosts the volume. A volume identifier (volume ID) may be provided for each volume, and the gateway 1612 may be informed of the volume ID. In the example shown in FIG. 28, three volumes, volumes A, B and C, have been created and associated with gateways 1612 in storage gateway group 1610. For example, gateway 1612A may host volume A, gateway 1612B may host volume B, and gateway 1612C may host volume 1612C. However, note that a gateway 1612 in a group 1610 may host more than one volume. In addition, a volume is not necessarily assigned to each gateway 1612 in a group 1610. Data objects for each volume are stored on remote data store 1662, for example in a block storage format as previously described in this document. Frequently or recently accessed data for each volume may be cached locally by the respective storage gateway 1612.

Once a gateway 1612 has been assigned a volume to host, the gateway 1612 may inform its peer gateways 1612 in the group 1610 that it hosts the volume. For example, the gateway may message each gateway with at least the volume ID for each volume it hosts. The gateway 1612 may expose data port(s) (e.g., iSCSI port(s)) on the client network 1600 for accepting I/O requests from one or more client processes 1630 (e.g., iSCSI initiators on computer systems) directed to the volume. For example, once volume A has been created and assigned to storage gateway 1612A, storage gateway 1612A may message gateways 1612B and 1612C to inform its peer gateways that it hosts volume A, and may expose data port(s) on the client network 1600 for accessing volume A. Storage gateway 1612A may appear as a data interface target (e.g., an iSCSI target) operating within the client network 1600. Similarly, storage gateways 1612B and 1612C may be assigned volumes B and C, and may expose data port(s) on the client network 1600 for accessing the respective volumes. One or more client process(es) 1630 may initiate data sessions (e.g., SCSI sessions) with volumes A, B, or C hosted by the storage gateways 1612A, B and C, respectively, and send I/O commands (e.g., SCSI commands) to the respective storage gateways 1612. For example, client process(es) 1630A may initiate data sessions with volume A via storage gateway 1612A, client process(es) 1630B may initiate data sessions with volume B via storage gateway 1612B, and client process(es) 1630C may initiate data sessions with volume A via storage gateway 1612C, as illustrated in FIG. 28. Note that a client process 1630 initiates and maintains only one data session with only one storage gateway 1612 at a time; however, a storage gateway 1612 may host one or more data sessions, each with a different client process 1630, at one time.

Figure 29A:
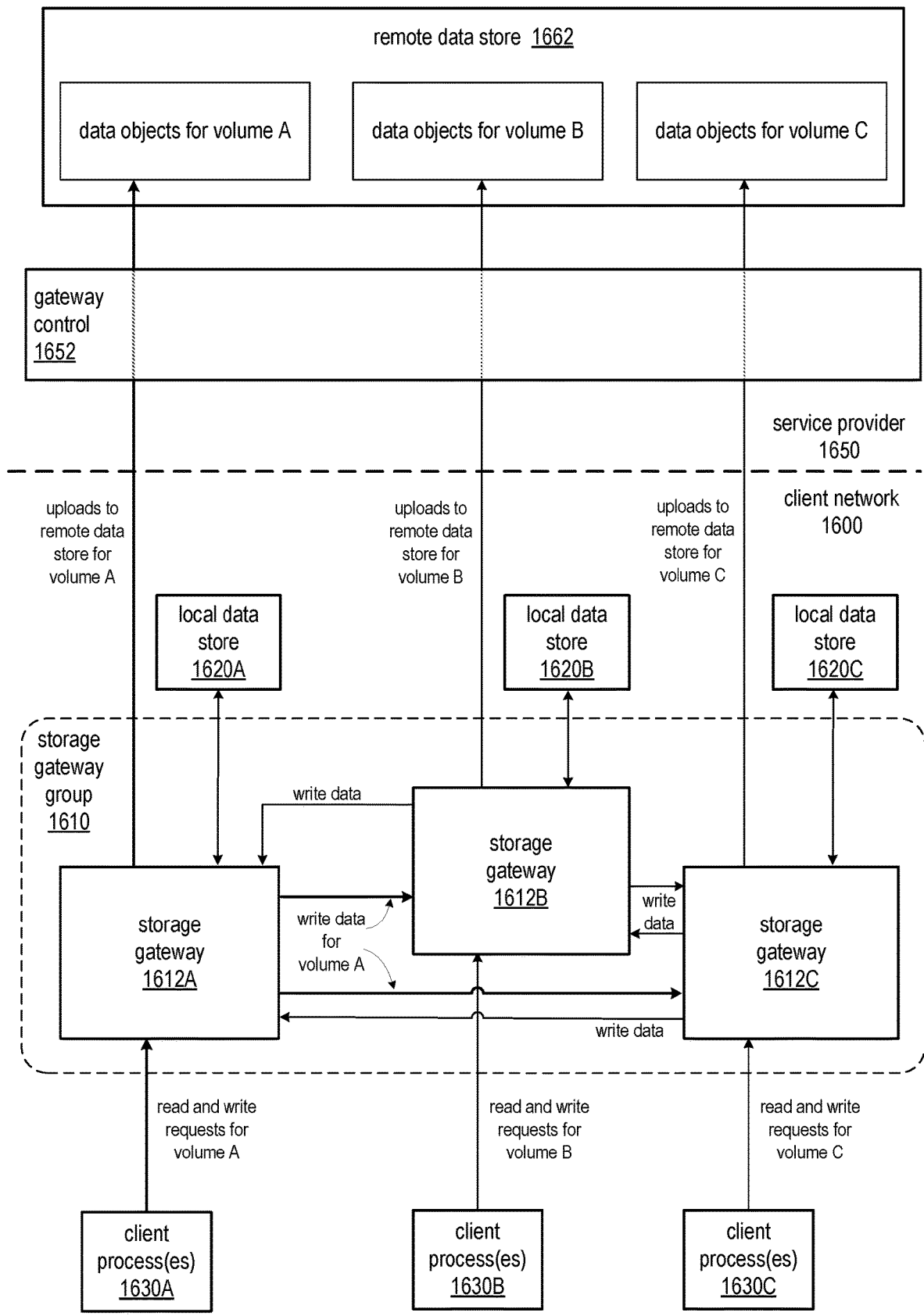
FIGS. 29A and 29B illustrate operations of an example storage gateway group on a client network, according to at least some embodiments.
Figure 29B:
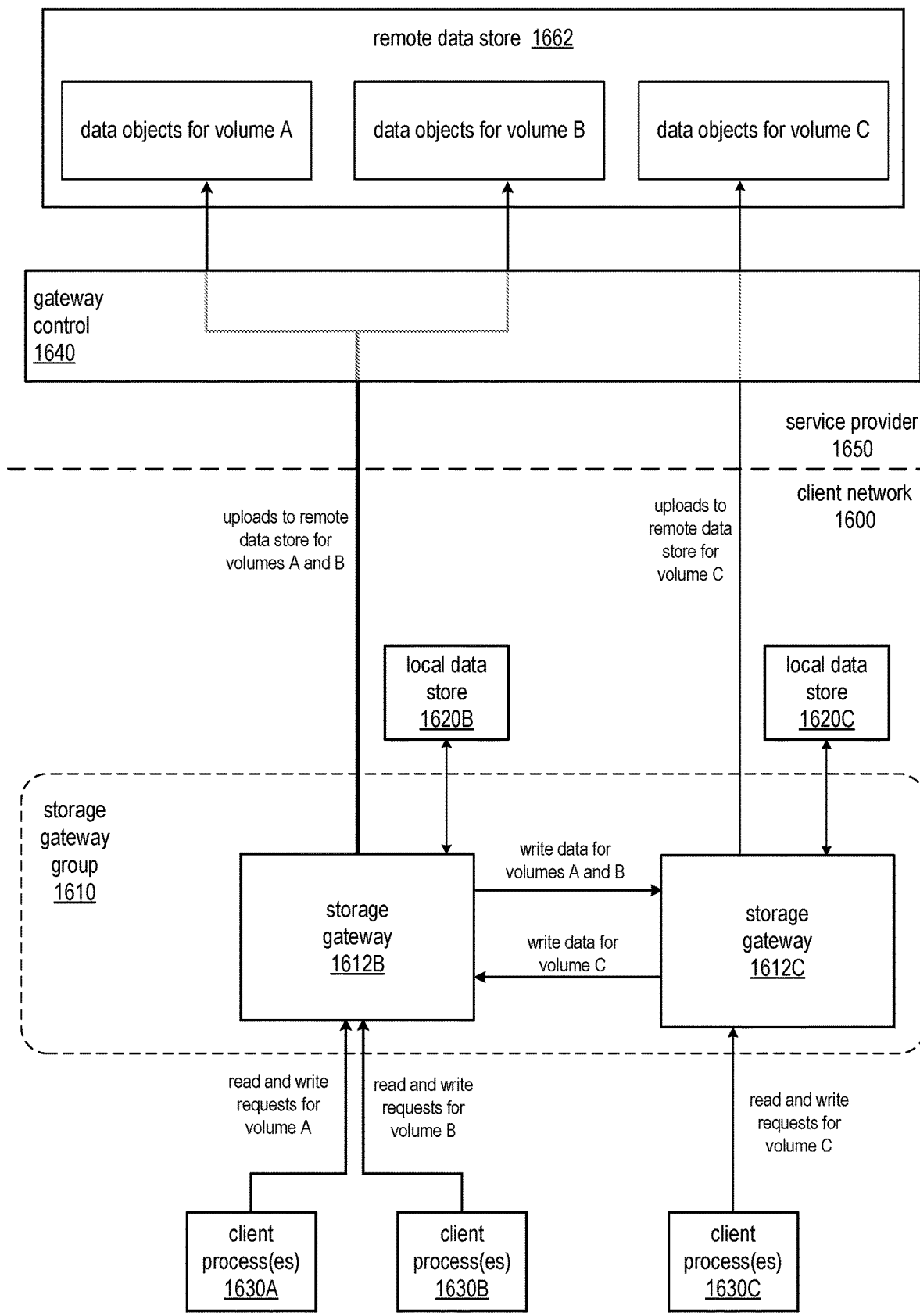

FIGS. 29A and 29B illustrate operations of an example storage gateway group on a client network, according to at least some embodiments. In FIG. 29A, storage gateways 1612A, 1612B, and 1612C are configured as a storage gateway group 1610 on client network 1600. Three volumes (volumes A, B, and C) have been created, and data objects for the volumes A, B, and C are stored on remote data store 1662 at service provider 1650. Storage gateway 1612A has been configured to host volume A, storage gateway 1612B has been configured to host volume B, and storage gateway 1612C has been configured to host volume C. At least one communications connection or channel has been established from each storage gateway 1612 in the group 1610 to each other gateway 1612 in the group 1610. Each storage gateway 1612 in the group 1610 has been informed of the volume(s) its peer gateways host, and has established the write log(s), metadata store(s), and other components necessary to receive and store write data for the volume(s), in addition to the read log(s), write log(s), metadata store(s), and other components necessary to support its own hosted volume(s).

Each storage gateway 1612 receives I/O requests (read and write requests) from respective client process(es) 1630 directed to the volume(s) that the storage gateway 1612 hosts. For example, storage gateway 1612A receives read and write requests directed to volume A from client process(es) 1630A, storage gateway 1612B receives read and write requests directed to volume B from client process(es) 1630B, and storage gateway 1612C receives read and write requests directed to volume C from client process(es) 1630C. Each storage gateway 1612 may process the I/O requests received from the respective client process(es) 1630, for example as described in the section titled Block storage I/O operations on a storage gateway. In at least some embodiments, for the write requests, each storage gateway 1612 may append write data to a write log, for example a write log implemented on a local data store 1620 implemented on or assigned to the respective gateway 1612, and may then asynchronously upload the write data from the write log to the remote data store 1662 via gateway control 1652. For example, storage gateway 1612A receives write requests directed to volume A and appends the write data from the write requests to a write log implemented on local data store 1620A. In addition, the storage gateway 1612A may update a metadata store to include a reference to the write data in the write log. The reference may, for example indicate the offset into the write log of the appended write data and the length of the write data in the write log, and may also indicate the volume ID and/or other information. As previously noted, a storage gateway 1612 may host more than one volume. In at least some embodiments, a storage gateway 1612 may maintain a separate write log and metadata store for each volume it hosts.

In addition, for the write requests, each storage gateway 1612 in storage gateway group 1610 may send the write data received in write requests from respective client process(es) 1630 to at least one other storage gateway 1612 in the group 1610. For example, storage gateway 1612A may send write data from the write requests it receives that are directed to volume A to storage gateways 1612B and 1612C. In at least some embodiments, metadata may be sent with the write data, for example the volume ID of the target volume may be sent with the write data. In some embodiments, the write requests themselves may be sent to the other storage gateway(s) 1612.

In at least some embodiments, a sequence number may be sent with each write data that is sent by a storage gateway 1612 to the one or more other storage gateways 1612 in the group 1610. For example, a first write data may be given a sequence number of 1, a second write data a sequence number of 2, and so on.

In at least some embodiments, a storage gateway 1612 that hosts a volume may not complete a write request directed to the volume until at least one of its peer storage gateways acknowledges that it has received the write data for the write request forwarded to the peer nodes by the gateway 1612 that hosts the volume. In some embodiments, the storage gateway 1612 may not complete the write request until a threshold number (e.g., a majority) of its peer gateways 1612 acknowledge the write.

Each storage gateway 1612 in storage gateway group 1610 may thus receive write data from one or more other storage gateways 1612 in group 1610. For example, storage gateway 1612B may receive write data directed to volume A from storage gateway 1612A, and may also receive write data directed to volume C from storage gateway 1612C. Note that storage gateway 1612B hosts volume B, but does not host volume A or volume C.

In at least some embodiments, each storage gateway 1612 in group 1610 may append the write data it receives from other storage gateway(s) 1612 in group 1610 to write log(s), for example write log(s) implemented on its respective local data store 1620. In at least some embodiments, the storing of write data received from other storage gateway(s) 1612 may be performed similarly to the storing of write data received from client process(es), for example as described in the section titled Block storage I/O operations on a storage gateway. For example, storage gateway 1612B may receive write data directed to volume A from storage gateway 1612A and append the write data to a write log for volume A implemented on local data store 1620B. In addition, the storage gateway 1612B may update a metadata store for volume A to include a reference to the write data in the write log. The reference may, for example indicate the offset into the write log of the appended write data and the length of the write data in the write log, and may also indicate the volume ID and/or other information. In some embodiments, the reference may include a sequence number for the write data. Storage gateway 1612B may also receive write data directed to volume C from storage gateway 1612C, append the write data to a write log for volume C implemented on local data store 1620B, and update the metadata store appropriately. However, storage gateway 1612B does not upload write data from the write logs for volumes A and C to the remote data store 1662 while the volumes are hosted by other storage gateways 1612, and does not service I/O requests from client process(es) 1630 directed to volumes A and C.

In some embodiments, a storage gateway 1612 may maintain a separate write log and metadata store for each volume for which it receives write data from another storage gateway 1612 in the group 1610. For example, storage gateway 1612B may maintain separate write logs and metadata stores for volumes A and C. However, in some embodiments, a storage gateway 1612 may maintain a single write log and/or metadata store for all volumes for which it receives write data from other storage gateways 1612 in the group 1610. For example, storage gateway 1612B may maintain a single write log and metadata store for volumes A and C. In at least some embodiments, a storage gateway 1612 may perform sequential writes of the write data to the write log(s) for the volume(s). The write data received by a storage gateway (e.g., storage gateway 1612B) from other gateway(s) in the group 1610 (e.g., storage gateways 1612A and 1612C) is just to be stored; read requests to the respective volume(s) (e.g., volumes A and C) do not have to be serviced. Thus, in some embodiments, a storage gateway (e.g., storage gateway 1612B) may sequentially write all of the write data received from other storage gateways (e.g., storage gateways 1612A and 1612C) for the respective volume(s) (e.g., volumes A and C) to a common flat file or write log so that the write data is written in a quick and efficient manner.

In at least some embodiments, a storage gateway 1612 may store information about other gateway data and/or events related to a volume, for example in a metadata store for the volume, and may inform its peer gateways 1612 in group 1610 of the other gateway data and/or events. For example, if storage gateway 1612A receives a snapshot request for volume A that directs the gateway 1612A to upload all current data in the write log for volume A to remote data store 1662, gateway 1612A may record the snapshot event in its metadata store for volume A and message gateways 1612B and 1612C of the snapshot event. Gateways 1612B and 1612C may then record the snapshot event, for example in their respective metadata stores for volume A. As another example, when storage gateway 1612A uploads one or more blocks from its write log remote data store 1662, gateway 1612A may record the upload in its metadata store for volume A and message gateways 1612B and 1612C of the upload. Gateways 1612B and 1612C may then record the upload event, for example in their respective metadata stores for volume A. Thus, each storage gateway 1612 may inform its peer gateways 1612 of the state of each volume the gateway 1612 hosts regarding both incoming data (write data) from respective client process(es) 1630 and outgoing data (data uploaded to the remote data store 1662).

As another example, volume ownership information may be shared among the peer gateways 1612 in the group 1610. For example, when a storage gateway 1612 is assigned a volume or takes over a volume from an unavailable gateway in the group, the storage gateway 1612 may inform the other gateway(s) 1612 in the group that it now hosts the volume; this information may be recorded in a write log and/or metadata store for the respective volume. Thus, if a storage gateway 1612 that hosts a given volume becomes unavailable, another storage gateway 1612 may check its write log and/or metadata store for the respective volume to determine if another storage gateway 1612 in the group has assumed ownership of the volume.

In at least some embodiments, each storage gateway 1612 in storage gateway group 1610 may monitor the health of the other storage gateway(s) 1612 in the group 1610. In at least some embodiments, a heartbeat technique may be employed that allows the peer gateways 1612 to track each other's health. However, other techniques may also be used to monitor gateway health in some embodiments. In at least some embodiments, gateway control 1640 may monitor the health of all the storage gateway(s) 1612 in group 1610. In some embodiments, both the gateways 1612 and gateway control 1640 may monitor the health of the gateways 1612 in the group 1610. Thus, when a gateway 1612 in the group 1610 becomes unavailable for some reason (e.g., fails, loses network connectivity, etc.), the unavailability of the gateway may be detected by either one or more of the other gateways 1612 in the group 1610, by the gateway control 1640, or by both. For example, gateway 1612A may become unavailable. Gateways 1612B and 1612C may detect that gateway 1612A is unavailable, for example via a heartbeat technique. In addition, gateway control 1640 may detect that gateway 1612A is unavailable.

Upon detecting that a gateway 1612 (e.g., 1612A) in storage group 1610 is unavailable, one or more other gateways 1612 in the group may take over hosting of the volume(s) that were hosted by the unavailable gateway 1612. Note that, if the unavailable gateway 1612 hosts more than one volume, two or more gateways 1612 in group 1610 may each take over hosting of one or more of the volumes, or one gateway 1612 may take over hosting of all of the volumes. Different techniques may be used to determine which gateway 1612 is to take over hosting of a given volume or volumes in various embodiments. For example, in some embodiments, a gateway 1612 that detects that another gateway 1612 in the group 1610 is unavailable may send a notification to gateway control 1640 requesting permission to take over hosting of volume(s) formerly hosted by the unavailable gateway 1612. If gateway control 1640 acknowledges the takeover, the other gateway becomes the owner of the volume(s) previously hosted by the unavailable gateway 1612. As another example, two or more gateways 1612 in the group 1610 may hold a distributed election to determine which gateway(s) 1612 are to take over hosting of which volume(s). As another example, gateway control 1640 may determine gateways 1612 in group 1610 to take over volumes(s) from the unavailable gateway. For example, gateway control 1640 may monitor the health and workload of the gateways 1612 in group 1610, and may assign volume(s) to the gateway(s) 1612 according to the workload and/or health of the gateway(s). As another example, the volume(s) may be manually assigned to particular gateway(s) 1612, for example by a client network administrator via a network administrator process 1614 as illustrated in FIG. 28.

A storage gateway 1612 that is assigned a volume from an unavailable gateway 1612 to host may expose the volume on one or more data ports (e.g., iSCSI ports) and resume gateway operations for the volume, e.g. receiving and processing I/O requests and uploading write data from the write log for the volume. Since the storage gateway 1612 that is taking over operations for a volume has a write log and metadata store for the volume, and knows the state of the volume, the takeover of gateway operations may be performed quickly and efficiently without having to retrieve data from the remote data store 1662.

When receiving write data from another gateway 1612, it is possible that some write data may be missed. Thus, in at least some embodiments, to insure completeness of write data for a volume when taking over hosting of the volume from an unavailable gateway 1612, once a storage gateway 1612 has been assigned the volume, the storage gateway 1612 may communicate with one or more other storage gateway(s) 1612 currently in the group 1610 to determine if the gateway 1612 has all of the write data for the volume, and to fill any holes in the gateway's write log for the volume. For example, in some embodiments, the gateway 1612 may query the other gateway(s) 1612 in the group 1612 to determine the highest sequence number for the write data. After determining the highest sequence number, the gateway 1612 may examine its write log to determine if any write data in the sequence are missing, and then request the missing write data from one or more other gateways 1612 in the group 1610.

Client process(es) 1630 that were connected to an unavailable gateway 1612 may re-establish communications with a volume that has been taken over by a different gateway 1612 from the unavailable gateway. Different techniques may be used in various embodiments for a client process 1630 to re-establish communications with a volume now hosted on a different gateway 1612. For example, in embodiments in which iSCSI is used and the gateway 1612 is an iSCSI target and the client process 1630 is an iSCSI initiator, an iSCSI discovery technique may be used. In an example iSCSI discovery technique, the iSCSI initiator wants to talk to a target that has a logical name. The iSCSI initiator can query any peer gateway 1612 to determine where the target is, and then initiate an iSCSI session to the indicated gateway 1612. As another example, the gateways 1612 in storage gateway group 1610 may advertise IP addresses corresponding to exposed data ports (e.g., iSCSI ports), for example via a DNS. When a gateway 1612 becomes unavailable, the gateway 1612 that is taking over hosting of a volume may take over the IP address formerly advertised by the unavailable gateway. A client process 1630 loses its connection to the gateway 1612 when it becomes unavailable, and requests a connection to the IP address, which is now associated with the gateway 1612 that has taken over operations for the unavailable gateway 1612. Note that other techniques than those described may be used to re-establish a connection from a client process 1630 to a volume. For example, in some embodiments, a client administrator or other client person or process may reconfigure or redirect a client process 1630 (e.g., an iSCSI initiator) to point to the gateway 1612 that now serves the volume. As another example, a load balancer or similar process or device may front the gateways 1612 in group 1610, may be aware that a gateway 1612 becomes unavailable and may be informed when a different gateway takes over a volume from the gateway, and may redirect client I/O requests from respective client process(es) to the correct gateway 1612.

As previously described, storage gateways 1612 may record other events, for example snapshot events, for the volumes hosted by other gateways 1612 in the group, and may also record the state of incoming and outgoing data. When a storage gateway 1612 takes over a volume from an unavailable gateway 1612, the gateway 1612 may determine if there are any gateway operations for the volume that were started but not completed by the unavailable gateway 1612, and may complete the operation. For example, if a snapshot operation was started but not completed for a volume that has been taken over, the gateway 1612 may detect, continue and complete the snapshot operation according to the information in the metadata store for the volume that the gateway 1612 maintains.

In at least some embodiments, when taking over a volume from an unavailable gateway 1612, a storage gateway may initiate a recover snapshot to the volume to protect the data, if there is no outstanding snapshot already in progress.

In at least some embodiments, as part of the recovery process after a gateway 1612 has become unavailable, a client network administrator may log on to the console process of service provider 1650 via the network administrator process to determine which gateways 1612 in group 1610 are currently hosting the volumes. If necessary or desired, the administrator may rebalance the volumes on the remaining gateways 1612 in the group 1610 after the snapshot is complete. The administrator may choose to let the gateway 1612 that was assigned a volume formerly hosted by an unavailable gateway to continue to host the volume, or may choose to assign the volume to a different gateway 1612 in the group 1610. Thus, in at least some embodiments, the volume(s) of an unavailable gateway 1612 may be automatically assigned to other gateway(s) 1612 in the group 1610 by the control plane 1652 or by some other technique (e.g., distributed election), snapshot(s) may be initiated if necessary or continued if already in progress, and, once the snapshot(s) are complete, the volume(s) may be redistributed among the remaining peer gateways 1612 in the group 1610.

As an example of a gateway taking over a volume from an unavailable gateway, referring to FIG. 29A, storage gateway 1612A, which hosts volume A, may become unavailable for some reason (e.g., fails, loses network connectivity, etc.). Storage gateway 1612B, storage gateway 1612C, and/or gateway control 1640 may detect that storage gateway 1612A is unavailable. A technique may be used to determine that storage gateway 1612B is to take over hosting of volume A, for example a distributed election technique. FIG. 29B illustrate operations of the example storage gateway group 1610 on client network 1600 as storage gateway 1612B takes over hosting volume A from unavailable gateway 1612A, according to at least some embodiments. Storage gateway 1612B may perform a technique as previously described to insure that it has the complete write log for volume A, which may include obtaining missing write data for volume A from gateway 1612C. The gateway 1612B may resume a snapshot operation for volume A if one is in progress, or may initiate a recovery snapshot to volume A if not. Gateway 1612B may expose volume A on data port(s), for example as an iSCSI target, so that client process(es) 1630A may re-initiate data session(s) to volume A. Gateway 1612B may begin receiving I/O requests from client process(es) 1630A, appending write data for volume A to the write log for volume A on local data store 1620B, and uploading write data for volume A from the write log to the remote data store 1662. In addition, gateway 1612B may inform gateway 1612C that it is now hosting volume A, and begin sending write data and possibly other information related to volume A to gateway 1612C. Note that gateway 1612B continues to host volume B and to perform gateway functions related to volume B while taking over gateway operations for volume A.

While FIGS. 28, 29A, and 29B show a gateway group 1610 that initially includes three storage gateways 1612, a group 1610 may initially include two, three, or more gateways, and gateways 1612 may be added to or removed from a group 1610 as necessary or desired.

Figure 30A:
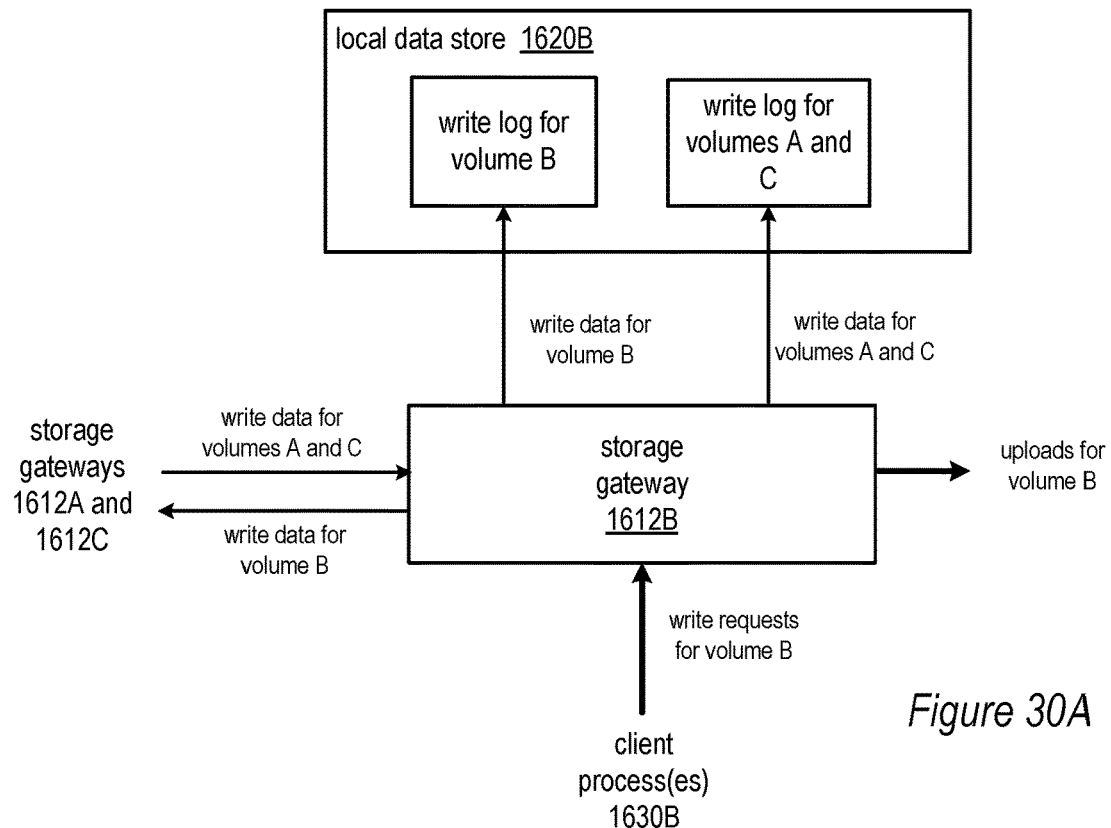
FIGS. 30A and 30B illustrate data flow on a storage gateway in a gateway group before and after taking over hosting of a volume from another storage gateway in the group, according to at least some embodiments.
Figure 30B:
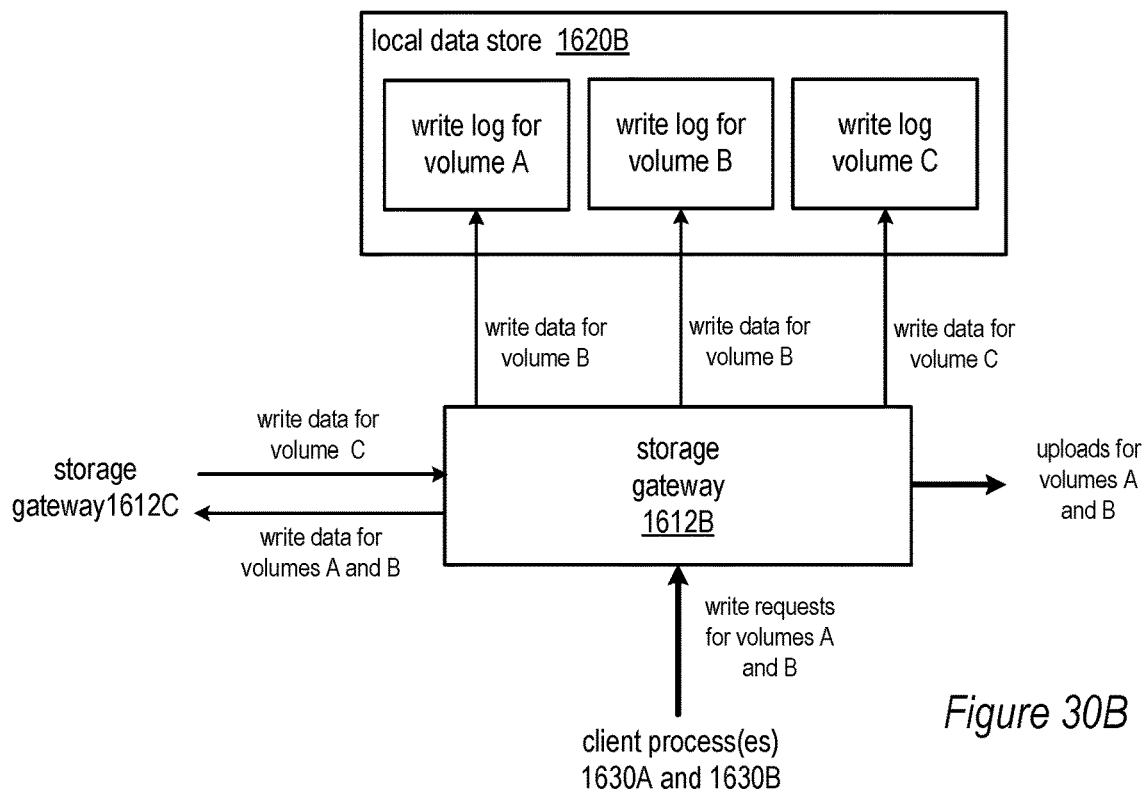

FIGS. 30A and 30B illustrate data flow on storage gateway 1612B of FIGS. 29A and 29B before and after taking over hosting of volume A from gateway 1612A, according to at least some embodiments. FIG. 30A corresponds to FIG. 29A, and shows data flow on storage gateway 1612B before gateway 1612A becomes unavailable, according to at least some embodiments. Gateway 1612B receives I/O requests directed to volume B from client process(es) 1630B, appends write data for volume B to a write log for volume B on local data store 1620B, stores volume B information (e.g., write log offsets and lengths) to a metadata store for volume B, and uploads write data from the write log for volume B to the remote data store. Gateway 1612B also sends write data for volume B, which may include sequence numbers for the write data, and possibly other information for volume B operations such as snapshot requests and upload information to storage gateways 1612A and 1612C. Gateway 1612B also receives write data for volumes A and C, and possibly other information for volumes A and C operations such as snapshot requests and upload information, from storage gateways 1612A and 1612C and stores the write data for volumes A and C to write log(s) for volumes A and C. Note that the write data for both volumes may be sequentially appended to a single write log, or may alternatively be appended to separate write logs. In at least some embodiments, gateway 1612B may also store information for volumes A and C to a metadata store or to separate metadata stores for volumes A and C. The information stored to the metadata store(s) may include write log entries including one or more of but not limited to volume ID, write log offset and length, and a sequence number for the write data in the write log.

FIG. 30B corresponds to FIG. 29B, and shows data flow on storage gateway 1612B after gateway 1612B takes over hosting of volume A from the unavailable gateway 1612A, according to at least some embodiments. Gateway 1612B receives I/O requests directed to volumes A and B from client process(es) 1630A and 1630B as illustrated in FIG. 29B, appends write data for volumes A and B to separate write logs for volumes A and B on local data store 1620B, stores volume A and volume B information (e.g., write log offsets and lengths) to separate metadata stores for volumes A and B, and uploads write data from the write logs for volumes A and B to the remote data store. Gateway 1612B also sends write data for volumes A and B, which may include sequence numbers for the write data, and possibly other information for volume A and B operations such as snapshot requests and upload information to storage gateway 1612C. Gateway 1612B also receives write data for volume C, and possibly other information for volume C operations such as snapshot requests and upload information, from storage gateway 1612C and stores the write data for volume C to a write log for volume C. Gateway 1612B may also store information for volume C to a metadata store for volume C. The information stored to the metadata store may include write log entries including one or more of but not limited to a volume ID, write log offset and length, and a sequence number for the write data.

Figure 31:
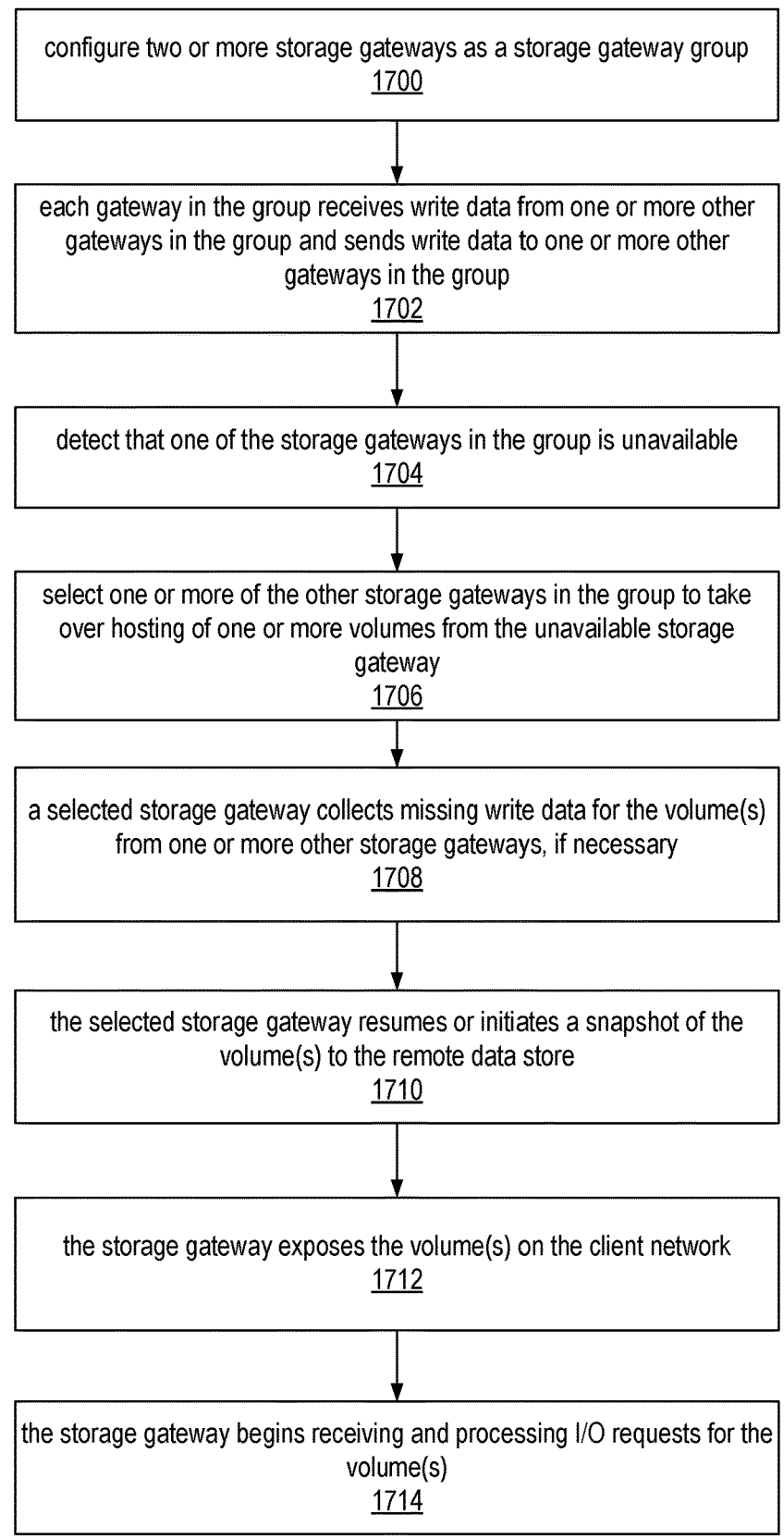
FIG. 31 illustrates a method for establishing a storage gateway group and for recovering from a gateway in the group becoming unavailable for some reason, according to at least some embodiments.

FIG. 31 illustrates a method for establishing a storage gateway group and for recovering from a failure of a gateway in the group, according to at least some embodiments. As indicated at 1700, two or more gateways may be configured as a storage gateway group. For example, a client network administrator may configure each of the two or more storage gateways as a cached gateway, assign one or more volumes to each gateway, and specify to each gateway that it is to be in the storage gateway group. Each storage gateway may then establish a connection to each other gateway in the group, if necessary, and inform the other gateway(s) of the volume(s) that it hosts.

As indicated at 1702, after the storage gateway group is configured, each gateway in the group, in addition to performing gateway operations for its hosted volume(s), if any, receives write data directed to other volumes from one or more other gateways in the group that host the other volumes, and sends write data directed to the one or more volumes hosted by the gateway, if any, to one or more other gateways in the group. Other information related to gateway operations for volumes, such as write data sequence numbers, event notifications, upload information, and so on may also be sent to and received from other gateways in the group.

As indicated at 1704, a storage gateway in the group may become unavailable, and the other gateway(s) in the group may detect that the gateway is unavailable. For example, a heartbeat technique may be used that allows the gateways in the group to monitor the health of other gateways in the group, and may be used to detect that a gateway has become unavailable for some reason (e.g., fails, loses network connectivity, etc.).

As indicated at 1706, one or more other of the other storage gateways in the group may be selected to take over hosting of one or more volumes previously hosted by the unavailable storage gateway. Note that a single gateway may be selected to take over hosting of the volume(s), or two or more volumes may be distributed to two or more gateways. In at least some embodiments, a gateway process of the service provider may select particular gateway(s) in the group to take over particular volumes. Alternatively, the gateways in the group may perform a distributed election to select gateway(s) to take over volumes. Other techniques may be used to select gateways from the group to take over particular volumes in some embodiments.

As indicated at 1708, a storage gateway that is assigned a volume or volumes to take over may collect missing write data for the volume(s) from one or more other storage gateways, if necessary. For example, the storage gateway may determine a highest sequence number for a volume being taken over by querying its peer gateways in the group, determine which if any write data it is missing according to the sequence numbers, and obtain missing write data from one or more other gateways currently in the group.

As indicated at 1710, the storage gateway may resume a snapshot of a volume to the remote data store if one is in progress, or may initiate a recovery snapshot of the volume to the remote data store if not.

As indicated at 1712, the storage gateway exposes the volume(s) on the client network, for example as iSCSI targets. The client process(es) on the client network may then re-establish connections to the volume(s) using one of the techniques as described above.

As indicated at 1714, the storage gateway begins receiving and processing I/O requests for the volume(s). The storage gateway starts servicing read requests, receiving write request and appending the write data to the write log(s) for the volume(s), recording information in the metadata store(s) for the volume(s), and in general performing normal storage gateway operations for the volume(s). Also note that the storage gateway may inform other storage gateway(s) in the group that it now hosts the volume(s).

Illustrative System

Figure 32:
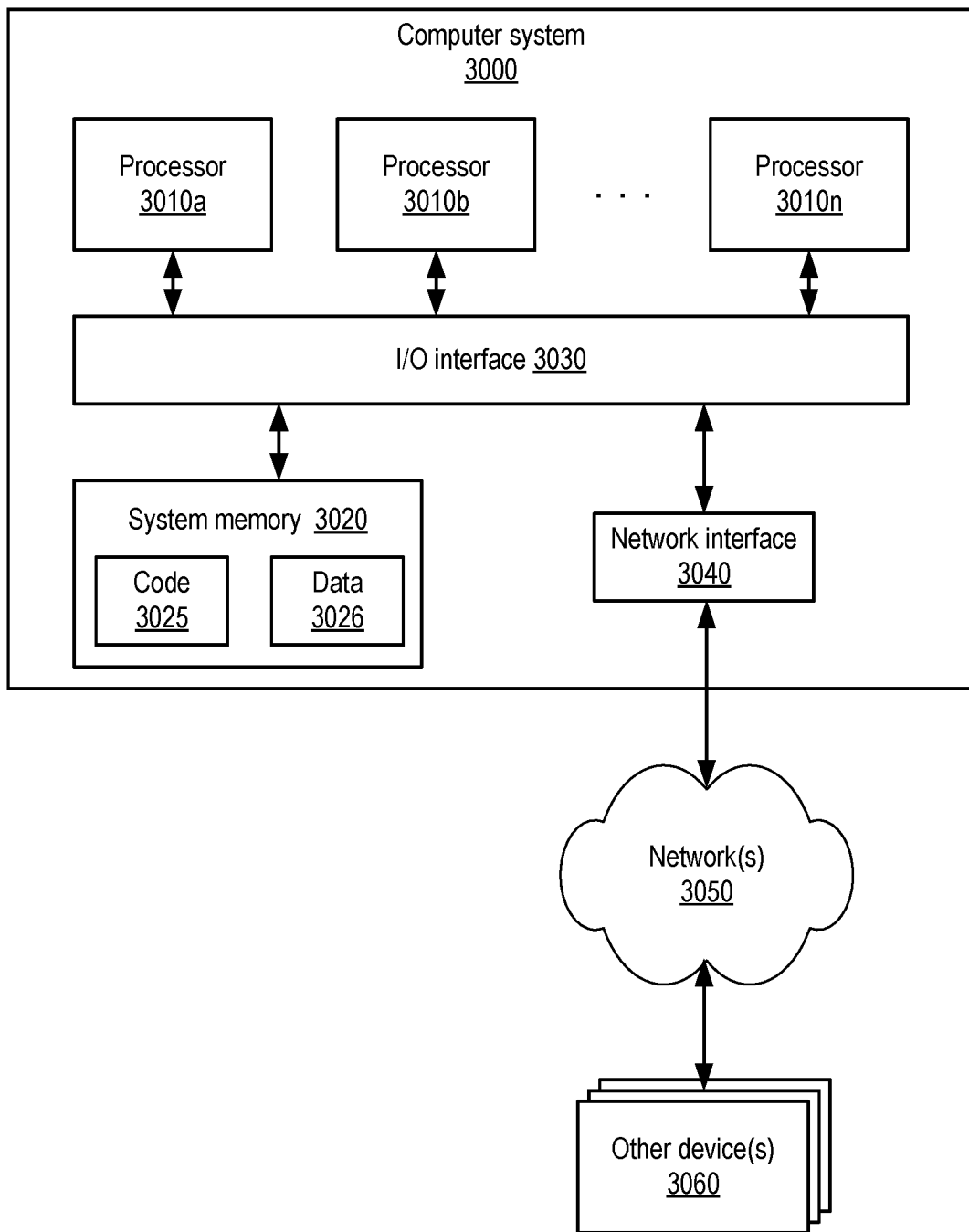
FIG. 32 is a block diagram illustrating an example computer system that may be used in some embodiments.

In at least some embodiments, a computer system that implements a portion or all of the storage gateway technologies as described herein may include a general-purpose computer system that includes or is configured to access one or more computer-accessible media, such as computer system 3000 illustrated in FIG. 32. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for storage gateway technologies, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices as illustrated in the other Figures described herein, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above in reference to the other Figures for implementing embodiments of storage gateway technologies. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a data store on a provider network of a service provider that provides a storage service to clients on a plurality of client networks via one or more storage gateways on each of the client networks, wherein the storage gateways on the client networks act as interfaces, between one or more client processes on the client networks and the storage service, to access client data maintained on the data store by the storage service, and wherein for a particular client network comprising a group of redundant storage gateways, the data store is configured with respective volumes for each storage gateway of the group of redundant storage gateways; and one or more processors and memory storing program instructions that implement a gateway control of the provider network configured to manage relationships between the respective volumes and the group of redundant storage gateways on the particular client network.

2. The system of claim 1, wherein to manage the relationships between respective volumes of the data store and the group of redundant storage gateways on the particular client network, the gateway control of the provider network is further configured to:

receive, from a particular one of the gateways of the group, a notification requesting permission to take over hosting of one or more volumes from another gateway of the group; and acknowledge the particular one of the gateways of the group as owner of the volume previously hosted by the other gateway of the group.

3. The system of claim 1, further comprising:

a gateway management user interface that comprises one or more user interface elements for specifying one or more gateways to be added to the redundant storage gateway group.

4. The system of claim 1, wherein to manage the relationships between the respective volumes of the data store and the group of redundant storage gateways on the particular client network, the gateway control of the provider network is further configured to determine, based at least in part on a health or workload of one or more gateways in the group, a gateway in the group of redundant gateways to take over one or more volumes of the data store from another gateway of the group.

5. The system of claim 1, wherein to manage the relationships between volumes and the group of redundant storage gateways on the particular client network, the gateway control of the provider network is further configured to determine, based at least in part on instructions received from a client administrator via a client administrator process, a gateway in the group of redundant gateways to take over one or more volumes from another gateway of the group.

6. The system of claim 1, wherein the gateway control of the provider network is configured to determine that one or more members of the group of redundant gateways is unavailable; and wherein said manage the relationships between the respective volumes and the group of redundant storage gateways on the particular client network is based at least in part on said determine that one or more members is unavailable.

7. The system of claim 1, wherein to manage the relationships between the respective volumes of the data store and the group of redundant storage gateways on the particular client network, the gateway control of the provider network is further configured to determine one or more other gateways of the group of redundant gateways to take over one or more volumes from one or more unavailable members.

8. The system of claim 1, wherein to manage the relationships between the respective volumes of the data store and the group of redundant storage gateways on the particular client network, the gateway control of the provider network is further configured to monitor health of each of a plurality of the storage gateways in the group of redundant gateways.

9. A method, comprising:

receiving, by a gateway control on a network of a service provider that provides storage service to clients on a plurality of client networks via one or more storage gateways on the client networks, messages from one or more storage gateways of a group of redundant storage gateways on a particular client network, wherein the storage gateways on the client networks act as interfaces between one or more client processes on the client networks and the storage service to access client data maintained on a data store by the storage service; and managing, by a gateway control and based at least in part on the received messages, relationships between one or more volumes of the data store and the group of redundant storage gateways on the particular client network.

10. The method of claim 9, further comprising:

receiving, by the gateway control from a particular one of the gateways of the group, a notification requesting permission to take over hosting of one or more of the volumes of the data store from another gateway of the group; and generating and sending, by the gateway control, an acknowledgement of the particular one of the gateways of the group as owner of the one or more volumes previously hosted by the other gateway of the group.

11. The method of claim 9, further comprising:

determining, based at least in part on a health or workload of one or more gateways in the group, a gateway in the group of redundant gateways to take over one or more volumes from another gateway of the group;

wherein said managing the relationships between one or more volumes of the data store and the group of redundant storage gateways on the particular client network is based at least in part on said determining the gateway to take over the one or more volumes.

12. The method of claim 9, wherein said managing the relationships between one or more volumes of the data store and the group of redundant storage gateways on the particular client network is based on determining, based at least in part on instructions received from a client administrator via a client administrator process, a gateway in the group of redundant gateways to take over one or more volumes from another gateway of the group.

13. The method of claim 9, wherein managing relationships between one or more volumes of the data store and the group of redundant storage gateways on the particular client network is based at least in part on:

determining that one or more members of the group of redundant gateways is unavailable, and determining one or more other gateways of the group of redundant gateways to take over one or more volumes from the one or more unavailable members.

14. The method of claim 9, wherein managing relationships between one or more volumes of the data store and the group of redundant storage gateways on the particular client network comprises monitoring a health of all of the storage gateways in the group of redundant gateways.

15. One or more non-transitory computer-readable media storing program instructions that when executed on or across one or more processors implement a gateway control, the gateway control configured to perform:
- processing messages received over a network from one or more storage gateways of a group of redundant storage gateways on a particular client network, wherein the storage gateways on the particular client network act as interfaces between one or more client processes on the particular client network and a storage service to access client data maintained on a data store by the storage service; and
- managing, based at least in part on the received messages, the group of redundant storage gateways on the particular client network.

16. The non-transitory computer-readable media of claim 15,
- wherein the data store is configured with respective volumes of the client data for each storage gateway of the group of redundant storage gateways; and
- wherein the program instructions, when executed, configure the gateway control to perform:
  - processing a notification received from a particular one of the gateways of the group, wherein the notification requests permission to take over hosting of one or more of the volumes of the data store from another gateway of the group; and
  - generating and sending an acknowledgement of the particular one of the gateways of the group as owner of the one or more volumes previously hosted by the other gateway of the group.

17. The non-transitory computer-readable media of claim 15,
- wherein the data store is configured with respective volumes of the client data for each storage gateway of the group of redundant storage gateways; and
- wherein to perform said managing the group of redundant storage gateways the program instructions, when executed, configure the gateway control to perform determining, based at least in part on a health or workload of one or more gateways in the group, a gateway in the group of redundant gateways to take over one or more of the volumes of the data store from another gateway of the group.

18. The non-transitory computer-readable media of claim 15,
- wherein the data store is configured with respective volumes of the client data for each storage gateway of the group of redundant storage gateways; and
- wherein to perform said managing the group of redundant storage gateways the program instructions, when executed, configure the gateway control to perform determining, based at least in part on instructions received from a client administrator via a client administrator process, a gateway in the group of redundant gateways to take over one or more of the volumes of the data store from another gateway of the group.

19. The non-transitory computer-readable media of claim 15,
- wherein the data store is configured with respective volumes of the client data for each storage gateway of the group of redundant storage gateways; and
- wherein to perform said managing the group of redundant storage gateways the program instructions, when executed, configure the gateway control to perform:
  - determining that one or more members of the group of redundant gateways is unavailable, and
  - determining one or more other gateways of the group of redundant gateways to take over one or more of the volumes of the data store from the one or more unavailable members.

20. The non-transitory computer-readable media of claim 15, wherein to perform managing the group of redundant storage gateways the program instructions, when executed, configure the gateway control to perform monitoring a health of all of the storage gateways in the group of redundant gateways.

* * * * *